(12) United States Patent
Franklin

(10) Patent No.: US 9,689,527 B2
(45) Date of Patent: Jun. 27, 2017

(54) MOUNTING APPARATUS

(71) Applicant: Lee Christopher Franklin, Lawrenceville, GA (US)

(72) Inventor: Lee Christopher Franklin, Lawrenceville, GA (US)

( * ) Notice: Subject to any disclaimer, the term of this patent is extended or adjusted under 35 U.S.C. 154(b) by 0 days.

(21) Appl. No.: 14/209,534

(22) Filed: Mar. 13, 2014

(65) Prior Publication Data

US 2014/0263908 A1    Sep. 18, 2014

Related U.S. Application Data

(60) Provisional application No. 61/798,054, filed on Mar. 15, 2013.

(51) Int. Cl.
| | |
|---|---|
| *A47G 1/17* | (2006.01) |
| *F16M 13/02* | (2006.01) |
| *F16M 11/04* | (2006.01) |
| *F16M 11/14* | (2006.01) |
| *H01F 7/02* | (2006.01) |

(Continued)

(52) U.S. Cl.
CPC .............. *F16M 13/02* (2013.01); *F16B 1/00* (2013.01); *F16M 11/041* (2013.01); *F16M 11/14* (2013.01); *F16M 13/022* (2013.01); *H01F 7/0221* (2013.01); *H01R 13/6205* (2013.01);

(Continued)

(58) Field of Classification Search
CPC ......... F16M 2001/0035; F16M 11/041; F16M 11/14; F16M 13/02; H01F 7/16; H01F 7/00; H01F 7/04; H01F 7/0221; A47G 1/17; B60R 2011/0057; B60R 2011/007; F16B 1/00; F16B 2001/0035; H01R 13/6205;

(Continued)

(56) References Cited

U.S. PATENT DOCUMENTS 3,079,191 A * 2/1963 Engelsted ............. H01F 7/0257
269/8
3,144,527 A   8/1964 Tolegian
(Continued)

FOREIGN PATENT DOCUMENTS

EP    1346674 A2    9/2003
WO    2006126126 A1    11/2006

OTHER PUBLICATIONS

WO/2014/144608 Written Opinion of the International Searching Authority mailed Jul. 20, 2015, 7 pages.
(Continued)

*Primary Examiner* — Christopher E Garft
(74) *Attorney, Agent, or Firm* — James F. Hann; Haynes Beffei & Wolfeld LLP

(57) ABSTRACT

A mounting apparatus and system and method for making the same are provided. The mounting apparatus allows an object to be mounted to a mounting surface via magnetic attractions between different planes of engagement. Through the movement of planes of magnets, an object that is brought in proximity to the mounting apparatus may engage one of the magnetic planes and then be moved further to engage the other magnetic plane, with the combined magnetic force being configured to support the particular object for which the mounting apparatus is designed. The engagement and/or disengagement of the object from the mounting apparatus can thus occur in stages, by degrees, and/or in a tiered manner.

41 Claims, 29 Drawing Sheets

(51) Int. Cl.
*F16B 1/00* (2006.01)
*H01R 13/62* (2006.01)
*H01R 13/73* (2006.01)

(52) U.S. Cl.
CPC ...... *H01R 13/73* (2013.01); *F16B 2001/0035* (2013.01); *Y10T 29/49826* (2015.01)

(58) Field of Classification Search
CPC ... H01R 13/73; H01R 11/30; Y10T 29/49826; H02J 7/025
USPC ....... 248/309.4, 683, 537, 206.5; 292/251.5; 24/303; 269/8; 220/230
See application file for complete search history.

(56) References Cited

U.S. PATENT DOCUMENTS

| | | | |
|---|---|---|---|
| 3,521,216 | A | 7/1970 | Tolegian |
| 3,786,391 | A | 1/1974 | Mathauser |
| 4,177,964 | A | 12/1979 | Hujsak et al. |
| 4,265,002 | A | 5/1981 | Hosken |
| 5,954,520 | A | 9/1999 | Schmidt |
| 6,028,744 | A | 2/2000 | Amirkiai et al. |
| 6,295,702 | B1 | 10/2001 | Bauer |
| 6,304,017 | B1 | 10/2001 | Leupold |
| 6,387,096 | B1 | 5/2002 | Hyde, Jr. |
| 6,436,251 | B2 | 8/2002 | Gopalraja et al. |
| 6,565,363 | B2 | 5/2003 | Downing |
| 6,828,890 | B2 | 12/2004 | Cope et al. |
| 6,876,284 | B2 | 4/2005 | Wright et al. |
| 7,311,526 | B2* | 12/2007 | Rohrbach .......... H01R 13/6205 439/218 |
| 7,351,066 | B2 | 4/2008 | DiFonzo et al. |
| 7,374,142 | B2 | 5/2008 | Carnevali |
| 7,467,948 | B2 | 12/2008 | Lindberg et al. |
| 7,543,779 | B1 | 6/2009 | Lewis et al. |
| 7,762,817 | B2 | 7/2010 | Ligtenberg et al. |
| 7,843,296 | B2* | 11/2010 | Fullerton .................. G09F 7/04 24/303 |
| 7,997,906 | B2 | 8/2011 | Ligtenberg et al. |
| 8,138,869 | B1 | 3/2012 | Lauder et al. |
| 8,368,494 | B2* | 2/2013 | Fiedler ............... A45C 13/1069 269/8 |
| 8,373,310 | B2* | 2/2013 | Baarman ................. H01F 38/14 307/104 |
| 2006/0150304 | A1 | 7/2006 | Bentz |
| 2008/0246573 | A1 | 10/2008 | Souder et al. |
| 2011/0001025 | A1* | 1/2011 | Fiedler ............... A45C 13/1069 248/206.5 |
| 2011/0073118 | A1* | 3/2011 | Ponsort ................. A61F 5/3701 128/845 |
| 2011/0167595 | A1* | 7/2011 | Fiedler ............... A45C 13/1069 24/303 |
| 2012/0021618 | A1 | 1/2012 | Schultz |
| 2012/0021619 | A1 | 1/2012 | Bilbrey et al. |
| 2012/0033375 | A1 | 2/2012 | Madonna et al. |
| 2012/0175474 | A1 | 7/2012 | Barnard et al. |
| 2012/0284969 | A1 | 11/2012 | Fullerton et al. |
| 2012/0305733 | A1 | 12/2012 | Vogel et al. |
| 2013/0050973 | A1 | 2/2013 | Rohrbach |
| 2013/0176091 | A1 | 7/2013 | Lancaster-Larocque |

OTHER PUBLICATIONS

WO/2014/144608 International Search Report mailed Jul. 20, 2015, 3 pages.
WO/2014/144608 International Preliminary Report on Patentability mailed Jan. 28, 2016, 15 pages.
WO/2014/144608 Written Opinion of the International Preliminary Examining Authority mailed Oct. 13, 2015, 6 pages.
WO/2016/007619 Written Opinion of the International Searching Authority mailed Oct. 6, 2015, 4 pages.
WO/2016/007619 International Search Report mailed Oct. 6, 2015, 3 pages.
Steelie—The World's Finest Phone and Tablet Holder SystemSteelie Mobile Device H . . . [online] [retrieved Jan. 15, 2013]. Retrieved from the Internet: <URL: http://www.steelie.com/>. (dated 2013) 2 pages.
Versastand Folding Aluminum Table Desk Stand [online] [retrieved Apr. 17, 2014]. Retrieved from the Internet: <URL: http://www.ergotechgroup.com/versastand.html>. (dated 2014) 3 pages.
TMS 303 RingO Flex pack for iPad (2, $3^{rd}$ and $4^{th}$ Gen.), Product Brochure [online] [retrieved Apr. 17, 2014]. Retrieved from the Internet: <URL: http://www.vogels.com/tablet-accessories/tablet-wall-mount/tms-303-ringo-flex-pack-for-ipad-2-3rd-and-4th-gen.html>. (undated) 1 page.
TMM 500—RingO Holder for iPad Air, Product Brochure [online] [retrieved Apr. 17, 2014]. Retrieved from the Internet: <URL: http://www.vogels.com/tablet-accessories/tablet-holder/tmm-500-holder-for-ipad-5th-gen.html.22 . (undated) 1 page.
TMM 115—RingO Car Mount, Product Brochure [online] [retrieved Apr. 17, 2014]. Retrieved from the Internet: <URL: http://www.vogels.com/tablet-accessories/tablet-car-mount/tmm-115-ringo-car-mount-watch-your-tablet-in-the-car.html>(undated) 1 page.
Stacked—Wireless Charging for your . . . [online] [retrieved Feb. 1, 2016]. Retrieved from the Internet: <URL: http://www.poweredbystacked.com/>. (dated 2016) 7 pages.
Logi Circle [online] [retrieved Feb. 1, 2016]. Retrieved from the Internet: <URL: http://mnml.com/21277/8073337/our-work/logi-circle>. (dated 2016) 6 pages.
Bungajungle—Neutron S—Phone and Tablet Holder Mount . . . [online] [retrieved Feb. 26, 2015]. Retrieved from the Internet: <URL: http://www.bungajungle.com/products/neutron-s?variant=994256488>. (dated 2015) 3 pages.
Bungajungle—Neutron A Silver [online] [retrieved Feb. 26, 2015]. Retrieved from the Internet: <URL: http://www.bungajungle.com/products/copy-of-neutron-s-phone-and-tablet-holder-mount?variant=992820704>. (dated 2015) 3 pages.
Magtarget—Magnetic Charging Dock . . . [online] [retrieved Feb. 26, 2015]. Retrieved from the Internet: <URL: https://www.indiegogo.com/projects/magtarget-magnetic-charging-dock-no-more-plugs>. (dated 2015) 20 pages.
Revocharge—Wireless Case + Battery . . . [online] [retrieved Feb. 28, 2015]. Retrieved from the Internet: <URL: http://www.revocharge.com/>. (dated 2015) 4 pages.
ELE—eleMount—Silver w/caps . . . [online] [retrieved Feb. 26, 2015]. Retrieved from the Internet: <URL: http://www.elephantele.com//>. (dated 2015) 3 pages.
Logitech—[+] drive Universal dashboard/windshield mount[online] [retrieved Feb. 26, 2015]. Retrieved from the Internet: <URL: http://www.logitech.com/en-us/product/plus-drive?crid=1537>. (dated 2015) 6 pages.
Icefox—IceFox (TM) Magnetic Universal . . . [online] [retrieved Feb. 26, 2015]. Retrieved from the Internet: <URL: http://www.amazon.com/gp/product/B00L9Z5GZE/ref=s9_simh_gw_p107_d0_i9?pf_rd_m=ATVPDKIKX0DER&pf_rd_s=deskto . . . >. (dated 2015) 9 pages.
Imagnet—The Original iMagnet Cradlless . . . [online] [retrieved Feb. 26, 2015]. Retrieved from the Internet: <URL: http://www.amazon.com/gp/product/B008IOQ3K6/ref=s9_simh_gw_p107_d0_i18?pf_rd_m=ATVPDKIKX0DER&pf_rd_s=deskt . . . >. (dated 2015) 9 pages.
The Airdock—The Air Dock 2.0 [online] [retrieved Feb. 28, 2015]. Retrieved from the Internet: <URL: https://www.indiegogo.com/projects/the-air-dock-2-0>. (dated 2015) 21 pages.
Techmatte—Car Mount, TechMatte . . . [online] [retrieved Feb. 26, 2015]. Retrieved from the Internet: <URL: http://www.amazon.com/gp/product/B00OJE1SG8/ref=s9_simh_gw_p107_d0_i4?pf_rd_m=ATVPDKIKX0DER&pf_rd_s=deskto . . . >. (dated 2015) 10 pages.
DAFQCO—Smart & Easy Magnetic Car Phone Holder . . . [online] [retrieved Feb. 26, 2015]. Retrieved from the Internet: <URL: http://www.amazon.com/gp/product/B00Q8XGLA6/ref=s9_

(56) References Cited

OTHER PUBLICATIONS simh_gw_p107_d0_i6?pf_rd_m=ATVPDKIKX0DER&pf_rd_s=deskto . . . >. (dated 2015) 10 pages.
Scosche—Scosche MagicMount—Magnet . . . [online] [retrieved Feb. 26, 2015]. Retrieved from the Internet: <URL: http://www.amazon.com/gp/product/B00I608BFW/ref=s9_simh_gw_p107_d0_i5?pf_rd_m=ATVPDKIKX0DER&pf_rd_s=deskto . . . >. (dated 2015) 9 pages.
Iottie—iOttie iTap Magnetic Air Vent . . . [online] [retrieved Feb. 26, 2015]. Retrieved from the Internet: <URL: http://www.amazon.com/gp/product/B00Q3G8LPQ/ref=s9_simh_gw_p107_d0_i2?pf_rd_m=ATVPDKIKX0DER&pf_rd_s=deskt . . . >. (dated 2015) 13 pages.
My Gadget Room—Slimo—wireless portable iPhone charger . . . [online] [retrieved Feb. 26, 2015]. Retrieved from the Internet: <URL: https://www.kickstarter.com/projects/838381937/slimo-charge-your-iphone5-no-cases-no-cables-requi . . . >. (dated 2015) 16 pages.
Flexcharger—FlexCharger The World's Most Versatile Charger [online] [retrieved Feb. 28, 2015]. Retrieved from the Internet: > URL: https://www.indiegogo.com/projects/flexcharger-the-world-s-most-versatile-charger>. (dated 2015) 34 pages.

* cited by examiner

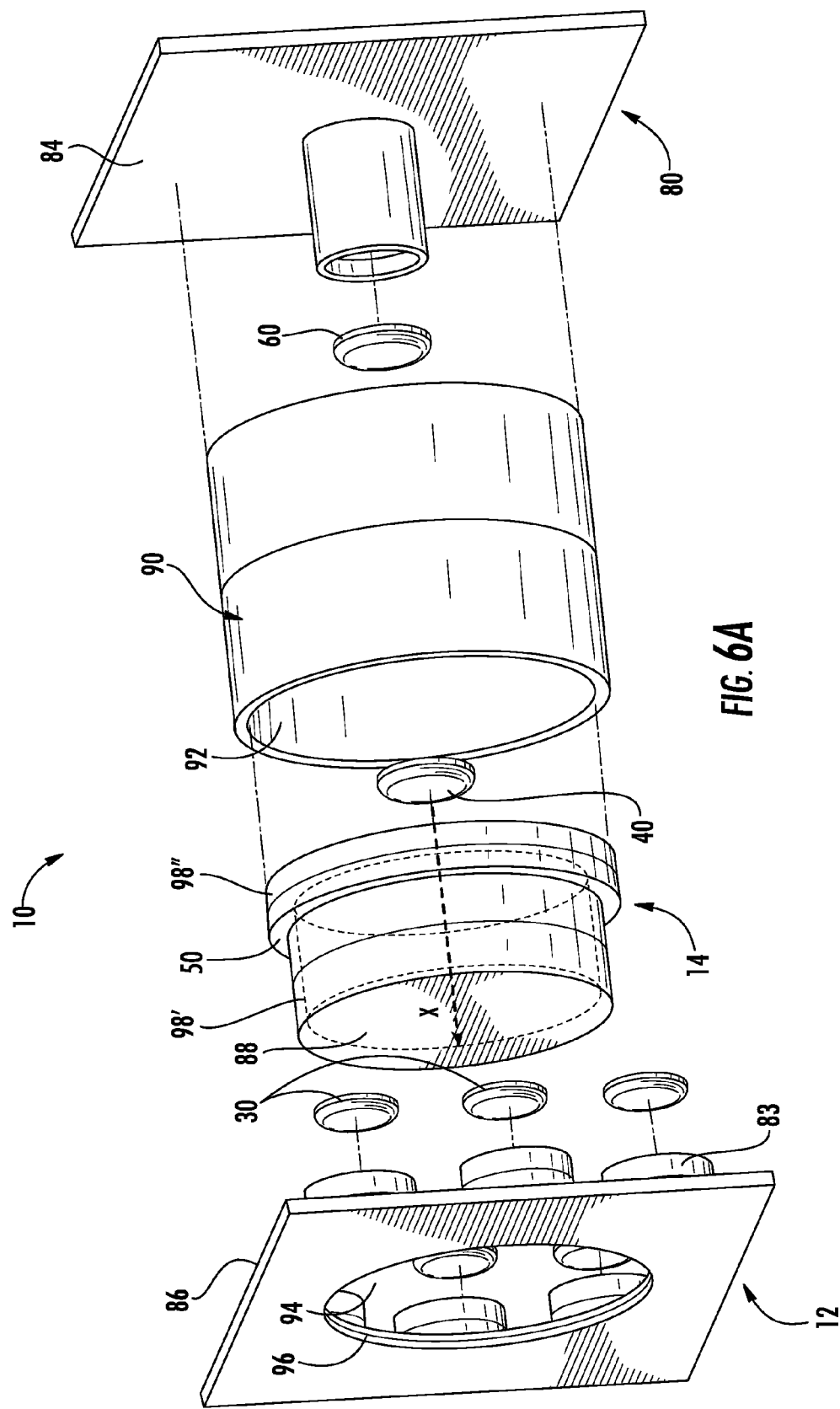

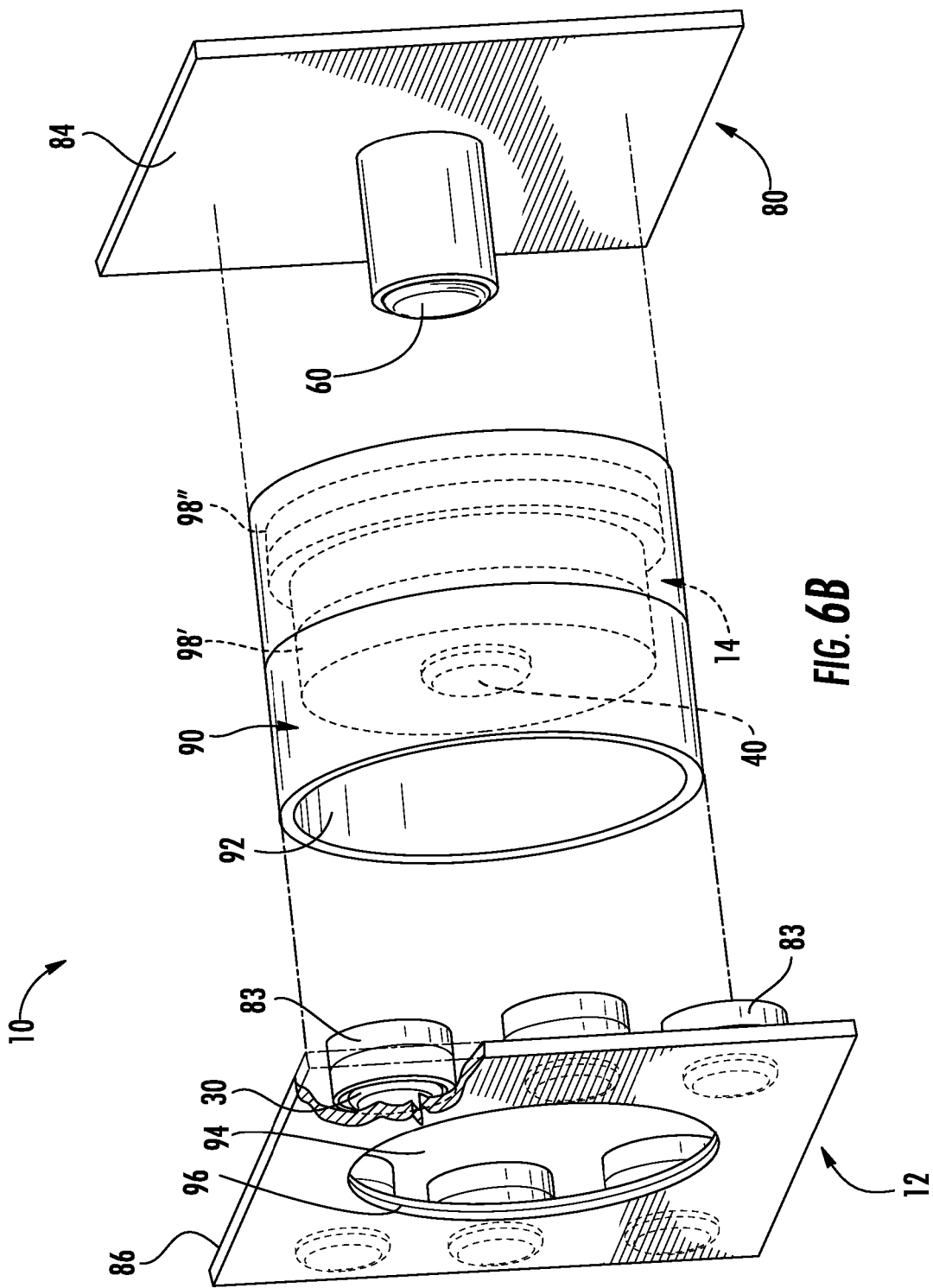

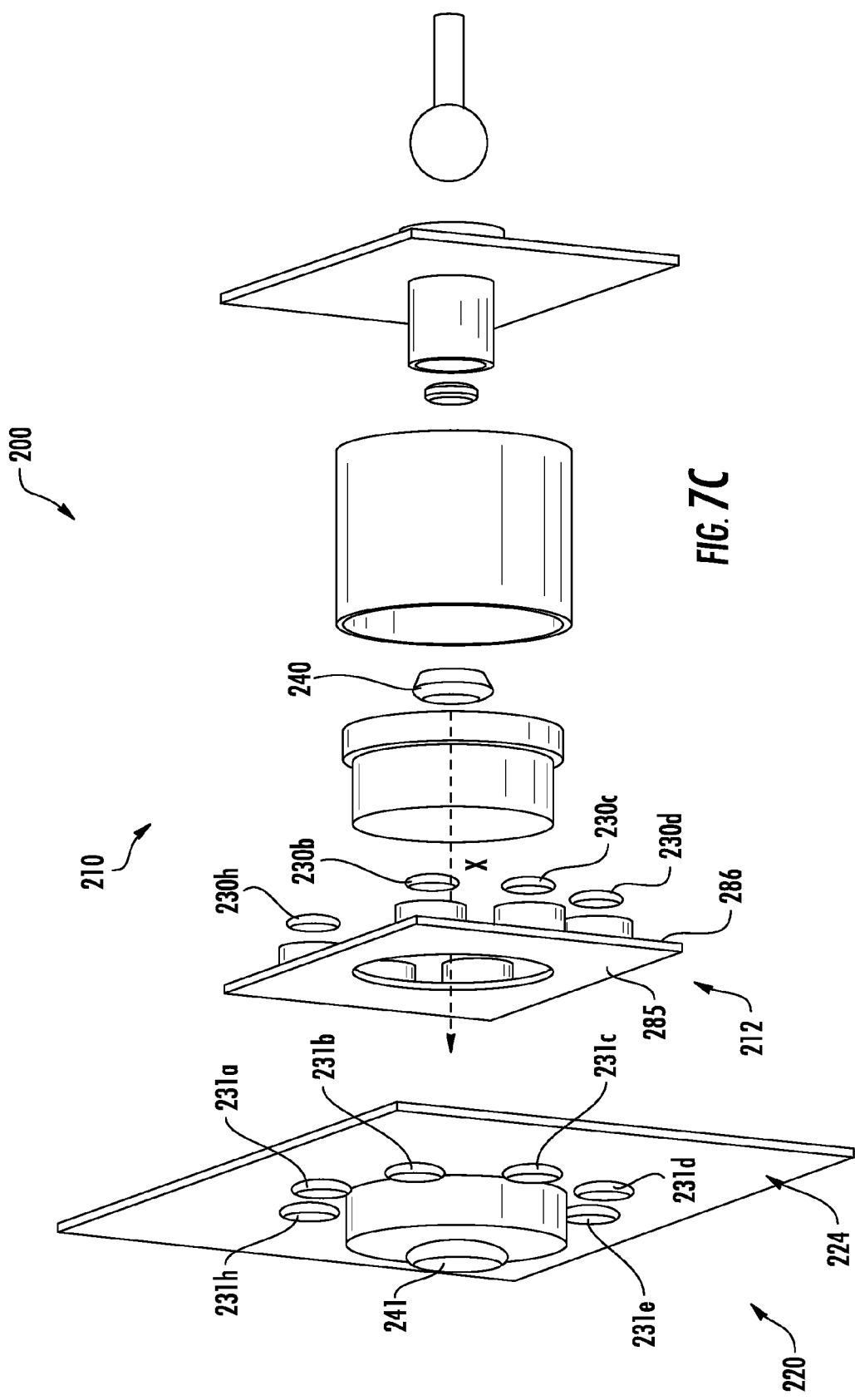

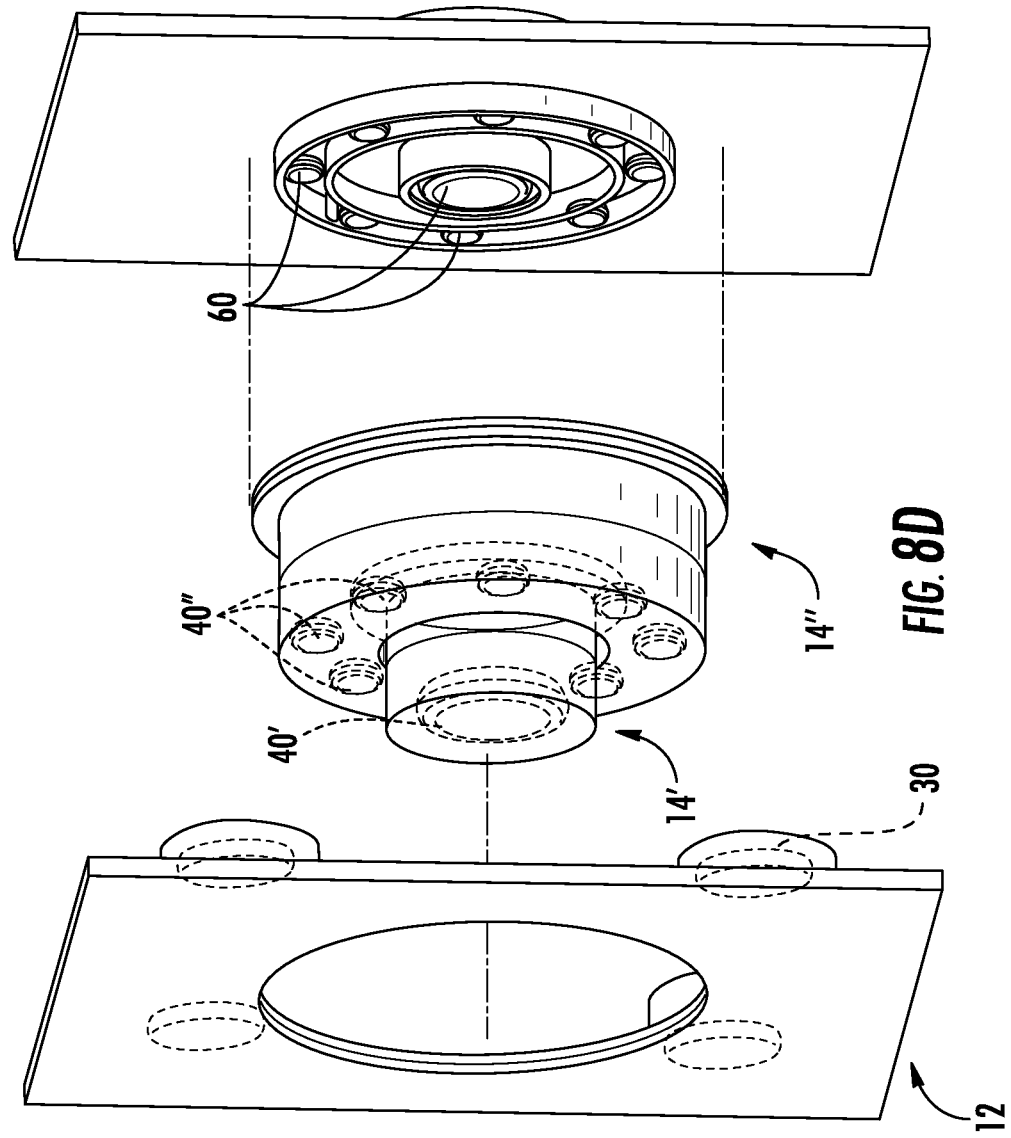

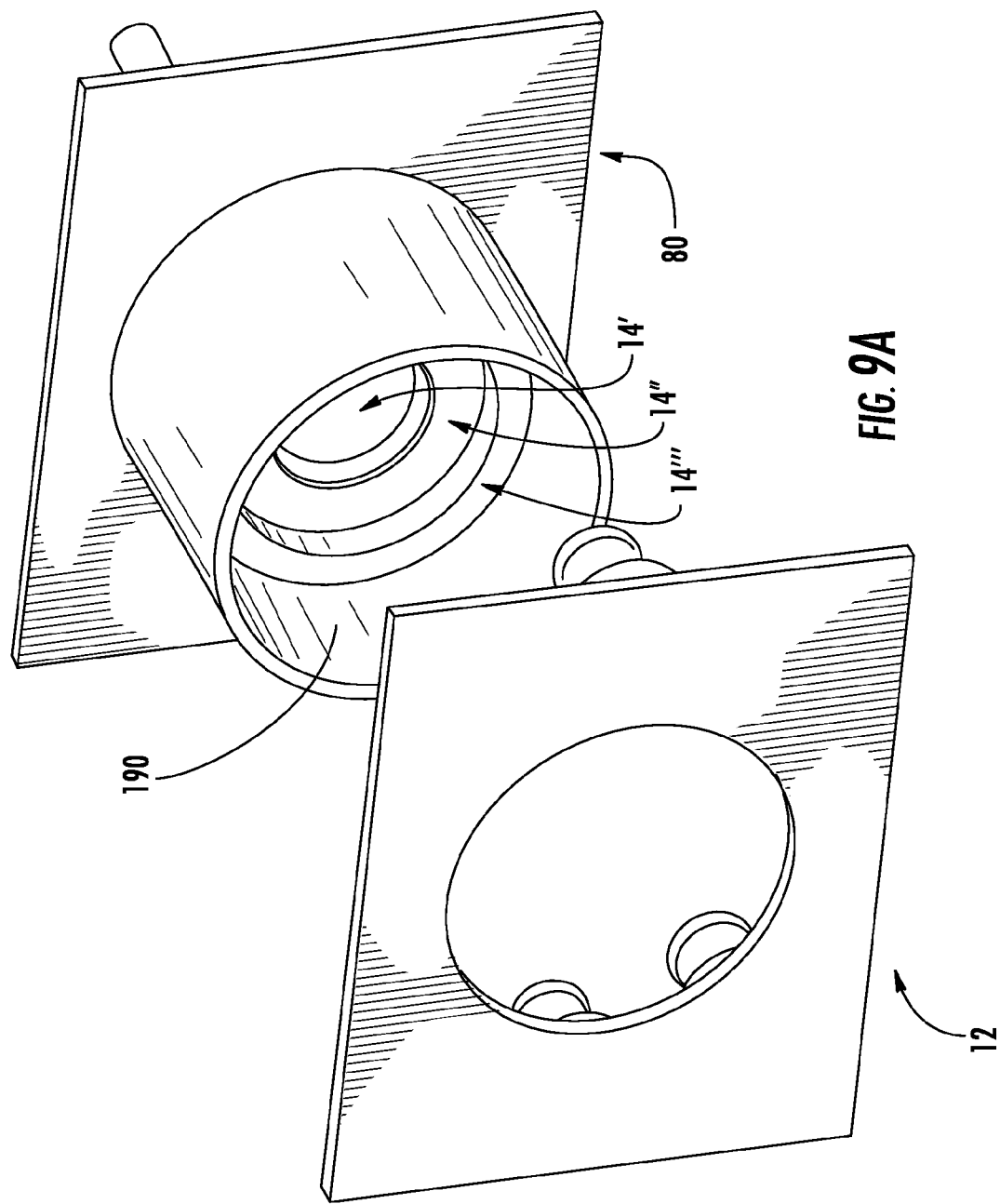

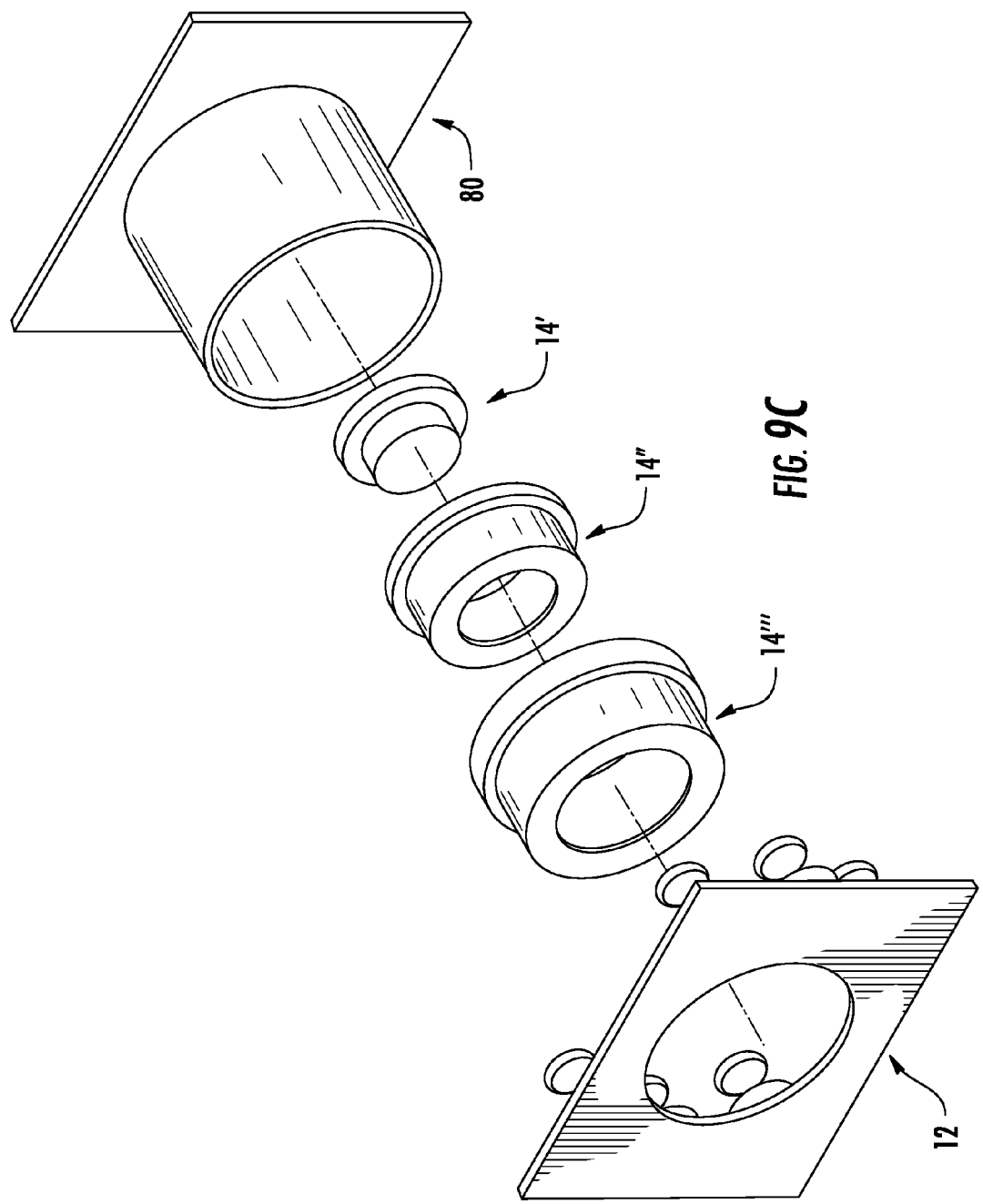

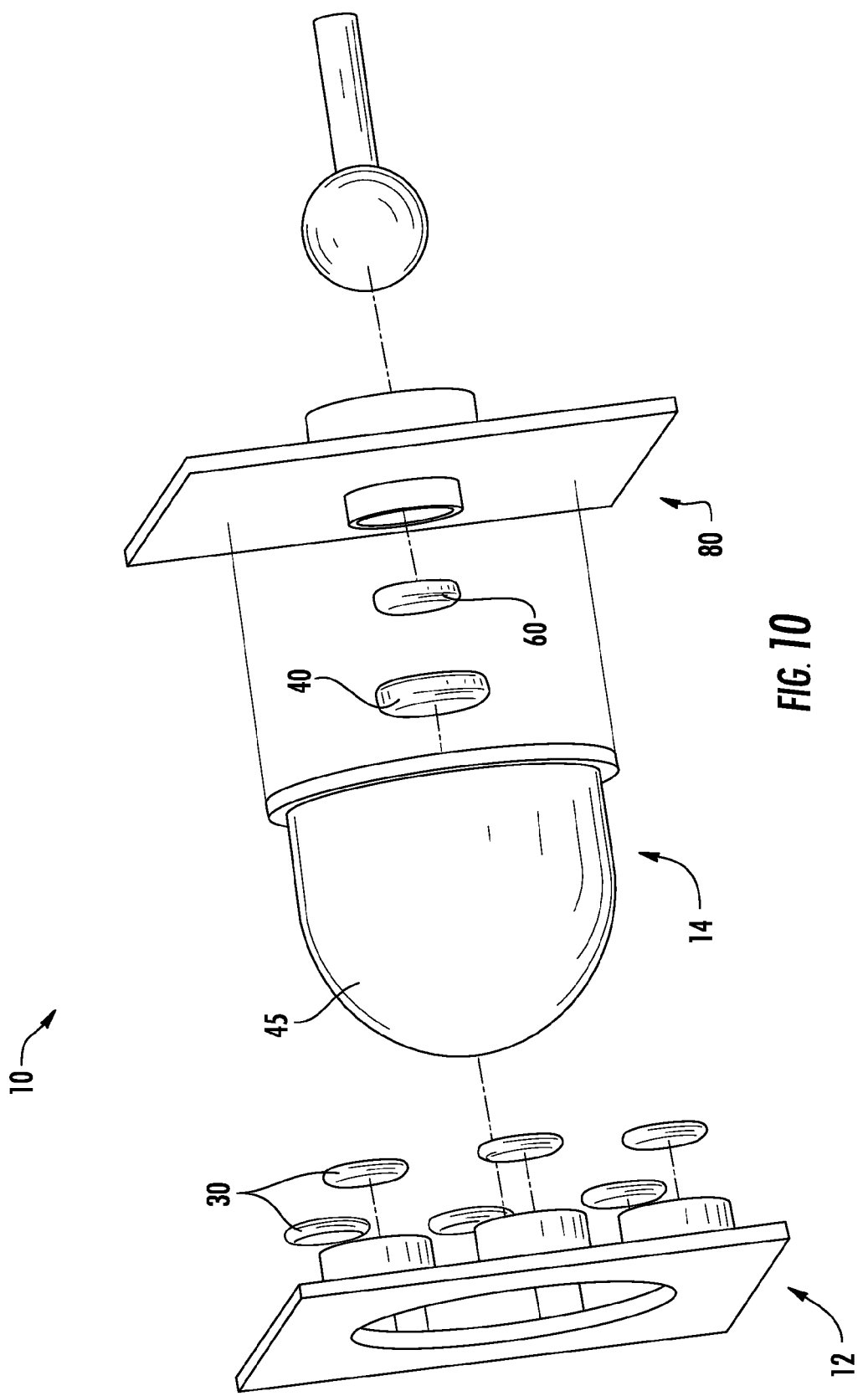

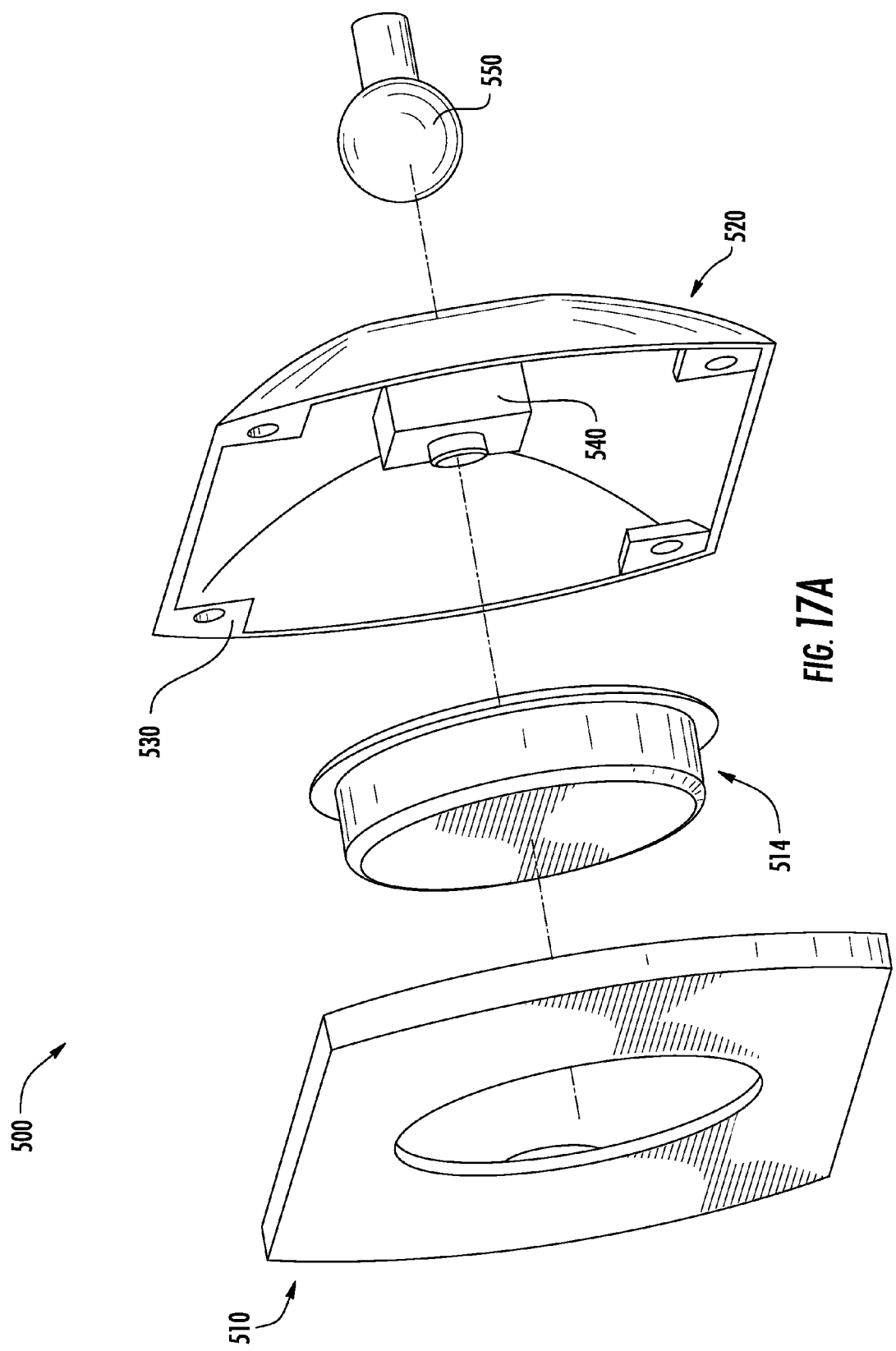

MOUNTING APPARATUS

CROSS-REFERENCE TO RELATED APPLICATIONS

This application claims the benefit of U.S. Provisional Application No. 61/798,054 entitled "Mounting Apparatus," filed Mar. 15, 2013, the contents of which are incorporated herein in their entirety.

FIELD OF THE INVENTION

The present invention relates generally to methods, systems, and apparatuses for releasably engaging multiple bodies. In particular, various mechanisms for attaching and releasing objects in stages are described.

BACKGROUND

Numerous solutions exist for attaching, connecting, or otherwise joining two or more objects, as there are many reasons objects may need to be attached. Fewer solutions also provide mounting functionality.

Potentially mountable objects make up a variety of sizes, shapes, and weights, so common mounting methods vary widely in form and function. Generally, available mounting means require mechanical fasteners for attaching an object particularly for relatively large or heavy objects and often also require tools and installation time. Toolless mounting methods, such as those that rely on a snap-in mechanism, are faster but may require a user to apply precise and, often, concentrated pressure to the object during mounting. Similar intervention may also be required for release of the object. Quick-mount solutions, such as suction mounts and magnetic mounts, are typically useful for relatively light objects, but these mounts are often relatively insecure and are more prone to unintentional disengagement than are the aforementioned means. Additionally, if configured for heavier objects or to provide greater security, quick-mount solutions require a greater holding force than is necessary for attachment alone in order to bear the weight of the object, and such strong holding forces may cause users unnecessary difficulty in releasing or dismounting the object.

Accordingly, there is a need in the art for simple, scalable, and cost-effective apparatuses and systems for attaching and/or mounting objects of various sizes, shapes, and weights to different mounting surfaces that allow for quick and easy attachment and release of the objects.

BRIEF DESCRIPTION OF THE DRAWINGS

Figure 1:
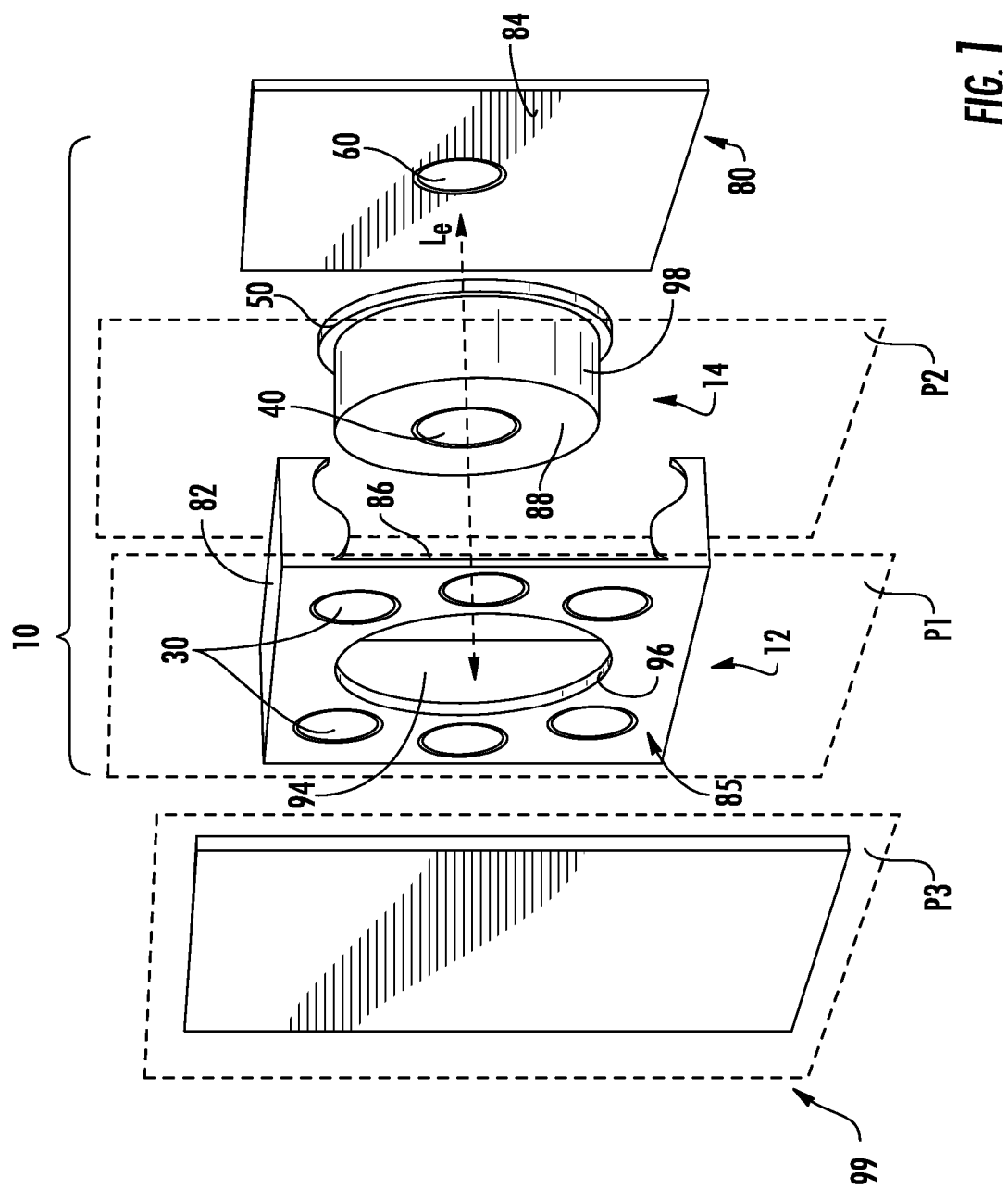
Figure 2:
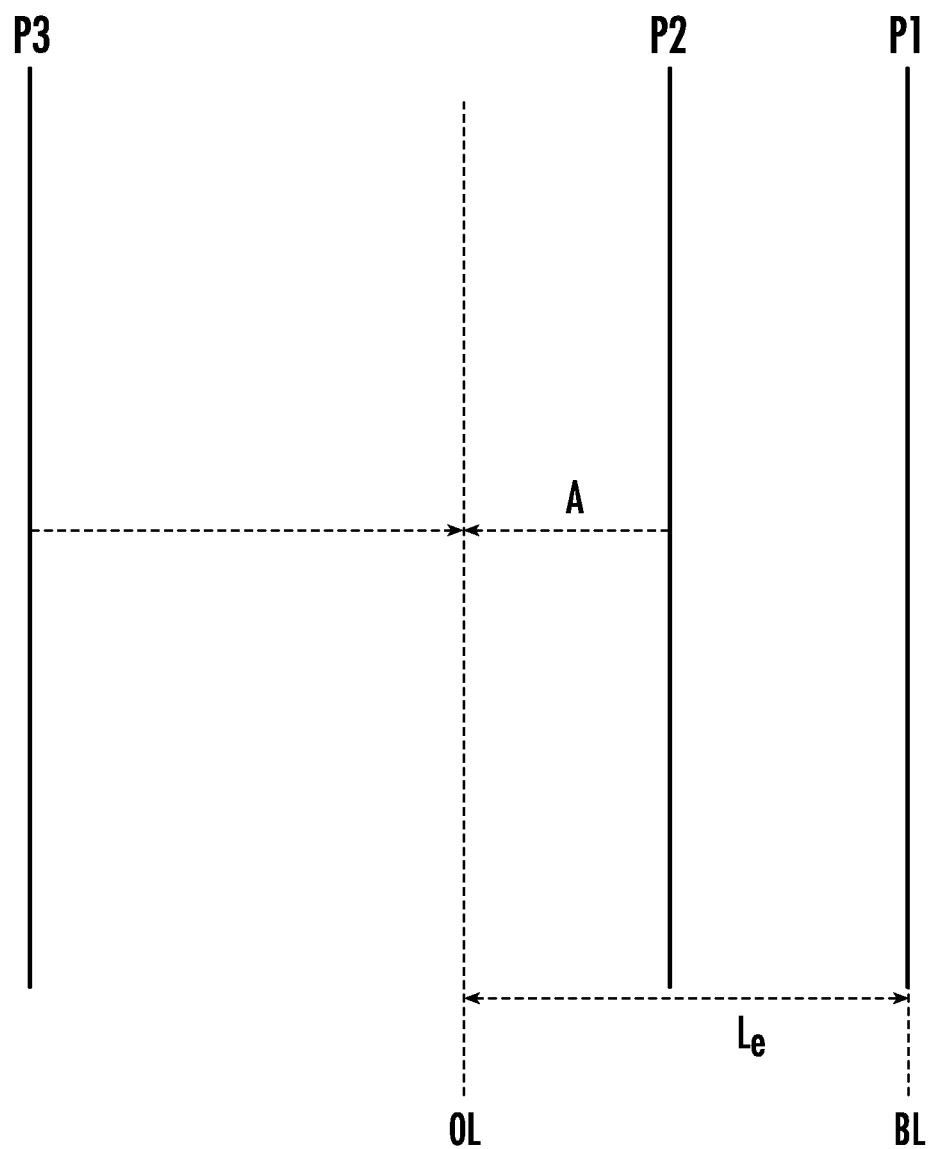
Figure 3:
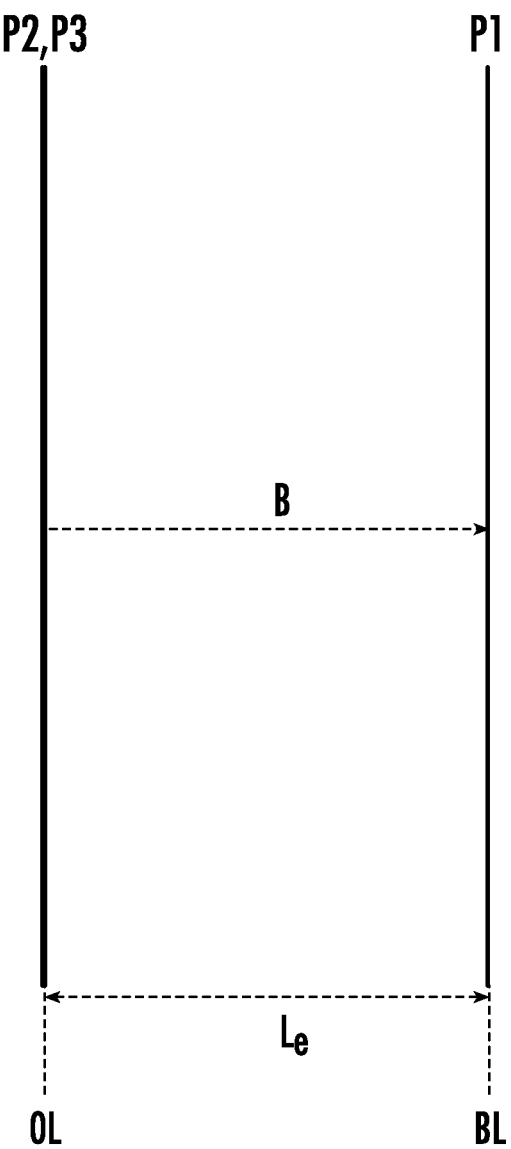
Figure 4:
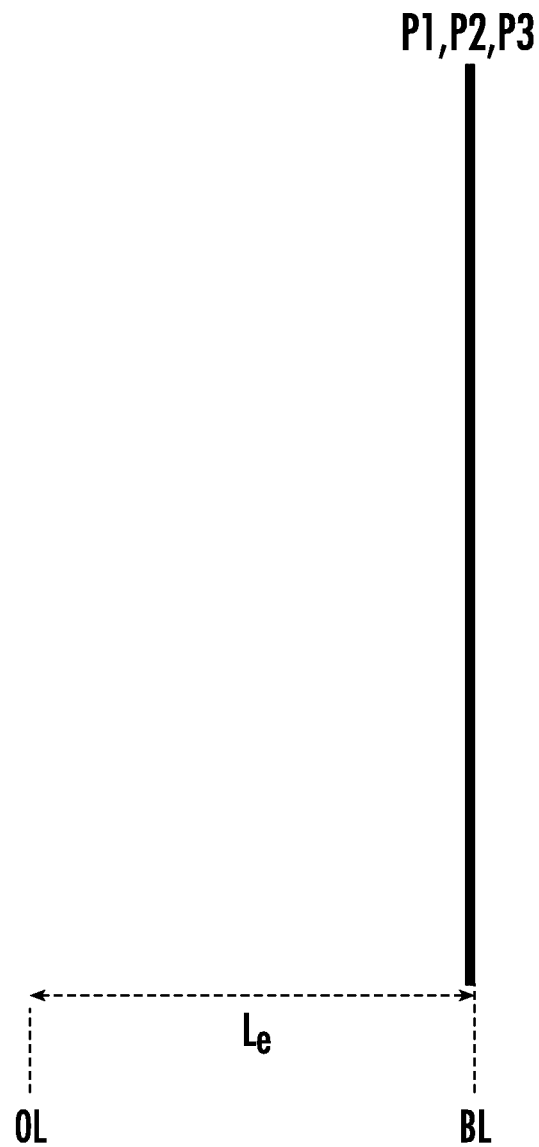
Figure 5:
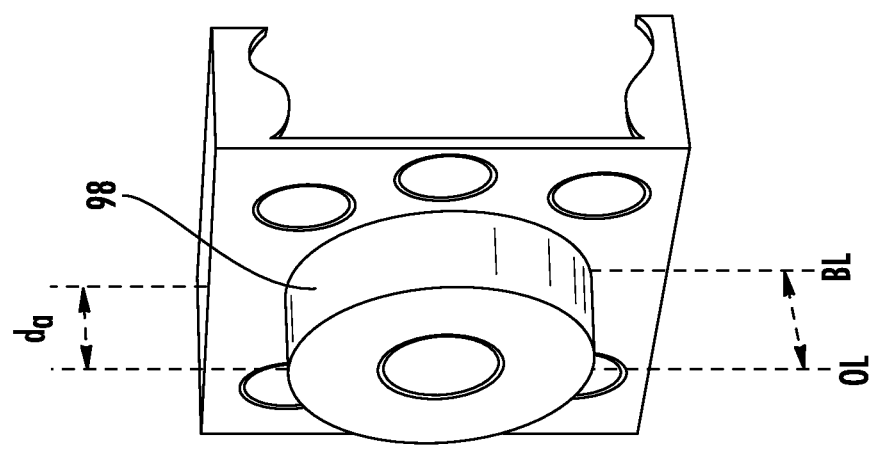
Figure 6C:
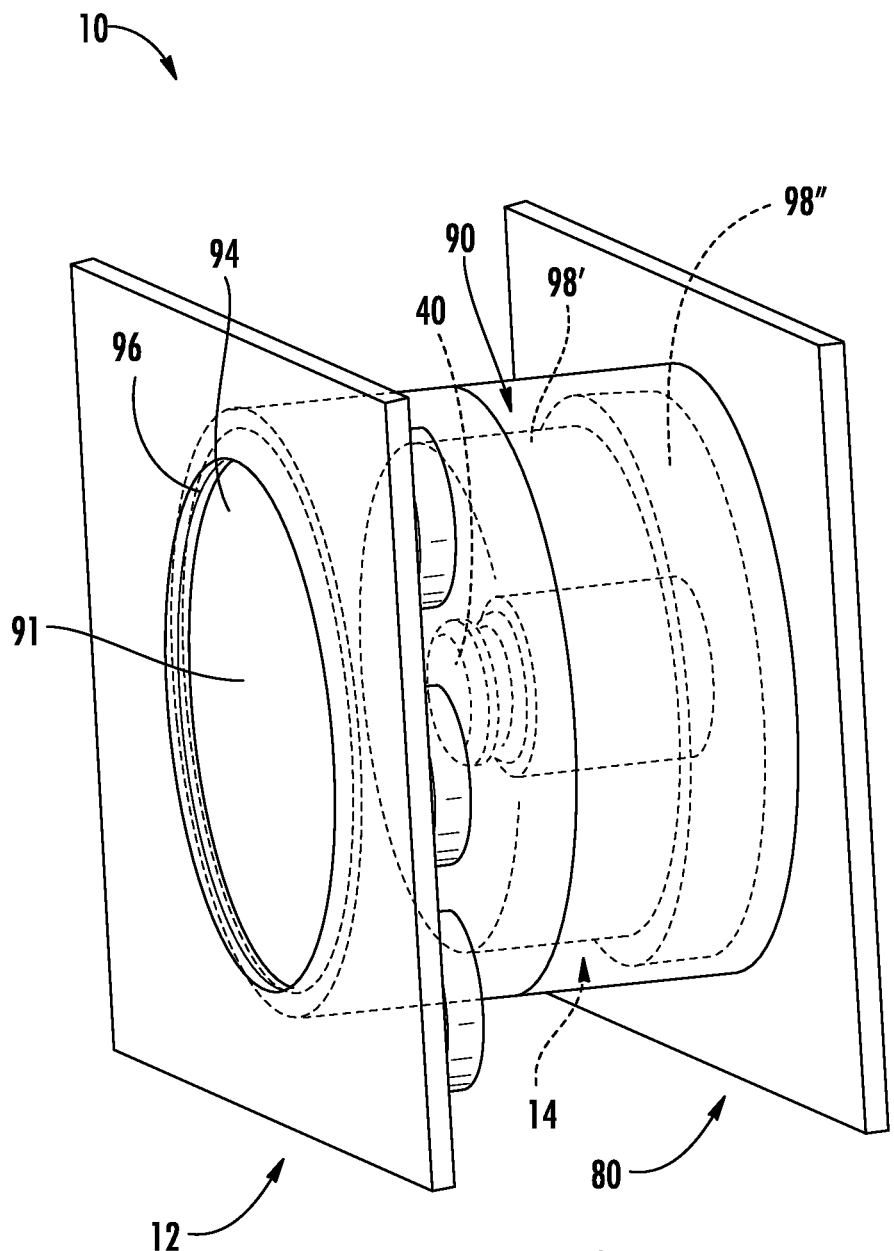
Figure 7A:
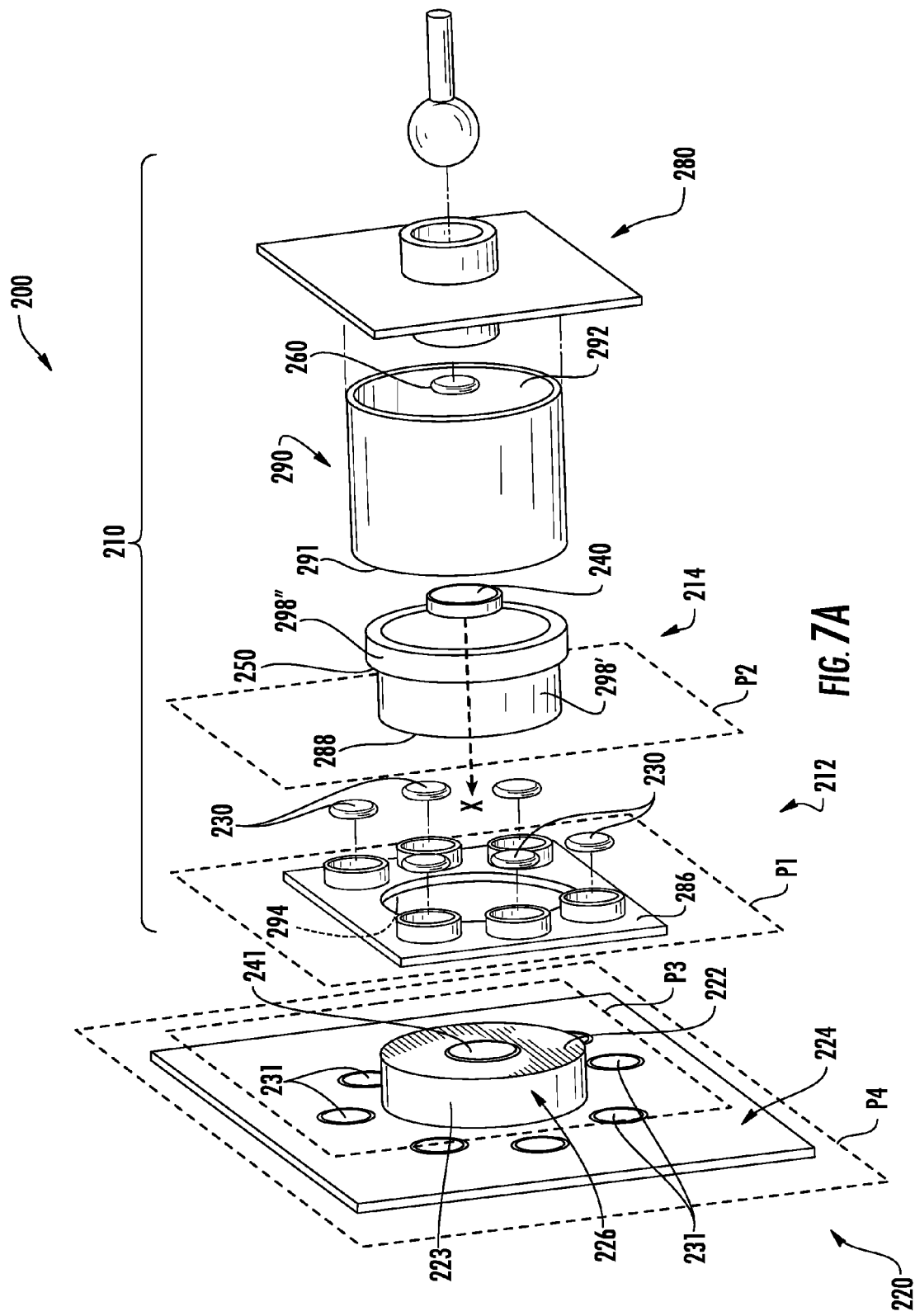
Figure 7B:
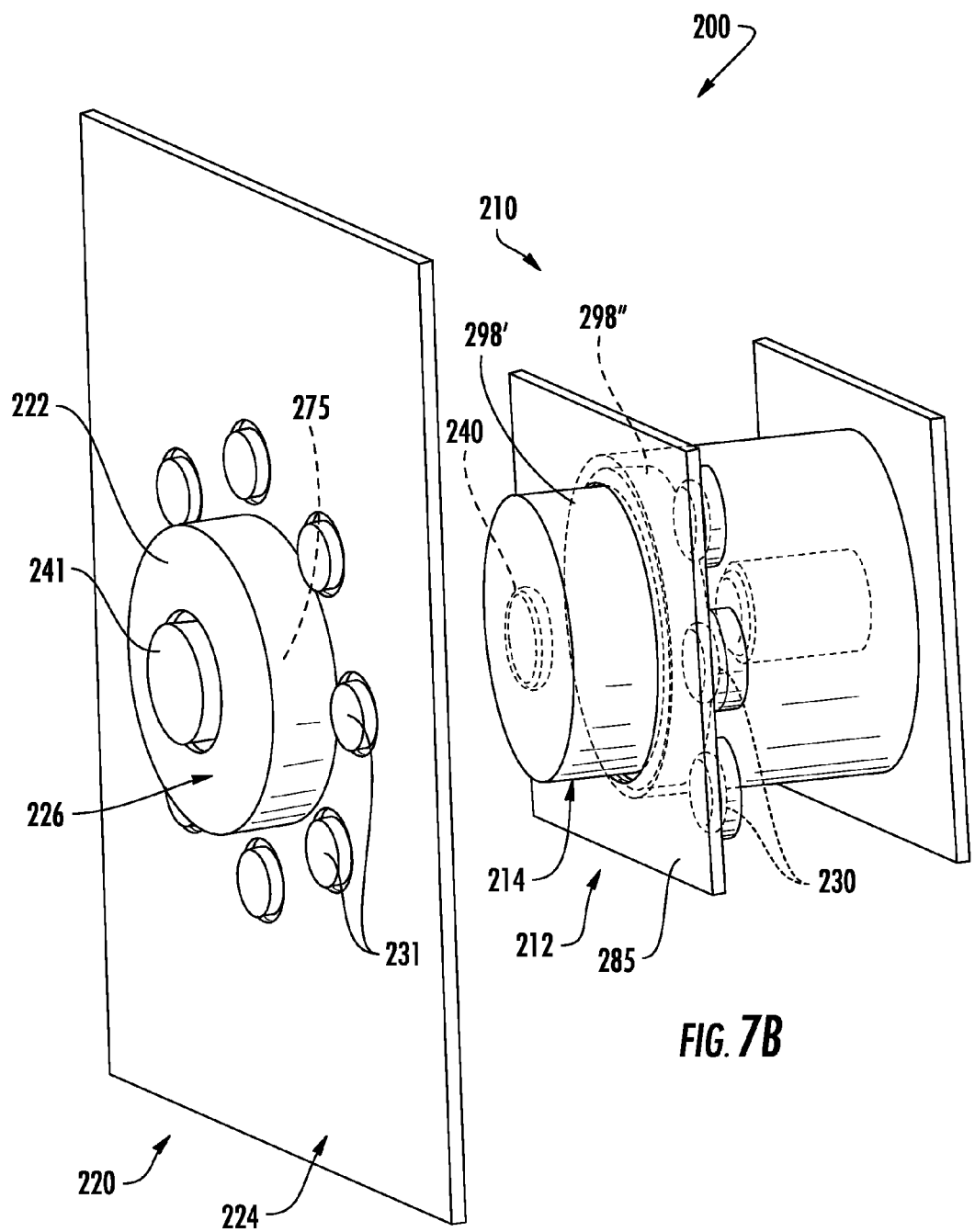
Figure 9B:
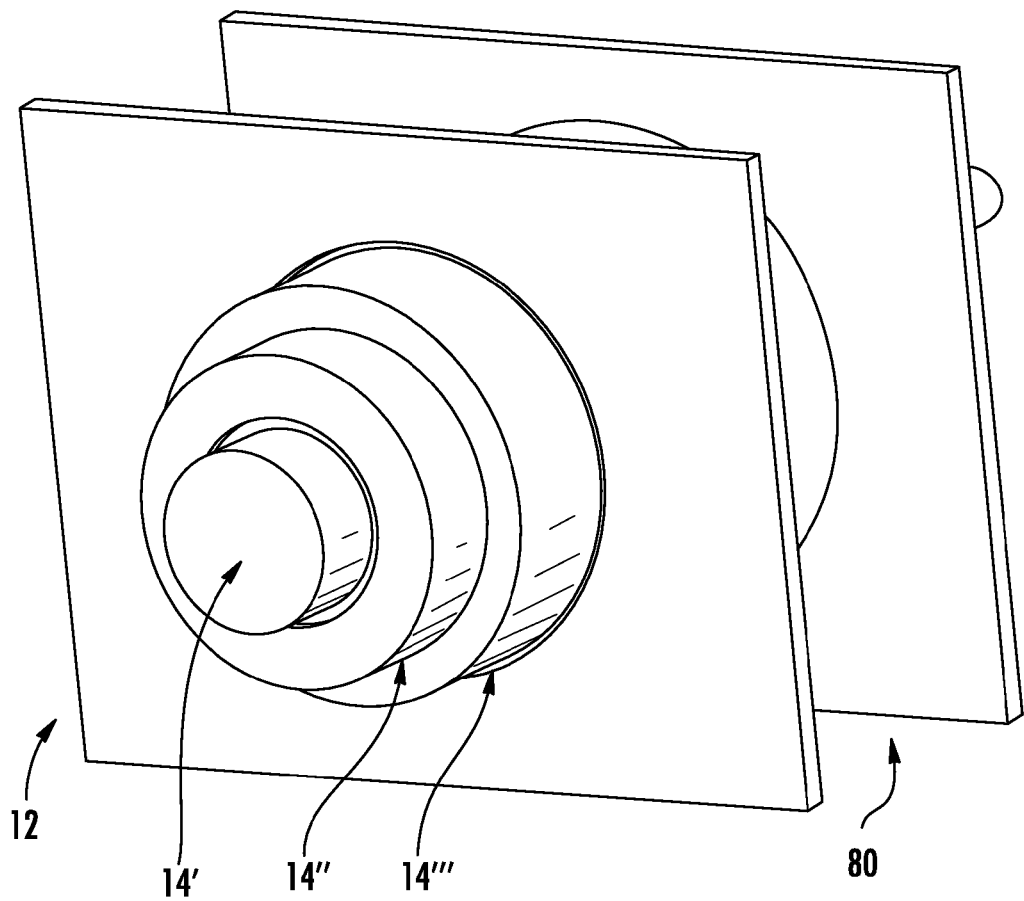
Figure 11A:
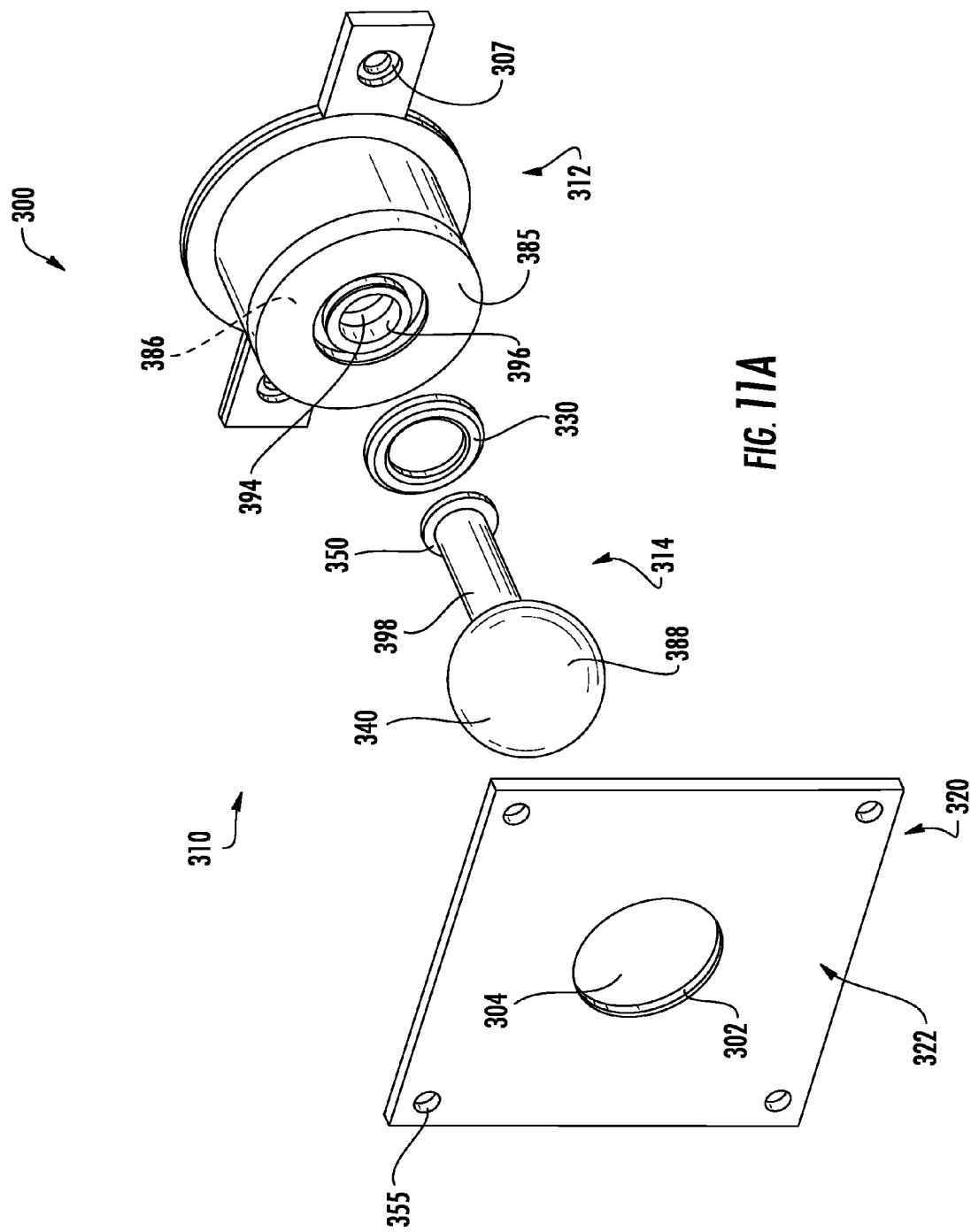
Figure 11B:
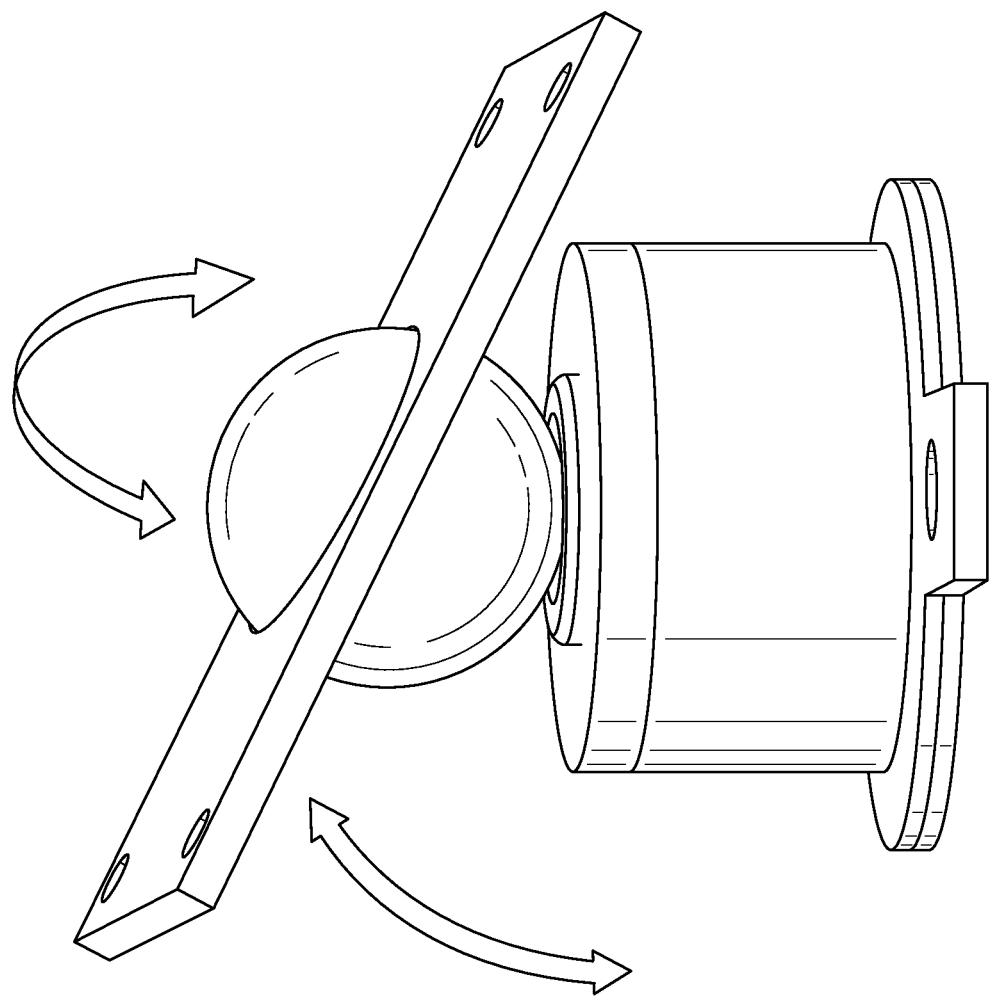
Figure 12:
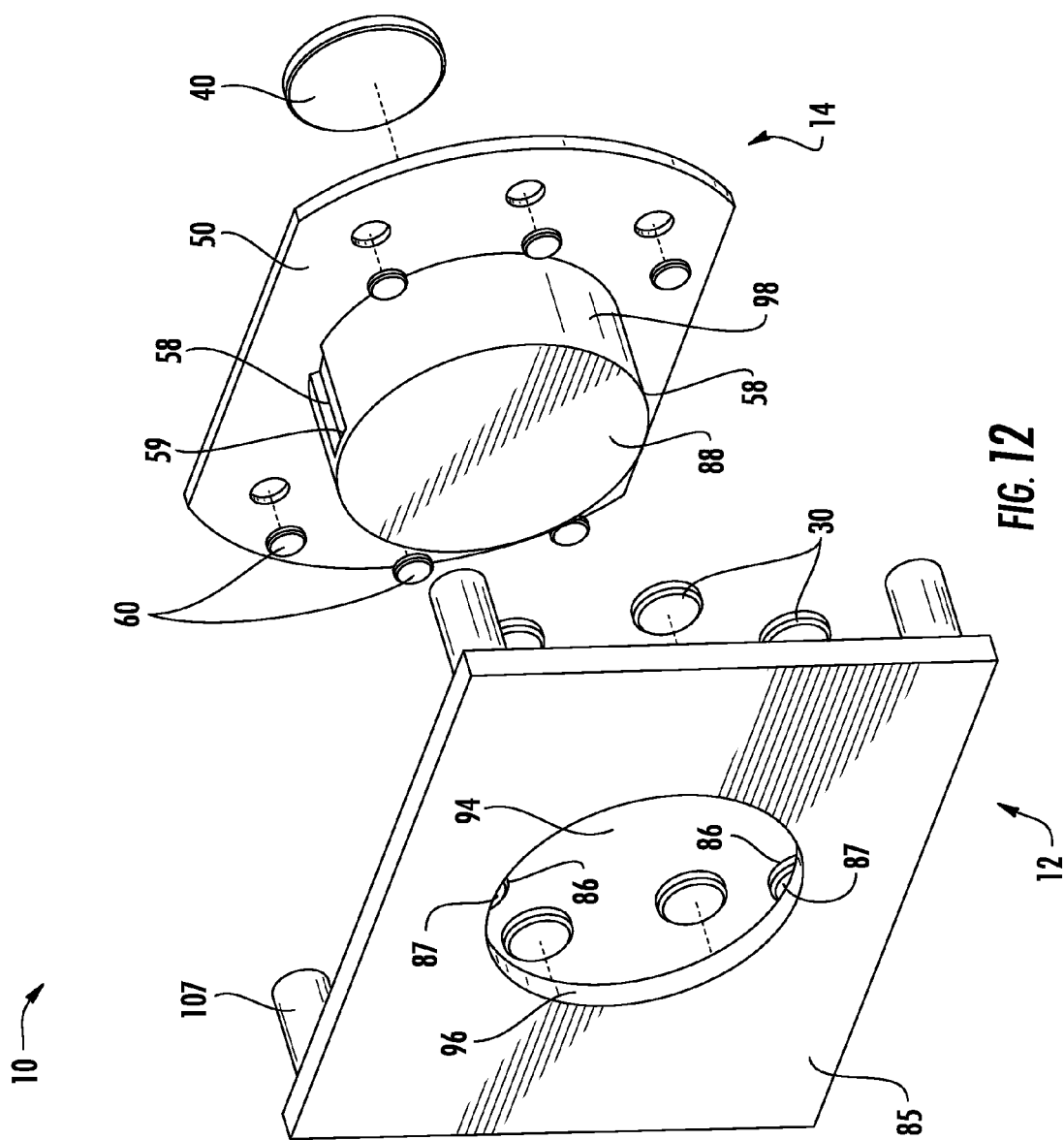
Figure 13:
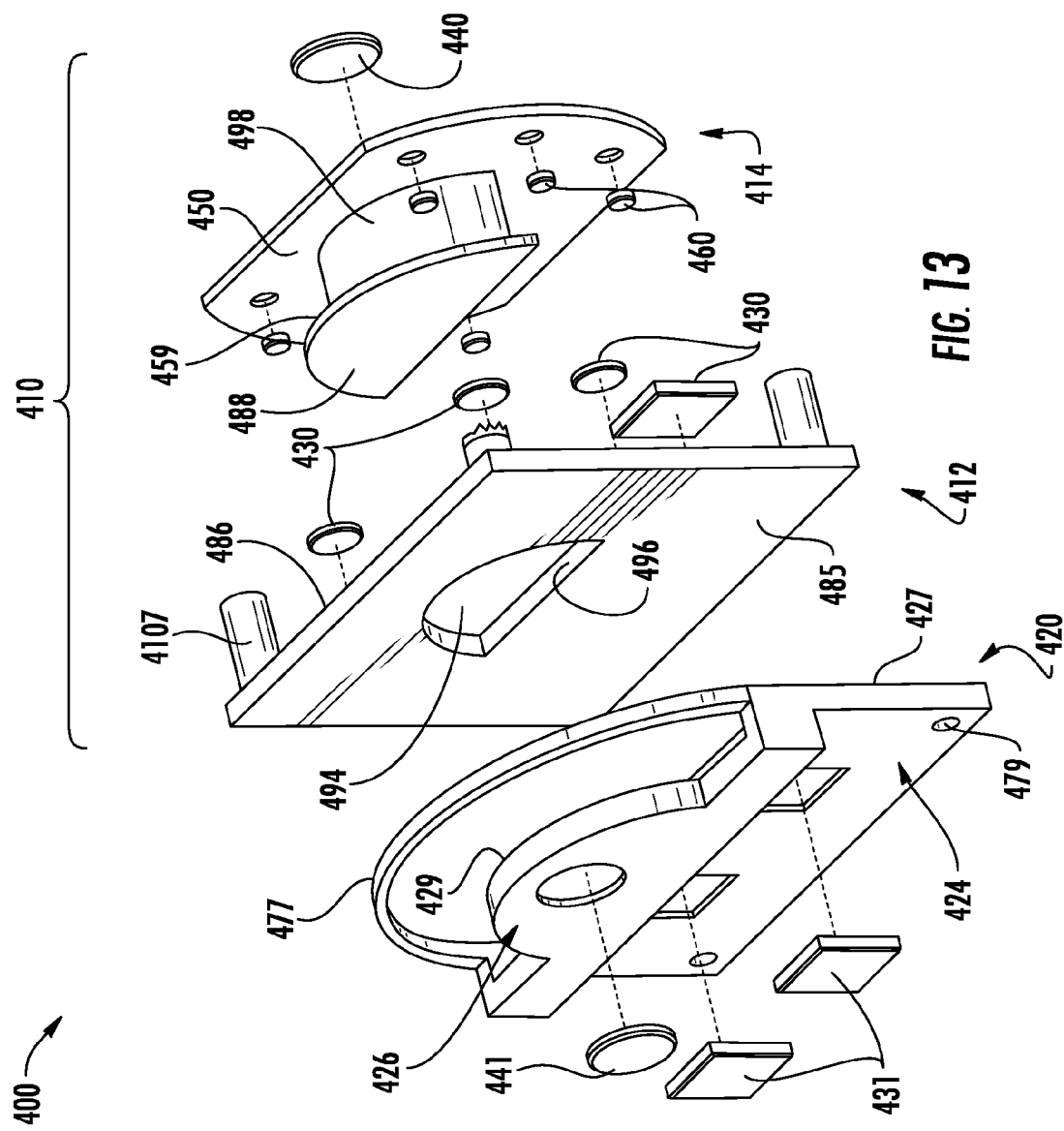
Figure 14:
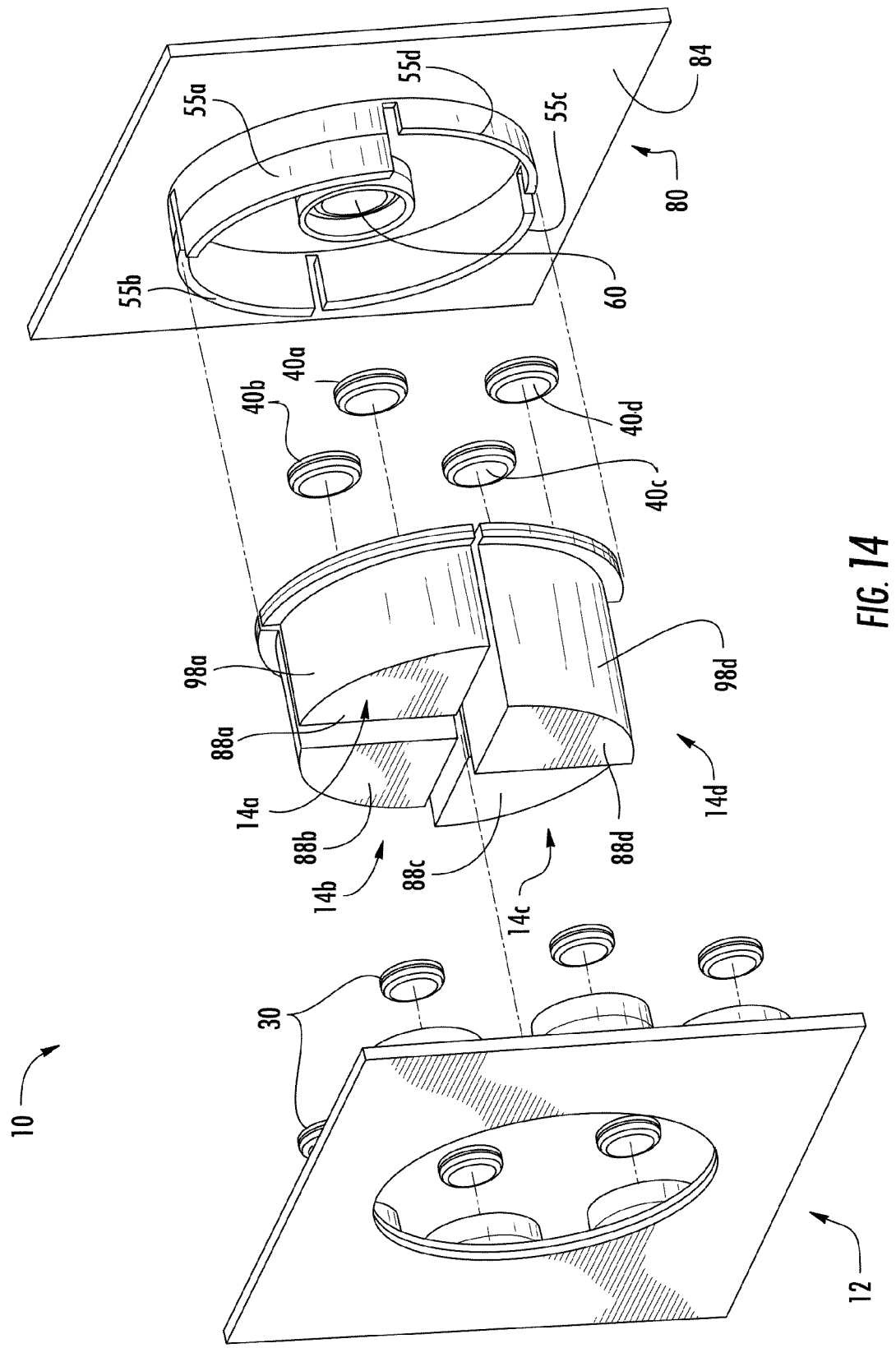
Figure 15:
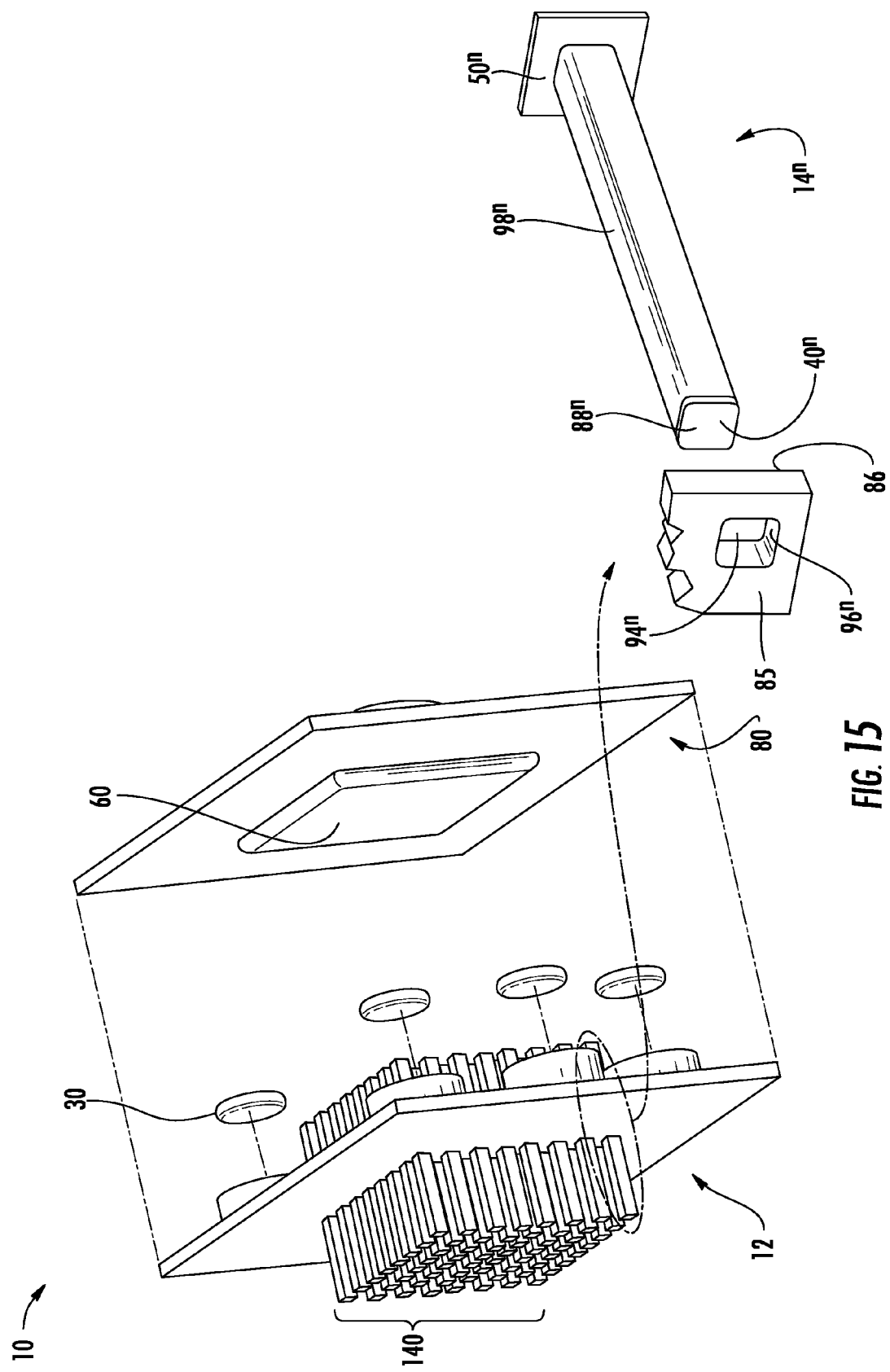
Figure 16A:
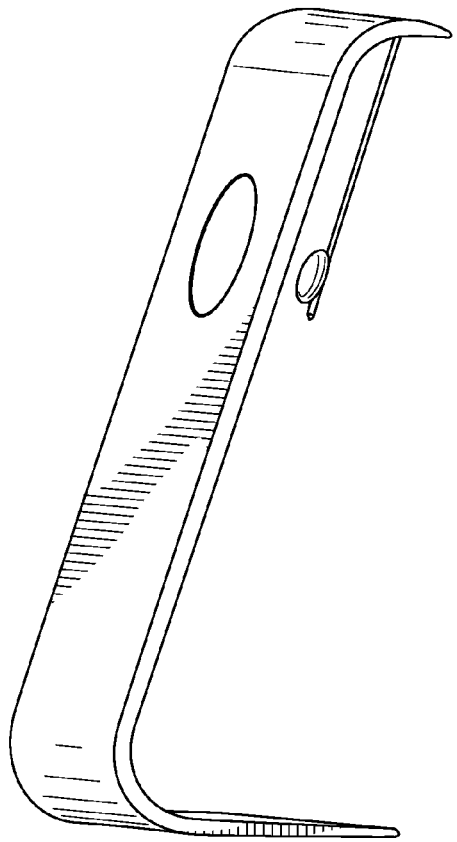
Figure 16B:
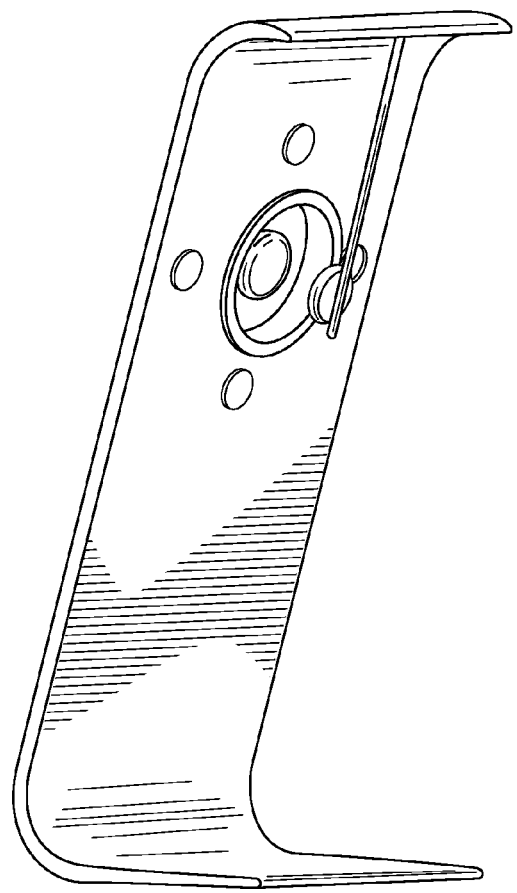
Figure 17B:
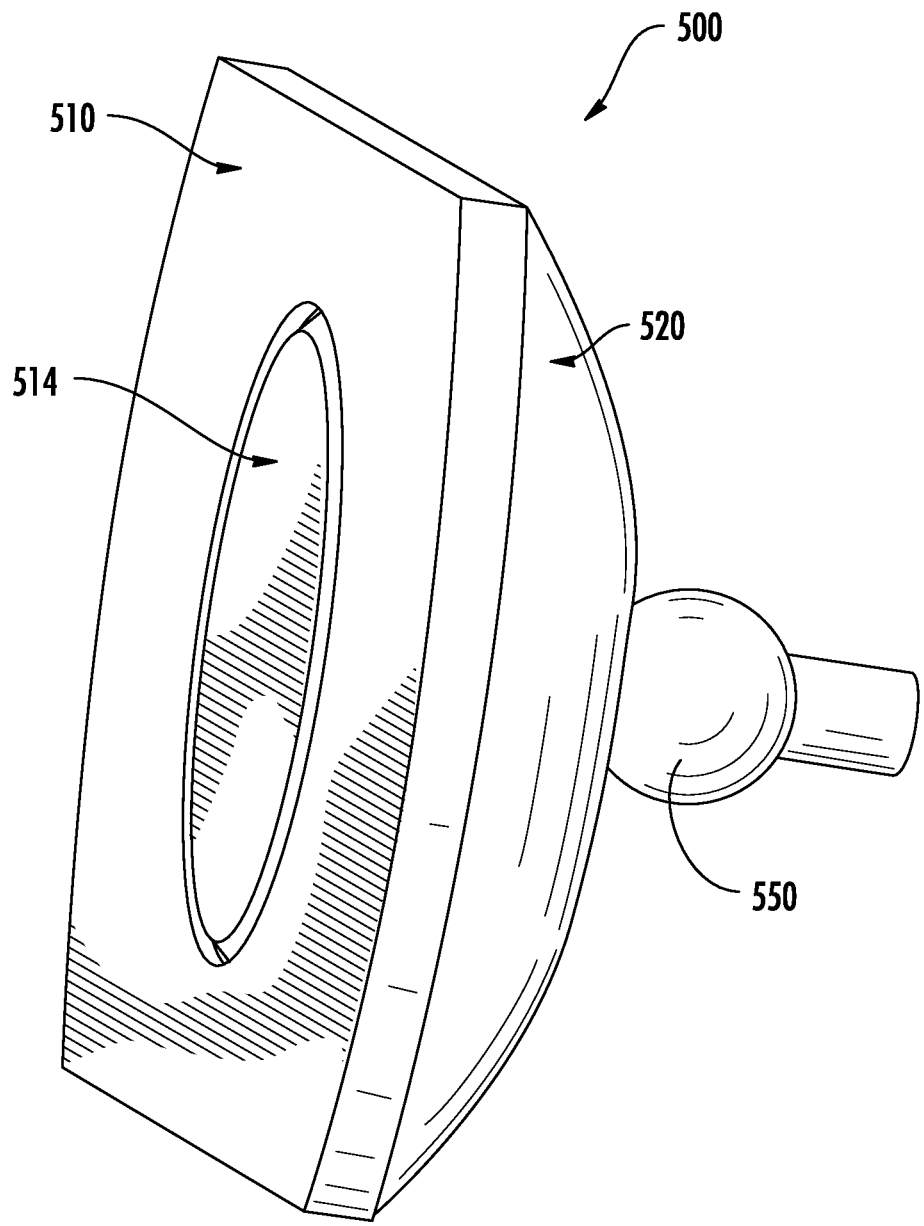
Figure 18:
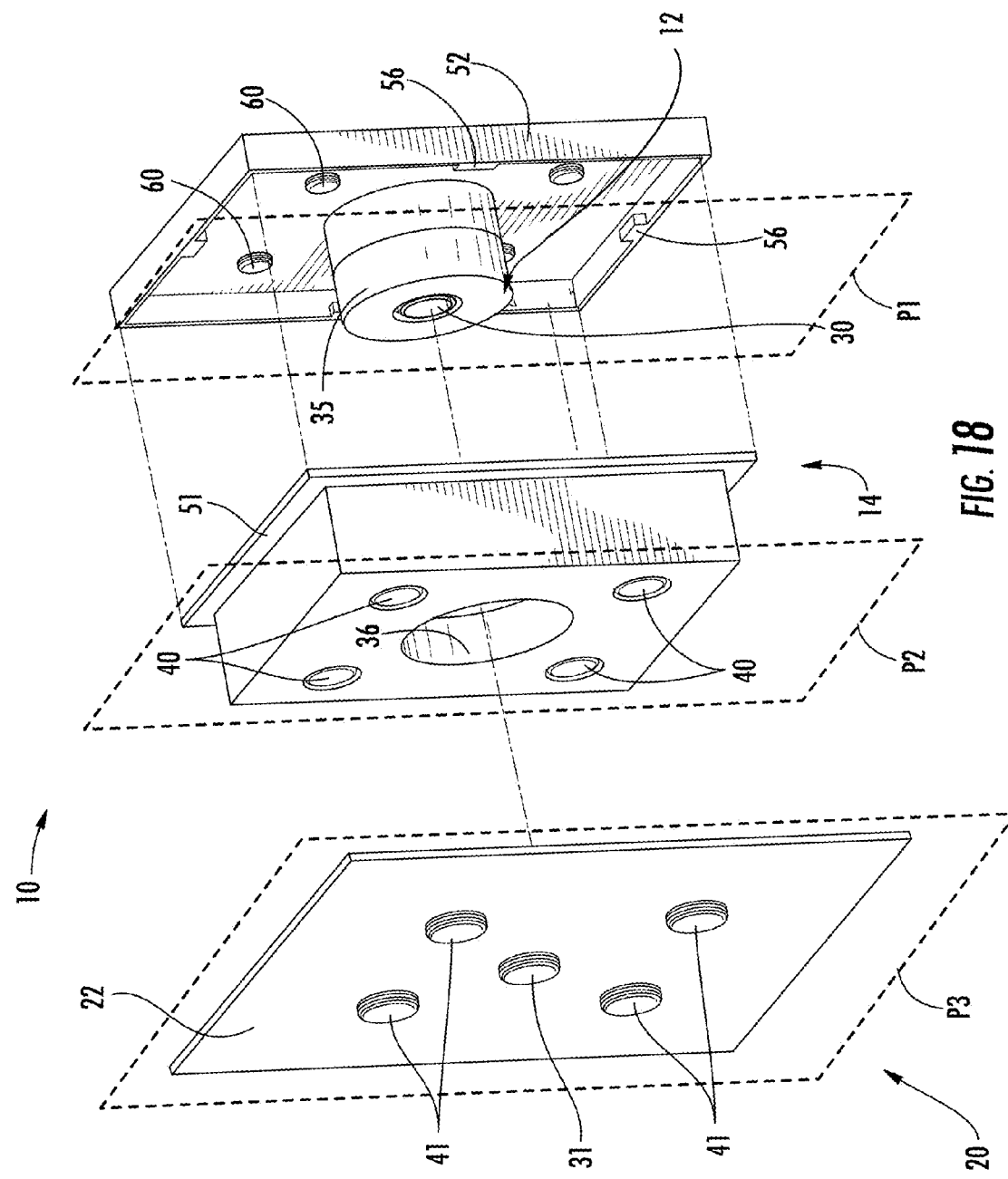

Having thus described the invention in general terms, reference will now be made to the accompanying drawings, which are not necessarily drawn to scale, and wherein:

FIG. 1 shows an exploded view of a mounting apparatus and a nominal object in an unengaged configuration according to an exemplary embodiment of the present invention;

FIGS. 2-4 illustrate relative movements of planes according to an exemplary embodiment of the present invention;

FIG. 5 shows an exploded view of a mounting apparatus and a nominal object in an unengaged configuration according to another exemplary embodiment of the present invention;

FIGS. 6A-6C illustrate a mounting apparatus according to another exemplary embodiment of the present invention;

FIGS. 7A-7C illustrate a system for mounting an object to a mounting surface comprising a mounting apparatus and an object interface according to another exemplary embodiment of the present invention;

FIGS. 8A-8D illustrate a mounting apparatus according to another exemplary embodiment of the present invention;

FIGS. 9A-9C illustrate a mounting apparatus according to another exemplary embodiment of the present invention;

FIG. 10 illustrates a mounting apparatus according to another exemplary embodiment of the present invention;

FIGS. 11A-11B illustrate a mounting apparatus and an object interface according to another exemplary embodiment of the present invention;

FIG. 12 illustrates a mounting apparatus according to another exemplary embodiment of the present invention;

FIG. 13 illustrates a system for mounting an object to a mounting surface comprising a mounting apparatus and an object interface according to another exemplary embodiment of the present invention;

FIG. 14 illustrates a mounting apparatus according to another exemplary embodiment of the present invention;

FIG. 15 illustrates a mounting apparatus according to another exemplary embodiment of the present invention;

FIGS. 16A-16B illustrate a mounting apparatus according to another exemplary embodiment of the present invention;

FIGS. 17A-17B illustrate a mounting apparatus according to another exemplary embodiment of the present invention; and FIG. 18 illustrates a mounting apparatus according to another exemplary embodiment of the present invention.

DETAILED DESCRIPTION OF SELECTED EMBODIMENTS

Some embodiments of the present invention will now be described more fully hereinafter with reference to the accompanying drawings, in which some, but not all, embodiments of the invention are shown. Indeed, various and diverse embodiments are feasible within the scope and spirit of the invention and may be applied broadly in many technical fields across several industries for uses other than those outlined herein. Thus, the invention should not be construed as limited to the embodiments set forth herein; rather, these embodiments are provided so that this disclosure will satisfy applicable legal requirements.

The following disclosure generally describes a method for releasably engaging one physical body with another, as well as associated systems and apparatuses. For the purposes of explanation, the invention will be described in terms of a mounting process. While terminology within this context (e.g., mounting, mounting apparatus, etc.) is useful for explanatory purposes, the chosen course of explanation should not be construed to limit the scope of the described method or embodiments.

Accordingly, it should be noted that an embodiment termed a mounting apparatus in this disclosure may be functional for purposes other than mounting. For example, some mounting apparatuses described herein may be applied separately to two or more bodies (e.g., like embodiments of the invention applied to each body), and the apparatuses may be attached one to the other to join the bodies together. In such a scenario, the invention may be regarded as an attachment interface.

Additionally, like embodiments (such as those described above) may be configured with connectors that are compatible when joined one to the other so that joining the apparatuses may facilitate a connection between the bodies. Consequently, the invention may be thought of as a connection interface in certain contexts.

Moreover, some embodiments of the invention, which may be configured in a like or similar manner to some embodiments described herein, may themselves be mounted to other mounting apparatuses not described herein, thus enhancing the functionality of the known mounting apparatuses. Thus, in some situations, the invention may be considered to be a mounting interface.

In consideration of the variations outlined above, which are not exhaustive and should not be interpreted to limit the scope of the invention but instead are meant to illustrate the broad application and usefulness of the applied method, further description herein will use terminology within the context of a mounting process to facilitate explanation of the invention. For the purposes of this disclosure, the term "object" is used to refer to any physical body that is meant to engage a mounting apparatus. The term makes no reference to the role of the object in the mounting process. For example, a wall may be an object (e.g., it is meant to engage a mounting apparatus), but a wall cannot be, itself, mounted as an object in the traditional sense. In such contexts, the object may be described as an object interface that is capable of attaching to the wall so that the wall may engage the apparatus. In some contexts, the meaning of the term object may be extended to include an item or device a user ultimately wishes to mount (e.g., a television, painting, mobile phone, tablet computer, shelving unit, etc.).

The term "engagement" refers to the magnetic hold established between two or more components when a stage of attachment is complete (continuing until a corresponding stage of disengagement occurs) or when an object has attached to an apparatus via at least one completed stage of attachment (this may be referred to as, e.g., partial engagement), and the term may also refer to physical contact between two surfaces in some cases. The term "total engagement force" refers to a targeted (e.g., sought, required, etc.), and substantially peak, net magnetic force achieved between an object (or object interface) and an apparatus. The terms "attraction" or "attraction force" and "repel," "repulsion," or "repelling force" will refer to magnetic influence or interaction that may occur as part of a process of engagement (e.g., magnetic forces that are deemed to be in progress and are not engagement, as described above). The term "overall engagement force" is a sum of the respective engagement forces (of various stages of engagement) and/or attraction forces that may occur or be present during the mounting or dismounting process that leads up to (e.g., an increasing overall engagement force) or away from (e.g., decreasing), but does not include, a total engagement force, as described above (e.g., it is always less than a total engagement force).

The term "magnet" refers to any material or component that responds to a magnetic field, including a ferrous metal or other material that is configured to respond to magnetism, a permanent magnet, an electromagnet, a correlated magnet, a programmed/coded magnet, etc., or a combination of these.

The term "mounting magnet" may refer to a magnet or group of magnets, as defined above, or may reference a certain component of an apparatus or system that responds to a magnetic field.

Furthermore, as used herein, the terms "bottom," "top," "upper," "lower," "inner," "outer," and similar terms are used for ease of explanation and refer generally to the position of certain components or parts of components of embodiments of the described invention at various points during the mounting or dismounting process. It is understood that such terms are not used in any absolute sense, and, as such, part of a component described as an "outer surface" at one point during the mounting process, for example, may be on an inner portion of the apparatus or system upon completion of the mounting process.

Objects of various types, sizes, shapes, weights, etc. have different mounting requirements. For example, a user may wish to mount a small, relatively lightweight object such as a GPS device to an irregular (e.g., sloped) surface of a vehicle dashboard. The user may further wish to mount the GPS device with one hand in one simple motion without necessarily having to concentrate on positioning the object with respect to the mounting apparatus. In a different scenario, however, the user may want to mount a large, heavy object to a relatively vertical surface, such as may be the case when the user wishes to mount a 52" plasma television to a wall in the user's home. In this case, the user may need to support the object with two hands and may want to accomplish the mounting operation as quickly as possible, while at the same time ensuring that the television is properly secured and will not accidentally fall and be damaged once mounted. When the time comes to take the object off the mounting apparatus, whether the object is large or small, heavy or light, the user may again wish to accomplish the task in a relatively simple manner by exerting as little effort as possible.

Accordingly, embodiments of the present invention provide for a mounting apparatus that is configured for mounting an object to a mounting surface using magnetism. As described below, embodiments of the mounting apparatus provide at least two magnets arranged in two different planes, with at least one of the planes being configured to move with respect to the other one. Through the movement of the planes of magnets, an object that is brought in proximity to the mounting apparatus may engage one of the magnetic planes and then be moved further to engage the other magnetic plane, with the combined magnetic force (e.g., total engagement force) being configured such that the mounting apparatus or system supports the particular object for which it is designed.

By dividing the total required magnetic force into two planes (or more, as described below), engagement and/or disengagement of the object from the mounting apparatus may occur in stages. As such, in some embodiments, a user bringing the object into proximity with the mounting apparatus during the mounting process may be able to gradually engage the object with the mounting apparatus. In other words, as the object is brought closer to the mounting apparatus, the magnetic force that is created between the object and the various magnetic planes of the mounting apparatus will, initially, be less than the total magnetic force that will ultimately provide support for the object and will gradually increase as the object fully engages the mounting apparatus.

Additionally or alternatively, in some embodiments, a user may be able to disengage the object from the mounting apparatus in stages by successively disengaging the object from each magnetic plane of engagement. Such a tiered release of the object may allow the user to apply a disengaging force to the mounted object that is less than the total engagement force that exists between the mounting apparatus and the object when the object is fully engaged (e.g., mounted to the surface). Thus, for example, in the case of a heavy object that is engaged with the mounting apparatus, the user need not pull the object off the mounting apparatus by applying an opposite force that is equal to the total (e.g., large) force that is used to keep the object engaged with the mounting apparatus. Rather, the user can apply a force that is sufficient to overcome the magnetic force between the object and one of the magnetic planes (e.g., less than the total engagement force of all the planes), such that the object is disengaged gradually (e.g., releasing from each plane separately).

In addition to the staged engagement and disengagement that is possible by way of embodiments of the invention described below, the mounting apparatus may be configured to provide other functions that facilitate a mounting and/or dismounting operation and/or functions that facilitate or enhance use of the mounted object. For example, in some embodiments, the mounting apparatus may be configured to allow the object to self-align with the mounting apparatus. The mounting apparatus may further be configured to structurally support objects of various weights and configurations (e.g., sizes and shapes), provide data and electrical connections with the object, and engage the object in different ways. Some embodiments may allow manipulation of an engaged object (e.g., various movements of the object) either by the user or by the apparatus acting on the object in a controlled manner. Further embodiments may provide an effective locking mechanism for the object. Other configurations may manage the functionality of an object by partially disengaging and re-engaging the object. Still other embodiments may ready the apparatus for engagement, change the appearance of the apparatus, and/or change the way the apparatus may be engaged. And in other configurations, the apparatus may remain unobtrusive or inconspicuous until it is meant to be used.

Accordingly, as will become apparent in light of the description below and with reference to the accompanying figures, the method disclosed herein may be embodied in multiple ways. A self-contained (e.g., standalone) apparatus may be constructed and configured to be affixed to a portable or fixed body (e.g., a mounting surface), some embodiments hereinafter described being examples of such. Additionally, the method may be applied to an existing body (e.g., a wall, a television, a frame for artwork), or a portion of an existing body, such that the body is modified to achieve the desired functionality of the invention (e.g., to incorporate embodiments of the invention), wherein existing components or features of the body are used as components or features of embodiments of the invention, so that such embodiments are partially or fully embedded within the body. Described another way, components that may be necessary for an embodiment of the invention and that are absent in the body may be added to the body, and components or features of the body already suitable for carrying out the needed roles of the prescribed components of the embodiment may be used as-is or may be altered as necessary; all components together being configured to achieve an apparatus comprised of both existing components and added components and residing at least partially within the body. The latter practice may be particularly beneficial, as modifying an existing body may often be less expensive and/or less invasive than embedding a self-contained apparatus, and, in some cases, an integrated embodiment may be more aesthetically appealing than would a self-contained apparatus affixed to the body. One example is that of a wall being modified, wherein the method is applied to a portion of the wall so that an object may be mounted to the wall, and wherein most of the components configured to create the embodiment of the invention are hidden within the wall so that the impact on the visual aesthetic of the wall is minimal as compared to affixing a self-contained apparatus to the wall. Moreover, in addition to the practices cited above, a system is provided, wherein an apparatus and an object interface (or two apparatuses) may be created for the bodies (by either construction or modification, as explained above) that are configured to agree with one another during the mounting process.

The method provided for mounting an object to a mounting surface comprises supporting a first mounting magnet in a first plane; supporting a second mounting magnet in a second plane; allowing at least one of the mounting magnets to move independently of the other mounting magnet along a line of engagement that intersects the first and second planes; limiting movement of the at least one of the mounting magnets that is movable between a respective outer limit position and a respective base limit position; configuring the mounting magnets to cooperate to engage the object to be mounted to produce a total engagement force; and configuring the respective outer limit position of the at least one of the mounting magnets that is movable such that a disengaging force that is less than the total engagement force and that is applied to a mounted object overcomes the total engagement force in stages by successively overcoming the respective engagement forces associated with the first and second mounting magnets to disengage the object.

At least one of the first or second planes may be defined by a curved surface. Also, one of the mounting magnets may have a fixed position. For example, the first mounting magnet may have a fixed position, and the second mounting magnet may be movable.

The first mounting magnet may comprise a plurality of magnets. Likewise, the second mounting magnet may comprise a plurality of magnets.

A controlling force may be applied to the at least one of the mounting magnets that is movable to control at least the movement or functionality of the at least one of the mounting magnets that is movable. The controlling force may be configured to bias the at least one of the mounting magnets that is movable away from the object to be mounted. The controlling force may be configured to bias the at least one of the mounting magnets that is movable toward the object to be mounted. Furthermore, the controlling force may be configured to move the at least one of the mounting magnets that is movable between its respective outer limit position and its respective base limit position.

The controlling force may be removable, may be configured to be adjustable, and/or may be configured to be dynamically adjusted so as to define a respective holding position of the at least one of the mounting magnets that is movable between the respective outer limit position and the respective base limit position of the at least one of the mounting magnets that is movable.

The controlling force may be configured to be managed remotely. Also, an interface may be configured for managing the controlling force. The controlling force may comprise a plurality of controlling forces, and each respective controlling force may be configured to control a corresponding mounting magnet.

At least one of the mounting magnets may be configured to receive a portion of the object to be mounted. And receiving the portion of the object to be mounted may comprise structurally supporting the object.

Structurally supporting the object may comprise limiting movement of the object to a direction along a single axis relative to the mounting apparatus. Alternatively or additionally, structurally supporting the object may comprise at least partially supporting a weight of the object. Moreover, receiving the portion of the object to be mounted may comprise guiding engagement of the object.

At least one short-range wireless data transfer device may be positioned proximate a target mounting area, and the at least one short-range wireless data transfer device may be configured to be within a communication range of a communication component associated with the object when the object is mounted. Alternatively or additionally, the at least one short-range wireless data transfer device may be within a communication range of a communication component associated with the object when the object is fully engaged and may be outside the communication range of the communication component when the object is partially disengaged or fully disengaged.

At least one wireless charging device may be positioned proximate a target mounting area, and the at least one wireless charging device may be configured to be within a charging range of a compatible wireless charging component when the object is partially or fully engaged with the mounting apparatus.

Furthermore, at least one connection interface may be supported in at least one of the first or second planes. The connection interface may be an electrical connector.

The first mounting magnet may be configured to have a first magnetic force, and the second mounting magnet may be configured to have a second magnetic force that is substantially opposite the first magnetic force.

The second mounting magnet may be movable, and a plurality of second mounting magnets may be supported in a plurality of respective second planes. The second mounting magnets may be configured such that the respective base limit position of each second mounting magnet is in substantially the same plane. The second mounting magnets may be arranged in a nested configuration. Also, the second mounting magnets may be arranged in a telescoping configuration.

The respective limit positions of the at least one of the mounting magnets that is movable may be configured such that the at least one of the mounting magnets that is movable is movable to a position in which the first and second planes substantially coincide.

In some embodiments, the second mounting magnet may be movable and the first mounting magnet may be in a fixed position.

The second mounting magnet may be configured such that the base limit position of the second mounting magnet substantially coincides with the first plane. Alternatively, the second mounting magnet may be configured such that the outer limit position of the second mounting magnet substantially coincides with the first plane.

In some embodiments, the first mounting magnet and the second mounting magnet may be movable.

The respective base limit positions of the first mounting magnet and the second mounting magnet may be configured such that the respective base limit positions are in substantially the same plane. Also, the respective outer limit positions of the first mounting magnet and the second mounting magnet may be configured such that the respective outer limit positions are in substantially the same plane.

The outer limit position of the first mounting magnet and the base limit position of the second mounting magnet may be configured such that the outer limit position of the first mounting magnet and the base limit position of the second mounting magnet are in substantially the same plane.

At least the first mounting magnet or the second mounting magnet may be positioned relative to a target mounting area such that proximity of an object to be mounted to the target mounting area produces at least one attraction force with respect to at least one of the first or second mounting magnets. At least one of the mounting magnets that is movable may be configured to move toward the object to be mounted as a result of the at least one attraction force.

The positions of the mounting magnets and the respective limit positions of the at least one of the mounting magnets that is movable may be configured such that the at least one attraction force draws the at least one of the mounting magnets that is movable toward the respective outer limit position, thereby defining a range for the first engagement position.

Furthermore, the positions of the mounting magnets and the respective limit positions of the at least one of the mounting magnets that is movable may be configured such that engagement between the object and the respective mounting magnet within the range for the first engagement position results in a second attraction force that draws the object and the unengaged mounting magnet together for engagement such that a total engagement force is produced for mounting the object to the apparatus.

A retaining force may be configured to bias the at least one of the mounting magnets that is movable away from the object to be mounted. The retaining force may be less than the at least one attraction force.

A third mounting magnet may be supported in a third plane. The third mounting magnet may be configured to be attached to an object to be mounted to adapt the object to agree with at least one of the first or second mounting magnets.

The third mounting magnet may comprise a plurality of magnets. Also, the third mounting magnet may comprise a plurality of third mounting magnets in a plurality of third planes.

Furthermore, the third mounting magnet may be configured to apply an object controlling force to at least one of the first or second mounting magnets.

In one embodiment of the mounting apparatus, the apparatus comprises an intermediate surface configured to respond to magnetism and an engagement member disposed relative to the intermediate surface along a line of engagement. The engagement member is configured to respond to magnetism, and at least one of the engagement member or the intermediate surface is configured to be moved between an extended state and a retracted state. In the retracted state, the at least one of the engagement member or the intermediate surface that is movable is biased away from the object to be mounted. In the extended state, the at least one of the engagement member or the intermediate surface that is movable is biased toward the object to be mounted. Proximity of the object to the engagement member produces an attraction force between the object and the engagement member that causes engagement of the object with the engagement member, and proximity of the object to the intermediate surface produces an attraction force between the object and the intermediate surface that causes engagement of the object with the intermediate surface, such that the apparatus is configured to engage the object to be mounted in stages via the respective engagement forces.

At least the intermediate surface or the engagement member face may be defined by a curved surface. The intermediate surface may have a fixed position. Engagement of the object with the engagement member may cause the object to be in such proximity to the intermediate surface that an attraction force between the object and the intermediate surface is produced. Engagement of the object with the intermediate surface may cause the object to be in such proximity to the engagement member that an attraction force between the object and the engagement member is produced. The respective attraction forces associated with the engagement member and the intermediate surface may cooperate to engage the object and may produce a total engagement force between the apparatus and the object.

The apparatus may be configured such that a disengaging force that is applied to a mounted object successively overcomes the respective engagement forces associated with the intermediate surface and the engagement member to disengage the object. Therefore, the disengaging force may be less than the total engagement force.

The engagement member may be configured to be substantially flush with the intermediate surface (for example, in the retracted state).

The apparatus may comprise a controlling component configured to apply a controlling force to at least one of the engagement member or the intermediate surface to control at least the movement or functionality of the respective one of the engagement member or the intermediate surface. The controlling component may be configured to bias the engagement member toward the retracted state, or the controlling component may be configured to bias the engagement member toward the extended state. Additionally or alternatively, the controlling component may be configured to move the engagement member between a retracted position and an extended position.

The controlling component may be configured such that the controlling force is adjustable, may be capable of being managed remotely, and/or may be removable.

The controlling component may comprise a magnet. For example, the controlling component may comprise an electromagnet.

The controlling component may be configured to maintain the engagement member in an extended position. Also, the controlling component may be configured such that the engagement member automatically retracts after the object is disengaged from the apparatus.

The controlling component may be configured to move relative to the line of engagement. The controlling component may comprise a plurality of controlling components, wherein each controlling component may be configured to control at least the movement or functionality of a corresponding one of the engagement member or the intermediate surface.

The engagement member may comprise an extension and a face joined to the extension. The engagement member may be configured to structurally support the object via engagement of the object with at least a portion of the extension. Additionally or alternatively, the extension may be configured to bear at least a portion of a weight of the object.

The engagement member may be configured to limit movement of the object to a direction along a single axis relative to the apparatus. The extension may be configured to define a position of the engagement member in at least one of the extended state or the retracted state.

The intermediate surface of the apparatus may be configured to receive at least a portion of at least one of the engagement member or the object to be mounted. A portion of the intermediate surface may define an opening configured to slideably receive at least a first portion of the engagement member so as to substantially align the line of engagement along a central axis of the engagement member as the engagement member is moved between the extended and retracted states. The intermediate surface may comprise a chamber extending from the portion of the intermediate surface defining the opening, wherein the chamber may be configured to slideably receive a second portion of the engagement member, and wherein the first portion of the engagement member may have a different width than the second portion.

The chamber may define a first depth and the engagement member may define a second depth, and the first depth may be greater than the second depth.

The intermediate surface may be configured to structurally support the object. Additionally or alternatively, the intermediate surface may be configured to bear at least a portion of the weight of the object. Furthermore, the intermediate surface may be configured to limit movement of the object to a direction along a single axis relative to the apparatus.

The apparatus may comprise at least one short-range wireless data transfer device which may be supported by the intermediate surface or the engagement member. The at least one short-range wireless data transfer device may be supported by the intermediate surface and may be capable of wirelessly communicating with an electronic device that is brought into proximity with the short-range wireless data transfer device. Moreover, the engagement member may be configured such that the at least one short-range wireless data transfer device is capable of wirelessly communicating with the electronic device when the object is fully engaged with the apparatus and is incapable of wirelessly communicating with the electronic device when the object is partially disengaged or fully disengaged from the apparatus.

The apparatus may comprise at least one wireless charging device which may be supported by the intermediate surface or the engagement member. The at least one wireless charging device may be supported by the intermediate surface and may be capable of wirelessly charging an electronic device that is brought into proximity with the wireless charging device.

At least one of the engagement member or the intermediate surface of the apparatus may be configured to support at least one connection interface. The at least one connection interface may be configured to transmit at least data or electricity to the object to be mounted when the object is engaged with the apparatus.

At least one of the engagement member or the intermediate surface may be configured to bias the object to be mounted to a predefined mounting orientation prior to engagement of the object with the apparatus.

At least one of the engagement member or the intermediate surface may comprise at least one electromagnet.

The engagement member may comprise a plurality of engagement members. At least one of the engagement members may be configured to respond to magnetism, and each engagement member may be configured to move independently along a respective line of engagement with respect to other engagement members. Each engagement member may comprise an extension and a face joined to the extension, and the extension may be configured to define a position of the engagement member in at least one of the extended state or the retracted state.

The extension of each engagement member may define a depth, and the depth of at least two of the engagement members may be different.

The engagement member may comprise a plurality of engagement member components, and at least one engagement member component may be configured to respond to magnetism. The plurality of engagement member components may be configured relative to one another such that they are in a nested configuration. In the extended state, the plurality of engagement member components may form a telescoping engagement member which may extend toward an object to be mounted. In the retracted state, the plurality of engagement member components may be substantially flush with the intermediate surface. Alternatively, in the retracted state, the plurality of engagement member components may form a telescoping receptacle. Moreover, in the extended state, the plurality of engagement member components may be substantially flush with the intermediate surface.

In some embodiments, an object interface is also provided, as mentioned above, that is configured to be attached to an object (e.g., a device or item that the user wishes to mount) to facilitate engagement of the object with the mounting apparatus. The object interface may include one or more magnets that are configured to attract or be attracted to corresponding magnets of the mounting apparatus. As such, the object interface may, in some embodiments, be integral to the device or item to be mounted (e.g., such as a component of the device or item itself), be part of a covering or other attachment or accessory to the device or item, or otherwise be configured for attachment to the device or item. As with the mounting apparatus, the object interface may be configured in numerous ways, from being embodied by a simple plate that is configured to respond to magnetism to, in some cases, having the features and functionality of the mounting apparatus. As such, it is understood that the mounting apparatus is not limited to embodiments in which the mounting apparatus is attached to the mounting surface (e.g., wall, dashboard, tabletop, etc.) and is configured to receive the object (e.g., the device or item or the object interface), but also includes embodiments in which the mounting apparatus is attached (or otherwise associated) with the device or item to be mounted and is configured to engage a reciprocal structure that is associated with the mounting surface (e.g., a simple magnetic area on the mounting surface, etc., or an object interface).

Accordingly, a system is provided for mounting an object to a mounting surface. The system comprises a mounting apparatus and an object interface. The mounting apparatus comprises an intermediate surface configured to respond to magnetism, the intermediate surface defining a first plane; and an engagement member configured to respond to magnetism, the engagement member defining a second plane and being configured to move along a line of engagement that intersects the first plane. The object interface is configured to be attached to an object to be mounted and to the mounting apparatus, and the object interface comprises a central object surface configured to respond to magnetism and configured to agree with at least one of the engagement member or the intermediate surface, the central object surface defining a third plane. At least one of the engagement member or the intermediate surface of the mounting apparatus is configured to move between a respective outer limit position and a respective base limit position. When the at least one of the engagement member or the intermediate surface that is movable is in the respective outer limit position, a distance between the first and second planes defines an apparatus engagement depth, and the mounting apparatus is configured to engage the object interface via respective engagement forces associated with the engagement member and the intermediate surface such that the overall engagement force increases by degrees until a total engagement force is produced for mounting the object to the mounting surface.

The apparatus may be configured such that a disengaging force that is less than the total engagement force and that is applied to a mounted object attached to the object interface is capable of disengaging the object interface from the mounting apparatus in stages by successively overcoming the respective engagement forces associated with the engagement member and the intermediate surface.

The central object surface may comprise at least one electromagnet. Alternatively or additionally, the central object surface may comprise at least one correlated magnet, and the at least one correlated magnet comprised by the central object surface may be programmable.

The engagement member may comprise at least one correlated magnet, and the at least one correlated magnet comprised by the engagement member may be programmable.

Likewise, the intermediate surface may comprise at least one correlated magnet, and the at least one correlated magnet comprised by the intermediate surface may be programmable.

At least one of the first, second, or third planes may be defined by a curved surface.

The mounting apparatus may comprise an apparatus controlling component configured to apply an apparatus controlling force to at least one of the engagement member or the intermediate surface to control at least the movement or functionality of the respective one of the engagement member or the intermediate surface. The apparatus controlling force may be configured to bias the engagement member away from the object interface. Alternatively, the apparatus controlling force may be configured to bias the engagement member toward the object interface.

The object interface may be configured such that an attraction force produced between the engagement member and the object interface is greater than the apparatus controlling force.

The apparatus controlling component may be configured to move the engagement member between the outer limit position and the base limit position.

The central object surface may be configured to apply a first interface controlling force to at least the intermediate surface or the engagement member of the apparatus. The first interface controlling force may be configured to be adjustable. Additionally or alternatively, the first interface controlling force may be capable of being managed remotely.

At least the engagement member or the intermediate surface may comprise at least one connection interface. Likewise, the central object surface may comprise at least one connection interface.

The object interface may be configured to structurally enhance the object when attached to the object.

The engagement member may comprise a plurality of engagement members defining a plurality of second planes. Alternatively or additionally, the engagement member may comprise a plurality of engagement member components arranged in a nested configuration.

The central object surface may be configured to receive at least a portion of at least one of the engagement member or the intermediate surface. Likewise, at least one of the engagement member or the intermediate surface may be configured to receive at least a portion of the central object surface.

The object interface may comprise a secondary object surface spaced from the central object surface, and the secondary object surface may be configured to respond to magnetism. The secondary object surface may define a fourth plane. The fourth plane may be defined by a curved surface.

The distance between the third plane and the fourth plane may define an object interface depth, and the apparatus engagement depth and the object interface depth may be different.

The mounting apparatus may be configured to engage the object interface via an engagement force produced between the engagement member and the central object surface and an engagement force produced between the intermediate surface and the secondary object surface, and the overall engagement force may increase by degrees until a total engagement force is produced for mounting the object to the mounting surface.

The object interface depth may be configured such that a disengaging force that is less than the total engagement force and that is applied to a mounted object attached to the object interface is capable of disengaging the object interface from the mounting apparatus in stages by successively overcoming the respective engagement forces associated with the engagement member and the intermediate surface.

The secondary object surface may comprise a plurality of secondary object surfaces in a plurality of fourth planes. The secondary object surface may comprise at least one electromagnet. Alternatively or additionally, the secondary object surface may comprise at least one correlated magnet.

Furthermore, the secondary object surface may be configured to apply a second interface controlling force to at least the intermediate surface or the engagement member of the apparatus. The second interface controlling force may be configured to be adjustable. Alternatively or additionally, the second interface controlling force may be capable of being managed remotely.

Moreover, the second interface controlling force may be configured to repel the intermediate surface of the apparatus such that the at least one of the secondary object surfaces associated with the intermediate surface is separated from the intermediate surface. The distance between the at least one of the secondary object surfaces associated with the intermediate surface and the intermediate surface may define a third depth, and the third depth may be less than the apparatus engagement depth.

The particular configurations that are illustrated and described below are included for purposes of explanation. In fact, numerous other configurations are possible based on the embodiments described below, and the configurations detailed herein by no means provide an exhaustive list of the possible configurations for providing the staged engagement, disengagement, and/or the other functions described below.

Like reference numerals refer to like elements throughout. Some components of the mounting apparatus are not shown in one or more of the figures for clarity and to facilitate explanation of the embodiments.

Referring now to FIG. 1, one embodiment of a mounting apparatus 10 is shown for engaging and attaching to an object. In the depicted embodiment of FIG. 1, the object is a nominal object 99 that inherently responds to magnetism (e.g., a piece of ferrous sheet metal being mounted for storage, a picture frame with a magnetic backing, etc.).

The mounting apparatus 10 may be configured such that a first mounting magnet is supported in a first plane P1 and a second mounting magnet is supported in a second plane P2. Accordingly, an engagement member 14 and an intermediate surface 12 may each be configured to respond to magnetism. The second mounting magnet may comprise a plurality of magnets in some embodiments. Likewise, the first mounting magnet may comprise a plurality of magnets. In the depicted embodiment of FIG. 1, the first mounting magnet is supported in the first plane P1 by the intermediate surface 12, and the second mounting magnet is supported in the second plane P2 by a face 88 of the engagement member 14. In this embodiment, the second mounting magnet is comprised of a single magnet 40, and the first mounting magnet is comprised of six magnets 30 arranged with respect to each other and with respect to the second mounting magnet. The quantity, type, strength, arrangement, spacing, etc. of the magnets with respect to each other and with respect to other components of the mounting apparatus may be selected to accommodate the object to be mounted, the functionality required of the apparatus, and/or the requirements of the user. In the depicted embodiment of FIG. 1, the components of the intermediate surface 12 and the engagement member 14 other than magnets 30 and magnet 40 may be comprised of materials that neither influence nor respond to magnetism. Thus, in the embodiment of FIG. 1, the intermediate surface 12 and the engagement member 14 are each configured to respond to magnetism via magnets 30 and magnet 40, respectively.

Alternatively, in some embodiments, an apparatus may be configured without the presence of traditional magnets (i.e., magnets that, themselves, produce a magnetic field(s), such as permanent magnets). For instance, the mounting apparatus may be configured without traditional magnets when the object itself produces a magnetic field that allows mounting to occur. In such embodiments, the intermediate surface and the engagement member may be configured to respond to magnetism by other means, such as by attaching pieces of ferrous metal in lieu of traditional magnets or by configuring the intermediate surface or the engagement member to, in whole or in part, be made of material that responds to magnetism. Accordingly, in some embodiments, an intermediate surface or an engagement member may carry out the functions of a first mounting magnet or a second mounting magnet. Correspondingly or additionally, a first plane P1 or a second plane P2 may be a nominal plane that is defined by an intermediate surface or an engagement member of the mounting apparatus, or a surface of such.

In some embodiments, at least one of the mounting magnets (or groups of mounting magnets, as is the case in the depicted embodiment) may be configured to move independently of the other mounting magnet along a line of engagement $L_e$ that intersects the first and second planes P1 and P2. A schematic representation illustrating the movement of the planes P1 and P2 and the line of engagement $L_e$ is shown in FIGS. 2-4.

In the depicted embodiment of FIG. 1, an engagement member 14 may be configured to be movable with respect to a fixed intermediate surface 12 and the other components of the apparatus 10. Thus, the second mounting magnet 40 may be able to move independently of the first mounting magnets 30 along the line of engagement $L_e$.

The movement of the mounting magnet(s) that is moveable (which, in some embodiments, may be both the first and second mounting magnets) may be limited, such that each mounting magnet that is moveable is only able to move between a respective outer limit position OL and a respective base limit position BL (as shown in FIG. 5). Accordingly or additionally, at least one of the engagement member 14 or the intermediate surface 12 may be configured to be moved between an extended state and a retracted state. In the retracted state, the at least one of the engagement member or the intermediate surface that is moveable may be biased away from the object to be mounted (e.g., may be biased toward the base limit position BL). In the extended state, the at least one of the engagement member or the intermediate surface that is movable may be biased toward the object to be mounted (e.g., may be biased toward the outer limit position OL). In the embodiment of FIG. 1, the extended state and the retracted state reference the relative positions of the engagement member 14 when its associated mounting magnet (the second mounting magnet 40) is in its outer limit position OL and in its base limit position BL, respectively, because the second mounting magnet 40 is the mounting magnet that is moveable in this embodiment, and the first mounting magnet 30, of the intermediate surface 12, has a fixed position. The apparatus is shown in the extended state in FIG. 5.

The outer limit position OL and the base limit position BL may be defined in various ways. For example, stop features may be provided via one or more components of the mounting apparatus and may be positioned relative to the movable mounting magnet(s) to limit the movement of the mounting magnet(s). Alternatively or additionally, the engagement member may comprise an extension and a face joined to the extension, and the extension may be configured to define a position of the engagement member in at least one of the extended state or the retracted state. In the depicted embodiment of FIG. 1, a stop feature 50 is provided via an outward protrusion of an extension 98 joined to a face 88 of the engagement member 14, the extension 98 configured to define a depth of the engagement member 14. The stop feature 50 may be configured to contact an inner surface 86 of the intermediate surface 12 to stop movement of the engagement member 14 in a direction toward the object 99 (e.g., toward the extended state). Additionally, a base surface 80 is configured such that an interior surface 84 of the base surface 80 stops movement of the engagement member 14 in a direction away from the object 99 (e.g., toward the retracted state). Thus, the base surface 80 is configured to serve as a stop feature in this embodiment. Correspondingly, the positions of the stop feature 50 and the base surface 80 relative to the depth of the engagement member 14 as defined by the extension 98 may serve to define the outer limit position OL and the base limit position BL of the second mounting magnet 40. Specifically, the outer limit position OL of the second mounting magnet 40 may be defined by the placement of the stop feature 50 on the extension 98 relative to the depth of the extension 98, and the base limit position BL of the second mounting magnet 40 may be defined by the position of the base surface 80 relative to the depth of the engagement member 14 and to the position of the intermediate surface 12. Thus, the extension 98 may be configured to define the position of the engagement member 14 in the extended state.

Furthermore, while the outer limit position OL and base limit position BL may be defined by the relative positions of and features of the components of the mounting apparatus in a predefined configuration, the outer limit position OL and base limit position of the at least one of the mounting magnets that is movable may be dynamically redefined by adjusting components of the mounting apparatus, as described in more detail below.

Embodiments of the present invention may be configured such that a portion of the intermediate surface may define an opening configured to slideably receive at least a first portion of the engagement member. Receiving the at least a portion of the engagement member may substantially align the line of engagement along a central axis of the engagement member as the engagement member is moved between the extended and retracted states. In the embodiment of FIG. 1, a portion of the intermediate surface 12 may define an opening 94 that may be configured to slideably receive at least a first portion of the engagement member 14 (which, in this case, may be the extension 98) via a guide surface 96. As such, the movement of the second mounting magnet 40 and (correspondingly) the engagement member 14 may be guided via the intermediate surface 12 such that the line of engagement $L_e$ may be substantially aligned along a central axis X of the engagement member 14 as the engagement member 14 is moved between the extended and retracted states. Furthermore, the depth of the extension 98 may ensure that the engagement member 14 remains in contact with the guide surface 96 when the engagement member 14 is in the retracted position (e.g., in contact with the base surface 80, as described above). Therefore, the extension 98 may also serve to define the position of the engagement member 14 in the retracted state.

The respective limit positions (OL and BL) of the movable magnet(s) may be configured such that the first and second mounting magnet(s) (the second mounting magnet 40 in the embodiment of FIG. 1) are movable to a position in which the first and second planes substantially coincide. Accordingly, the second mounting magnet may be configured such that the base limit position of the second mounting magnet substantially coincides with the first plane. Referring again to FIG. 1, a housing 82 may connect the base member 80 and the intermediate surface 12 and may enclose the apparatus 10 (a portion of a sidewall of the housing 82 has been removed in FIG. 1 for purpose of explanation). The depth of the engagement member 14 may be configured relative to the depth of the guide surface 96 and the length of the housing 82 such that the engagement member 14, which may be slideably received by the intermediate surface 12 (as described above), and, correspondingly, the second mounting magnet 40 may be movable to a position in which the second plane P2 and the first plane P1 substantially coincide. In the embodiment of FIG. 1, this position (P1=P2) is also the base limit position BL of the second mounting magnet 40 and the retracted state of the engagement member 14, such that the front surface of the mounting apparatus 10 is substantially flush when the engagement member is in the retracted state. In other embodiments, however, as will be described below, the stop features 50, base limit position BL, outer limit position OL, and extended state and retracted state may be defined by other components of the mounting apparatus 10 and/or other structures of those components.

The mounting magnets 30, 40 may be configured to cooperate to engage the object to be mounted (e.g., the object 99 in FIG. 1) such that a total engagement force is produced between the mounting magnets and the object that serves to hold the object to the mounting apparatus, as described in greater detail below. Accordingly, the respective outer limit position of the mounting magnets that are moveable (e.g., the second mounting magnet 40 in the depicted embodiment of FIG. 1) may be configured such that a disengaging force that is less than the total engagement force and that is applied to a mounted object may overcome the total engagement force in stages by successively overcoming the respective engagement forces associated with the first and second mounting magnets to disengage the object.

The relative positions and relative movement of the engagement member 14 and the intermediate surface 12, as described above, may also facilitate mounting of the object to the mounting apparatus. Proximity of the object (e.g., the object 99 in FIG. 1) to the engagement member may produce an attraction force between the object and the engagement member that causes engagement of the object with the engagement member. Likewise, proximity of the object to the intermediate surface may produce an attraction force between the object and the intermediate surface that causes engagement of the object with the intermediate surface, such that the mounting apparatus may be configured to engage the object to be mounted in stages via the respective engagement forces.

The succession and number of the stages of engagement (e.g., mounting) or disengagement (e.g., dismounting) may be configured as desired (per the application, the object, the requirements of the user, etc.) by the relative arrangement of the components of the apparatus, the inclusion of a component(s) that produces a magnetic field, the strength(s) of the magnetic field(s), and other factors, as will be described in more detail below.

Additionally, at least the first mounting magnet or the second mounting magnet may be positioned relative to a target mounting area such that proximity of an object to be mounted to the target mounting area produces at least one attraction force with respect to at least one of the first or second mounting magnets. The mounting magnet(s) that is movable may be configured to move toward the object to be mounted as a result of the attraction force(s). Thus, the attraction force(s) may draw the movable mounting magnet(s) toward the respective outer limit position(s) to define a range for a first engagement position (e.g., establish range in which a first stage of engagement may take place). Furthermore, the apparatus may be configured such that engagement between the object and the mounting magnet within the range for the first engagement position results in a second attraction force that draws the object and the unengaged mounting magnet together for engagement such that a total engagement force is produced for mounting the object to the apparatus. The mounting magnet(s) may be positioned in this way to facilitate engagement of the object and/or to produce an automatic succession of stages of engagement to produce the total engagement force (e.g., the first stage of engagement results in an attraction force that produces the second stage of engagement, and so on, so that the application force required from the user for mounting the object after the first stage of engagement begins may be substantially null). Furthermore, the mounting magnet(s) may be positioned as described above to produce a desired engagement order, produce a desired result prior to engagement (such as extension of the engagement member, for example), or for other reasons described below.

In the depicted embodiment of FIG. 1, for example, a nominal object 99 is provided that occupies substantially one plane (P3) and is inherently configured to respond to magnetism (e.g., the object has not been altered to accommodate the mounting apparatus 10) such that any portion of the object 99 may interact with the first or second mounting magnets 30, 40. In this embodiment, the first mounting magnet 30 and the second mounting magnet 40 may be positioned relative to a facade 85 of the intermediate surface that may be a desirable target mounting area for the object 99. As described above, in this embodiment, the front surface of the mounting apparatus 10 may be substantially flush when the engagement member 14 is in the retracted position. Also, as previously described, the engagement member 14 may extend beyond the intermediate surface 12. Thus, in the depicted embodiment of FIG. 1, due to the configuration of the mounting apparatus 10 and the configuration of the object 99 (e.g., substantially planar), the second mounting magnet 40 may always be in a position at least as close to the object to be mounted (e.g., object 99) as the position of the first mounting magnet 30, so a staged engagement for the object 99 (P3) may be predetermined to be P2, then P1 because P2 may be the movable plane (e.g., engagement may occur between the object 99 and the second mounting magnet 40 followed by engagement between the object 99 and the first mounting magnet 30). Likewise, a staged disengagement may be predetermined to be P1, then P2 in the embodiment of FIG. 1. It should be noted that these outcomes are specific to the embodiment of FIG. 1 and with respect to the object 99, as these predefined outcomes may not apply to irregularly shaped objects or objects with multiple surfaces or planes, as will be discussed in additional embodiments below. Correspondingly and additionally, when the object 99 is brought into proximity of the facade 85 of the intermediate surface 12 (e.g., the target mounting area), at least one attraction force may be produced between the object 99 and at least one of the first or second mounting magnets 30, 40 as a result of proximity of the object 99, and the second mounting magnet 40 (e.g., the mounting magnet that is movable) may move toward the object to be mounted (object 99) as a result of the at least one attraction force (e.g., the second mounting magnet 40 may be drawn toward its outer limit position OL). Thus, automatic extension of the engagement member 14 may occur, and, thus, the first engagement position may be defined in one of two ways. The second mounting magnet 40 may engage the object 99 to produce a first engagement, if the object 99 is in closer proximity to the intermediate surface 12 than the outer limit position OL of the second mounting magnet 40. Alternatively, the second mounting magnet 40 may reach its outer limit position OL and remain there, with the engagement member 14 held in the extended state by the attraction force between the object 99 and the second mounting magnet 40, until the first engagement occurs (e.g., via movement of the object 99 toward the apparatus 10). Therefore, the range for the first engagement position (e.g., first stage of engagement) may be defined by the range between the outer limit position OL and the base limit position BL of the second mounting magnet 40. In either case, a first engagement position may be established (e.g., a first stage of engagement). As previously described, the object 99, in the first engagement position, may be in a position that results in a second attraction force that may draw the object 99 and the unengaged mounting magnet (in this case, the first mounting magnet 30) together so that the resulting engagement (e.g., a second stage of engagement) may produce a total engagement force for mounting the object 99 to the mounting apparatus 10. Thus, the first and second mounting magnets 30, 40 in FIG. 1 may be positioned relative to one another such that a first stage of engagement may produce an automatic succession of stages of engagement to produce the total engagement force (in the case of the depicted embodiment of FIG. 1, one successive stage of engagement).

FIG. 2 schematically illustrates the described embodiment depicted in FIG. 1 in which the second mounting magnet 40 is movable and the first mounting magnet 30 has a fixed position. The second plane P2 (represented by a line in the figure), defined by the second mounting magnet 40 supported in the engagement member 14, may be movable between its base limit position BL and its outer limit position OL along the line of engagement $L_e$. As the object (e.g., the object 99 of FIG. 1, which in the depicted embodiment defines a third plane P3) is positioned in proximity to the mounting apparatus and an attraction force is created between the second mounting magnet 40 of the engagement member 14 and the object 99, the engagement member 14, in this example, may be drawn toward the object 99 in the direction A, as shown in FIG. 2, so that the second mounting magnet 40 and, correspondingly, plane P2 may move until the object is engaged or until the second mounting magnet 40 reaches the outer limit position OL and can move no further in the direction A. FIG. 3 schematically shows the first stage of engagement between the object 99 and the second mounting magnet 40 of engagement member 14, represented by coinciding planes P2 and P3. In this illustration (FIG. 2), the first stage of engagement is shown at the outer limit position OL of the second mounting magnet, but the first stage of engagement may occur at any point along the line of engagement $L_e$ between the outer limit position OL and the base limit position BL in this example. After the first stage of engagement (P2, P3), the engagement member and the object interface 12 may be moved in the direction B. This movement in the direction B may be due to a second magnetic attraction that exists between the object 99 and the first mounting magnet 30. Alternatively or additionally, movement in the direction B may occur as a result of application of, or continued application of, a force applied to the object by a user in the direction B. FIG. 4 shows the result of the second magnetic attraction, wherein the first plane P1, the second plane P2, and the third plane P3 may substantially coincide and may be disposed proximate the base limit position BL. At this point, a total engagement force may exist between the mounting apparatus and the object as a result of the combined engagement forces between the first mounting magnet 30 and the object 99 and the second mounting magnet 40 and the object 99, and this total engagement force may serve to secure the object to the mounting apparatus in the engaged and mounted configuration.

The opposite process may be implicated when the object is removed from the mounting apparatus in some embodiments. Referring again to the embodiment of FIG. 1 as represented by FIGS. 2-4, a user applying a disengaging force to the object may initially overcome one of the engagement forces (e.g., the force between the object 99 and the first mounting magnet 30 of the first plane P1), and continued application of the disengaging force may thus move the second mounting magnet 40 of the engagement member 14 (and the second plane P2 via movement of the engagement member 14) and the object 99 (and the third plane P3) in the direction A from the position shown in FIG. 4 to the position shown in FIG. 3. Further application of a disengaging force may overcome the engagement force between the object 99 and the second mounting magnet 40 of the second plane P2 to fully disengage the object 99 (FIG. 2).

It is noted that, although in the embodiment depicted in FIGS. 1-5 the engagement member 14 is movable with respect to a fixed intermediate surface 12, in other embodiments the intermediate surface may be movable with respect to a fixed engagement member, or both the intermediate surface and the engagement member may be movable with respect to each other. Thus, in some embodiments, engagement of the object with the intermediate surface may occur first and may cause the object to be in proximity to the engagement member, which may result in an attraction force between the object and the engagement member. Regardless of the order of engagement, the respective engagement forces associated with the engagement member and the intermediate surface may thus cooperate to engage the object and produce a total engagement force between the mounting apparatus and the object. Furthermore, a disengaging force that is applied to the object may successively overcome the respective engagement forces associated with the intermediate surface and the engagement member to disengage the object, and the disengaging force may be less than the total engagement force, as noted above.

The mounting apparatus may further include a controlling force that may be applied to the at least one of the mounting magnets that is moveable to control at least the movement or the functionality of the at least one of the mounting magnets that is moveable. For example, with reference to FIG. 1, the mounting apparatus 10 may further comprise a controlling component 60 configured to apply the controlling force. The controlling component 60 may comprise a magnet, such as a material configured to respond to magnetism or a component capable of producing a magnetic field (e.g., a permanent magnet, electromagnet, programmable magnet, etc.). In other embodiments, the controlling component may comprise a plurality of controlling components configured to apply a plurality of controlling forces, and each respective controlling force may be configured to control a corresponding mounting magnet. In yet other embodiments, the controlling component may be a spring or another component or combination of components that is configured to apply the controlling force to the respective one of the engagement member or the intermediate surface that is moveable.

The controlling component may be configured to bias the at least one of the mounting magnets that is moveable away from the object to be mounted. For example, the controlling component 60 may be configured to bias the second mounting magnet 40 away from the object 99 so that the engagement member 14 may be biased toward the retracted state. In such a case, the controlling component may be construed to be a retaining force, serving to retain the engagement member 14 so that the second mounting magnet 40 is substantially in the base limit position BL. Thus, in FIG. 1, the engagement member 14, when in the retracted state, may be substantially flush with the intermediate surface 12, as described above and the benefits of which are described in greater detail below (and also illustrated by other embodiments of the present invention, below).

Alternatively or additionally, the controlling component may be configured to bias the at least one of the mounting magnets that is moveable toward the object to be mounted. Thus, in FIG. 1, the controlling component 60 may be configured to bias the mounting magnet 40 toward the object 99, so that the engagement member 14 is correspondingly biased toward the extended state, also as illustrated and described in greater detail with respect to other embodiments of the present invention, below.

Furthermore, the controlling component may be configured such that the controlling force is adjustable. In some embodiments, the controlling force may be physically adjustable, such that the controlling component (e.g., magnet, spring, etc.) is configured to be moved toward or away from the at least one of the mounting magnets that is movable. This may be accomplished via, e.g., a lever, crank, etc. within the mounting apparatus that has an extending portion that may be available to the user, for example, along one side of the outer perimeter of the apparatus. Alternatively, the controlling component may be configured to be movable within the apparatus relative to the line of engagement (e.g., supported by a movable member that may, for example, be similar to the engagement member). Moving the controlling component may adjust the controlling force applied to the mounting magnet(s) (e.g., make the controlling force stronger or weaker depending upon the direction of movement) as the controlling component moves nearer or further away from the mounting magnet(s) that is movable and may cause the movable magnet(s) to move as a result. Furthermore, the controlling component may also be configured to be physically adjustable by, for example, being supported on a structure within the apparatus that may rotate or swivel such that the controlling component may have a different orientation with respect to the mounting magnet(s) (depending upon how the controlling component is adjusted).

Thus, in some embodiments, for example, the controlling component may be a magnet that produces a magnetic field (e.g., has a north pole and a south pole) that may have an orientation relative to the mounting magnet(s) such that the mounting magnet(s) are biased toward the controlling component. In such an embodiment, the controlling component may be, for example, supported on a swiveling structure within the apparatus that may be manipulated to swivel the controlling component 180 degrees so that the controlling component's orientation, relative to the mounting magnet(s), may be effectively reversed, thereby causing the controlling force to also be effectively reversed and causing the mounting magnet(s) to be biased away from the controlling component.

For example, referring again to FIG. 1, the base surface 80 may be configured to rotate (i.e. swivel) and may, therefore, comprise an extension that is made accessible to a user beyond the housing 82 of the mounting apparatus 10 by a hole in the housing 82 so that the extension may be accessible to a user for adjustment of the base surface 80 and, in turn, the controlling component 60. The controlling component 60 may be a rare earth magnet, and the base surface 80 may be rotated by 180 degrees by the user to produce a substantially opposite magnetic controlling force that may act on the second mounting magnet 40 in a substantially opposite manner relative to the magnetic controlling force that may have acted on the second mounting magnet 40 prior to the rotation of the base surface 80. Thus, the engagement member 14, as a result of the input by the user, may be made to partially or fully extend from the mounting apparatus 10 or may be made to partially or fully retract depending upon the strength of the controlling force.

Alternatively, the controlling component may be adjustable by other means. In some embodiments, the controlling component may be an electromagnet such that the controlling force may be adjustable via manipulation of the flow of an electric current. Therefore, the controlling force may be strengthened by degrees, weakened by degrees, removed entirely (e.g., by stopping the flow of the electric current to the electromagnet), or reversed (e.g., by reversing the poles/polarity of the electromagnet) via manipulation of the electric current associated with the electromagnet. In other embodiments, the controlling component may be a programmable magnet and the corresponding first or second mounting magnet may be suitably configured to cooperate with the programmable magnet. Therefore, in either case, the controlling component may be configured to move the engagement member (and/or the intermediate surface in some embodiments) between a retracted position and an extended position (e.g., may be configured to move the at least one of the mounting magnets that is moveable between its respective outer limit position and its respective base limit position), and/or the controlling component may be configured to maintain the engagement member in an extended position (one possible extended position is shown in FIG. 5; e.g., the extended state). Accordingly, the controlling component may be configured to dictate a specific position of at least one of the first or second mounting magnets (and, correspondingly, at least one of the intermediate surface or the engagement member), between the outer limit position OL and the base limit position BL prior to engagement of the object, and/or the controlling component may be configured to alter (e.g., customize) the target mounting area of the apparatus. For example, in the embodiment of FIG. 1, the controlling component 60 may be configured to apply a controlling force to the second mounting magnet 40 (e.g., a repelling force) such that the engagement member 14 may be held in an extended position in the extended state (e.g., the second mounting magnet 40 held in the outer limit position OL), and this may effectively define the first engagement position (as described above) of the first stage of engagement that would occur when the object 99 is mounted. In the same way, the engagement member 14 (supporting the second mounting magnet 40 in the second plane P2) may be held in an extended position, for example, midway between the extended state and the retracted state (as depicted in FIG. 2 by the second plane P2), thus altering the appearance and/or shape of the target mounting area. Altering the appearance and/or shape of a target mounting area on a mounting apparatus may provide an aesthetic benefit, may make the target mounting area more obvious to the user (making the mounting apparatus more intuitive to use), or may substantially adapt the target mounting area to an object to be mounted (e.g., matching the shape of the object to be mounted or making the target mounting area more agreeable with respect to the shape of an object to be mounted). Thus, as described above, the controlling component, or the plurality of controlling components, may be configured to be dynamically adjusted so as to define a respective holding position of the at least one of the mounting magnets that is movable between the respective outer limit position and the respective base limit position of the at least one of the mounting magnets that is movable. In some embodiments, such as those described below, defining the holding position(s) of the mounting magnet(s) may dictate a prescribed order of the stages of engagement and/or disengagement of the object. Correspondingly, an object may achieve a total engagement force with the mounting apparatus via different means (e.g., engaging P1, then engaging P2 vs. engaging P2, then engaging P1) or may engage the mounting apparatus differently (e.g., engaging more or fewer planes) as a result of, and depending upon, the adjustment(s) made to the controlling force(s) via the controlling component(s). Additionally, the holding position(s) of the mounting magnets may be dynamically arranged by the controlling force(s) relative to one another so that the second attraction force (which may be produced as a result of the first stage of engagement in the first engagement position, as described above) is produced or is not produced as prescribed (e.g., the unengaged mounting magnet is, or is not, within the required proximity of the object upon the happening of the first stage of engagement in the first engagement position for the second attraction force to be produced). Thus, the relative positions of the mounting magnets (and, correspondingly, the relative positions of the engagement member and/or intermediate surface that is movable) as determined by the adjustment(s) of the controlling force(s) may produce or preclude the automatic succession of stages of engagement that produces the total engagement force. If the automatic succession of stages of engagement is precluded, the total engagement force between the object and the mounting apparatus may still be produced by the continued application of an engaging force to the object (e.g., continued movement of the object toward the mounting apparatus by, for example, the users to mount the object. Also, it is important to note that the adjustment(s) to the controlling force(s) may be made when the mounting apparatus is disengaged with the object (e.g., idle) or when the mounting apparatus is engaged with the object.

When an object is engaged (e.g., mounted) with the mounting apparatus, the controlling force may be dynamically adjusted to enhance the functionality of the mounting apparatus, to move the object, and/or to interact with the object or a component or device associated with the object. For example, in FIG. 1, when the object 99 is mounted to the mounting apparatus 10 such that a total engagement force is produced between the object 99 and the mounting apparatus, the controlling component 60 may be adjusted so that the controlling force (in this example, an attraction force) between the second mounting magnet 40 and the controlling component 60 may be strengthened. Strengthening of the controlling force may cause the engagement force between the second mounting magnet 40 and the object 99 to be strengthened such that the total engagement force between the object 99 and the mounting apparatus 10 is strengthened. Strengthening of the total engagement force may cause the object 99 to be more securely engaged with the mounting apparatus 10 (e.g., the object 99 is less likely to be unintentionally disengaged) and may cause the object 99 to be more stable against unintended impacts (e.g., swipes, bumps, etc.) that may otherwise affect or reposition the object 99 on the mounting apparatus 10. Furthermore, the controlling force may be strengthened to a degree such that the total engagement force is too great for a user to overcome (using ordinary and reasonable force) to disengage the object 99. Thus, the object 99 may effectively be "locked" to the mounting apparatus until the controlling force is further adjusted (e.g., weakened) to allow for disengagement of the object 99 from the mounting apparatus 10 by the user.

Additionally, referring again to FIG. 1, the engagement force between the first mounting magnet 30 and the object 99, when the object 99 is mounted to the mounting apparatus 10, may be significantly stronger than the engagement force between the second mounting magnet 40 and the object 99 such that the first stage of disengagement (e.g., disengagement of the first mounting magnet 30 and the object 99, in FIG. 1) requires a significantly stronger disengaging force applied by the user than does the second stage of disengagement (e.g., disengagement of the second mounting magnet 40 and the object 99). In this case, to make disengagement of the object 99 easier for the user, the controlling force (applied by the controlling component 60) may be adjusted so that it biases the second mounting magnet 40 toward the outer limit position OL (e.g., a repelling force) and may be of sufficient strength to move the engagement member 14 and the object 99 beyond the first plane P1 (and, correspondingly, the intermediate surface 12) such that the first stage of disengagement may be accomplished by the controlling force (e.g., partial disengagement) rather than by the user. The user may then disengage the object 99 by overcoming a lesser total engagement force, such as the engagement force between the second mounting magnet 40 and the object 99 (e.g., the second stage of disengagement) to disengage the object 99 from the mounting apparatus 10. Furthermore, the controlling force may be configured to be managed remotely. Remote management of the controlling force may be accomplished, for example, in one of the following ways: by configuring the apparatus to receive a wireless signal, radio frequency, etc. transmitted by an external device to a receiving device which is configured to adjust the controlling component; via a physical interface on the device configured to adjust the controlling force (e.g., a button, touch interface, crank, lever, etc.) that is built into an exposed surface of the mounting apparatus or extending from the mounting apparatus and that may be manipulated by a user to produce a desired effect; or via a wired connection to the apparatus configured to connect the controlling component with a management interface (e.g., a wall switch, volume knob, etc.) so that the strength of the controlling component may be managed by degrees and/or may be turned on/off. Therefore, if the engagement force between the second mounting magnet 40 (in the embodiment of FIG. 1) is not sufficient for supporting the weight of the object 99 on its own (such that the user must grasp the object 99 during the second stage of disengagement in order to prevent the object from an unintentional fall from the engagement member 14), the object may be grasped by the user prior to the first stage of disengagement (e.g., when the object 99 is fully engaged with the mounting apparatus 10), and the adjustment of the controlling force may be effected remotely such that the object 99 is ejected beyond the more difficult stage of disengagement by the engagement member 14 while the user grasps the object 99 so that the object 99 is supported and so that the user may disengage the object 99 from the mounting apparatus 10. However, in some cases, it may be desirable for the object to automatically disengage (e.g., fall from) the mounting apparatus when the controlling force is used to eject the object from the engagement member or the intermediate surface (e.g. such as during the manufacturing of parts). Therefore, some embodiments may be configured to intentionally produce this result.

The ejection process described above may also be effected to allow for manipulation of an object engaged with the mounting apparatus. Referring again to the embodiment of FIG. 1, the second mounting magnet 40 may be configured to bear the weight of the object 99 such that the object 99 may be ejected from the intermediate surface 12 (as described above) so that the object 99 may be repositioned (e.g., rotated to achieve a desired orientation, spun, slid, etc. in this embodiment). After repositioning, the controlling force may be further adjusted so that the engagement member 14 retracts and the object 99 is again fully engaged with the mounting apparatus via the total engagement force. In other embodiments, repositioning the object may involve tilting or otherwise adjusting the pitch, yaw, and roll of the object, among other means, in which case the one of the engagement member or intermediate surface that is movable may remain extended until the adjusted or adjustable position is no longer desired.

Adjustment of the controlling force via the controlling component may also be used to redefine the base limit position BL of the at least one of the first or second mounting magnets that is moveable (and, correspondingly, the retracted state of the at least one of the engagement member or the intermediate surface that is movable) by effectively serving as a stop feature of the apparatus. Additionally, in some embodiments, the controlling component of the apparatus may be configured to serve as a stop feature without adjustment. Referring again to the embodiment of FIG. 1, the controlling component 60 may be configured to bias the second mounting magnet 40 toward the outer limit position OL via the controlling force (for example, a repelling force that interacts with the mounting magnet 40), and the controlling component 60 may be adjusted so that the controlling force is strengthened. The first mounting magnet 30 may apply an attraction force to the object 99 that is stronger than the bias of the controlling force at the outer limit position OL of the second mounting magnet 40. Thus, when the object 99 is engaged with the engagement member 14 (which may be in an extended position e.g. the extended state, as shown in FIG. 5 prior to engagement due to the bias of the controlling force on the second mounting magnet 40), the attraction of the object 99 to the first mounting magnet 30 may move the object 99 and the second mounting magnet 40 toward the controlling component 60 until a position may be reached such that the attraction force between the first mounting magnet 30 and the object 99 is substantially equivalent to the repelling force between the controlling component 60 and the second mounting magnet 40, thus limiting movement of the second mounting magnet 40 along the line of engagement $L_e$ and effectively redefining the base limit position BL of the second mounting magnet 40 and, correspondingly, limiting the total engagement force (e.g., relative to the total engagement force inherent to the configuration of the mounting apparatus 10 prior to the adjustment of the controlling force) between the object 99 and the mounting apparatus 10.

In addition to the functions that may be served by the controlling component(s) of the invention as described above, in some embodiments similar to the embodiment of FIG. 1, additional controlling components 60 (Group 1) may be supported by the inner perimeter of the extension 98 of the engagement member 14 that may be configured to cooperate with the first mounting magnet 30 of the intermediate surface 12 (or may be configured to cooperate with additional controlling components 60 (Group 2) supported by the guide surface 96 of the intermediate surface 12) such that a friction force between the engagement member 14 and the guide surface 96 of the intermediate surface 12 may be limited (e.g., reduced) or eliminated as the engagement member 14 moves between the retracted state and the extended state. The cooperation referenced above may result by means of Group 1 and the mounting magnet 30 (or Group 1 and Group 2) being configured to have substantially opposite magnetic forces that repel one another and effectively serve to create a repelling force between the extension 98 of the engagement member 14 and the guide surface 96 of the intermediate surface 12.

Furthermore, the controlling component may be configured such that the controlling force is removable. Removing the controlling force may involve adjustment of the controlling force, such that the strength of the controlling force is decreased until the controlling force is removed altogether. In other embodiments, the controlling force may be removed by physically removing, re-positioning, or blocking the controlling component. This may be accomplished by use of a movable rod, strip, plate, etc. on which the controlling component is attached and that may be inserted into and removed from the apparatus, or a similar result may be accomplished by making the apparatus accessible to a blocking component (e.g., a magnetic shielding component) that may be inserted to block or otherwise hinder the controlling force.

Additionally, the controlling component may be configured such that the engagement member automatically retracts after the object is disengaged from the apparatus. Referring again to FIG. 1, the controlling component 60 may be configured to bias the engagement member 14 toward the retracted state by applying a controlling force (e.g., an attraction force) to the second mounting magnet 40. The controlling force may be of sufficient strength to bias the second mounting magnet 40 toward the base limit position BL when the second mounting magnet 40 is in the outer limit position OL (e.g., when the engagement member 14 is in the extended state). Thus, the mounting apparatus 10 may have a disengaged (e.g., idle) configuration when no object is engaged with the mounting apparatus 10 wherein the engagement member 14 may be in the retracted state (and the second mounting magnet 40 may be in the base limit position BL). Therefore, the engagement member 14 may be automatically retracted by the controlling force applied by the controlling component 60 when the object 99 is disengaged from the mounting apparatus 10 as the mounting apparatus 10 returns to the disengaged (e.g., idle) configuration.

In still other embodiments, additional components or devices may be provided (e.g., used in conjunction with, attached to, or integrated with the mounting apparatus) to enhance a user's experience with the object to be mounted. For example, in some embodiments, at least one short-range wireless data transfer device may be positioned proximate a target mounting area (e.g., the vicinity of the mounting surface in which the object is to be mounted) and may be supported by the intermediate surface or the engagement member. The at least one short-range wireless data transfer device may be capable of wirelessly communicating with an electronic device that is brought into proximity with the short-range wireless data transfer device, and it may be capable of wirelessly communicating with the electronic device when the object is fully engaged with the apparatus and may be incapable of wirelessly communicating with the electronic device when the object is partially disengaged or fully disengaged from the apparatus. For example, with reference to the embodiment of FIG. 1 which may comprise a short-range wireless transfer device (not shown) mounted to the inner surface 86 of the intermediate surface 12 and wherein the object 99 may comprise an attached mobile phone (not shown), the mobile phone may be capable of communicating with the short-range wireless data transfer device of the mounting apparatus 10 when the object 99 is fully engaged with the apparatus 10. Therefore, the controlling force produced by the controlling component 60 may be adjusted to eject the object 99 and the mobile phone beyond the intermediate surface 12 to a distance from the short-range wireless data transfer device so that communication between the mobile phone and the short-range wireless data transfer device may be stopped. The controlling force may further be adjusted so that the engagement member 14 is retracted so that the object 99 is again fully engaged with the mounting apparatus 10 such that the mobile phone is once again capable of communicating with the short-range wireless data transfer device supported by the inner surface 86 of the intermediate surface 12.

Additionally, some embodiments may comprise at least one wireless charging device supported by the intermediate surface or the engagement member. The at least one wireless charging device may be supported by the intermediate surface and may be capable of wirelessly charging an electronic device that may be brought into proximity with the wireless charging device. In this regard, the receiving component (e.g. a receiving device configured to receive the wireless charging device signal) may be any component of the object (e.g., integral to or otherwise attached to the object) that is configured to be charged and/or recharged (such as a rechargeable power cell or battery) for serving as a power source to the object. The charging range may be a range of distances within which the wireless charging device may (e.g., remotely) charge the receiving component. Referring again to the embodiment depicted in FIG. 1 which may comprise a wireless charging device (not shown) supported by the inner surface 86 of the intermediate surface 12 and wherein the object 99 may comprise an attached mobile phone (not shown), engaging the object 99 with the mounting apparatus 10 may result in the mobile phone being wirelessly charged by the wireless charging device that is supported by the intermediate surface 12.

In still other embodiments, at least one connection interface may be supported in at least one of the first or second planes (e.g., the planes P1, P2 shown in FIG. 1). The connection interface may be any interface between the object and some other component or device (which may, in some cases, be a like or similar embodiment of the mounting apparatus) that allows a connection to be made. For example, the connection interface may, in some cases, be an electrical connector that is configured to connect the object or a component thereof to a source of electricity (such as a source of electricity in the mounting surface).

Various embodiments may be configured such that at least one of the mounting magnets may receive a portion of the object to be mounted. Receiving a portion of the object to be mounted may comprise structurally supporting the object, limiting movement of the object to a single direction along a single axis relative to the mounting apparatus, and/or at least partially supporting a weight of the object. In the depicted embodiment of FIG. 1, the object 99 may define a third plane P3, and the third plane P3 may be a nominal plane such that the object 99 may be defined by a curved surface and, correspondingly, a depth $d_o$. Alternatively or additionally, the object 99 may define the depth $d_o$ by having multiple engageable surfaces (e.g., surfaces that respond to magnetism and may be engaged by the mounting apparatus) that may be spaced apart, and the engageable surfaces may be joined by an extension so that the object 99 is similar to the object 99a depicted in FIG. 5. The depth $d_o$ may be less than the depth $d_a$, defined by the distance between the first plane P1 and the second plane P2 when each of the respective mounting magnets is in its respective outer limit position OL (shown in FIG. 5). Therefore, the engagement member 14 of the mounting apparatus 10 in FIG. 1 may be configured to receive the object 99a (also a nominal object that inherently responds to magnetism, in this example) via engagement of the object extension 76 (by way of the object surface opening 78 of the object 99a) with at least a portion of the extension 98 of the engagement member 14. The extension 98 may be configured to bear at least a portion of the weight of the object 99a, and engagement of the object 99a with the portion of the extension 98 may limit movement of the object 99a to a direction along a single axis relative to the mounting apparatus 10, which may make the object 99a more stable and/or secure than a substantially flat object 99 mounted to the mounting apparatus 10 in a similar manner. Therefore, the first mounting magnet 30 and second mounting magnet 40 and, correspondingly, the total engagement force may each be of a strength that is less than the strength of the mounting magnets and the total engagement force required for supporting the object 99. Thus, smaller and/or less powerful magnets may be used to provide substantially the same functionality (e.g., weight-bearing, stability, security, etc.), as the role and importance of the mounting magnets may change to that of providing a holding force (e.g., total engagement force) suited for attachment rather than a holding force fully responsible for bearing the weight of the object and/or stably securing the object. Moreover, the smaller and/or less powerful magnets may be less expensive to procure or manufacture, which may provide an additional benefit. Furthermore, limiting movement of the object 99a to a single direction along a single axis may protect the object 99a against unintentional disengagement (e.g., via accidental bumps, swipes, vibration, or other jarring or disruptive forces that may influence the object) and may require that any unintentional disengaging force must overcome the engagement forces associated with the various stages of disengagement to completely disengage the object 99a. Thus, even an unintentional disengaging force that is forceful enough to overcome one engagement force (e.g., the engagement force between the first mounting magnet 30 and the object 99a within the first plane P1) may be substantially reduced or may cause the object to lose momentum so that a subsequent engagement force (e.g., between the second mounting magnet 40 and the object 99a within the second plane P2) may not be overcome. Additionally, embodiments that are configured to produce the automatic succession of stages of engagement (described previously) may effectively reverse the movement of the object caused by the unintentional disengaging force (if the force is not substantial enough to overcome all of the stages of disengagement) and thus may effectively re-engage the object automatically (e.g., without external intervention) to re-establish the total engagement force between the object and the mounting apparatus.

As described above and as shown in FIG. 5, the object 99a has multiple engageable surfaces that are spaced from one another so that the distance between the surfaces defines a depth. Engagement of the mounting apparatus 10 (shown in FIG. 1) with an object of this type may occur in a similar manner to the staged engagement process previously described with respect to object 99 of FIG. 1 (e.g., the engagement member 14 may extend in response to proximity of the object 99a, the second mounting magnet 40 may engage the object 99a first, and the first mounting magnet 30 may draw the object 99a toward the mounting apparatus 10 to fully engage the object 99a; e.g., staged engagement in an order P2, P1). Alternatively, depending on factors such as the strength of the mounting magnets (30, 40), the depth $d_o$ of the object 99a, and the type and strength of the controlling force as applied by the controlling component, proximity of the object 99a may cause the object 99a to be drawn to the first mounting magnet 30 such that the first mounting magnet 30 engages the object 99a first (e.g., the first stage of engagement), and the engagement member 14 may subsequently, or simultaneously, be drawn toward the object 99a and may engage the object 99a last (e.g., the second stage of engagement) to produce a total engagement force (e.g., staged engagement in an order P1, P2).

The distance between the outer limit positions OL of the first and second mounting magnets may define a depth $d_a$. As shown in FIG. 5, the depth $d_a$ may be greater than the depth $d_o$ such that the object 99a may be engaged with the mounting apparatus 10 via successive stages of engagement, as described above. Thus, the object 99a may be dismounted from the mounting apparatus 10 via successive stages of disengagement. In the embodiment of FIG. 5, regardless of the order of the stages of engagement (e.g., P1, then P2 vs. P2, then P1), if the depth of the object 99a ($d_o$) is less than the depth between the outer limit positions OL of the second mounting magnet 40 and the first mounting magnet 30 ($d_a$), the engagement member 14 may automatically adapt to the depth of the object 99a during the second (in this case) stage of engagement of the mounting process (e.g., the engagement member 14 may engage the object 99a first and retract during the second stage of engagement, or the engagement member may extend to produce the second stage of engagement with the object 99a), and the object 99a may be disengaged from the mounting apparatus 10 in multiple stages. It is important to note, however, that, if $d_o$ is greater than $d_a$, the second mounting magnet 40 may still engage the object 99a (e.g., by magnetic engagement if not also by physical engagement) depending upon the shape of the object 99a such that the engagement force between the second mounting magnet 40 and the object 99a contributes toward the total engagement force (e.g., increases the total engagement force) and, therefore, aids in facilitating mounting of the object 99a (e.g., the second mounting magnet 40 and its corresponding stage of engagement and engagement force still have the same role in the mounting process even if not physically engaged with the object, though the engagement force associated with the second mounting magnet 40 may be of a lesser strength), but the benefits of staged disengagement may not apply (e.g., the object 99a may not disengage the mounting apparatus 10 in a staged manner if $d_o$ is greater than $d_a$).

Furthermore, the mounting apparatus 10 of FIG. 1 may be configured such that the engagement member 14 is substantially flush with the intermediate surface 12 (as described above). This may be beneficial for mounting an object such as object 99a because the outer surface of the object 99a (e.g., the surface closest to the mounting apparatus 10) may be initially misaligned with the engagement member 14 when engaged with the intermediate surface 12. In this case, the user may slide the object 99a across the flush surface of the mounting apparatus 10 and, when the engagement member 14 is properly aligned with the object surface opening 78, the engagement member 14 may automatically extend to engage the object 99a by an attraction force produced between the second mounting magnet 40 and the object 99a (specifically, the surface of object 99a that is furthest from the mounting apparatus 10) that is no longer blocked by the outer surface of the object 99a (e.g., the surface closest to the mounting apparatus 10, as noted above). Thus, the object 99a may be easier to mount to the mounting apparatus 10, or the object 99a may be mounted in a less precise manner, than would be the case if the user were required to initially align the object 99a properly in order to mount the object.

Additionally, if $d_o$ is less than $d_a$ (as described above), the engagement member 14 may be configured to produce audible feedback (e.g., a click, tone, or other sound) upon engagement of the object 99a that may provide notification that the object 99a is fully engaged with the mounting apparatus 10. Configuring the audible feedback that may occur may include choosing a material for the face 88 of the engagement member 14 that produces such feedback when engaged with another surface or may include supporting a sensor in the face 88 of the engagement member 14 that may be configured to be attached to a noise-making device (e.g., a small speaker) within the mounting apparatus 10.

Also, the mounting apparatus 10 may be configured such that the object is aligned properly with respect to the apparatus prior to engagement. As such, at least one of the engagement member or the intermediate surface may be configured to bias the object to be mounted to a predefined mounting orientation prior to engagement of the object with the apparatus, as will be shown by way of other embodiments and will be discussed in more detail below.

Turning now to FIG. 6A, another embodiment is shown that is similar to the embodiment depicted in FIG. 1 but comprises additional components and modifications that enhance the adaptability and functionality of the apparatus 10. The embodiment depicted in FIG. 6A may also support a first mounting magnet 30 (comprised of six magnets) in a first plane by an intermediate surface 12 and a second mounting magnet 40 in a second plane by a face 88 of the engagement member 14, and only the second mounting magnet 40 (and, correspondingly, the engagement member 14) may be movable. However, in this embodiment, the magnets 30 may be supported by the fixed intermediate surface 12 via support extensions 83 that extend from the inner surface 86 of the intermediate surface 12 and may be hollow to accommodate the magnets 30 and support the magnets 30 in the intermediate surface 12. Also, as may be similar to the embodiment of FIG. 1, in the embodiment of FIG. 6A, a portion of the intermediate surface 12 may define an opening 94 that is configured to slideably receive at least a first portion (which, in this case, may be a first portion 98' of the extension 98) of the engagement member 14 so as to substantially align the line of engagement $L_e$ along the central axis X of the engagement member 14 as the engagement member 14 is moved between the extended and retracted states. Additionally, however, as shown in FIG. 6A, the intermediate surface 12 of the mounting apparatus 10 may further comprise a chamber 90 that may extend from the portion of the intermediate surface that may define the opening 94 and that may contact the interior surface 84 of the base surface 80, and the chamber 90 may be configured to slideably receive a second portion of the engagement member 14 (which, in this case, may be a second portion 98" of the extension 98 that may extend beyond the stop feature 50 that is provided via the outward protrusion of the extension 98) via engagement of the second portion 98" with an inside surface 92 of the chamber 90. Adding this component (the chamber 90) may enhance the adaptability and functionality of the mounting apparatus 10, as the second mounting magnet 40 may not be limited to a base limit position BL that ensures that the extension 98 of the engagement member 14 remains in contact with the guide surface 96 of the intermediate surface 12 to keep the line of engagement $L_e$ substantially aligned along the central axis X (as may be required in the mounting apparatus 10 in FIG. 1). This may be the case, in fact, because the chamber 90 (configured as noted above) may also align the line of engagement $L_e$ along the central axis X of the engagement member 14 by means of its engagement with the second portion 98" of engagement member 14. As such, the engagement member 14 may be configured (e.g., modified, as compared to the embodiment shown in FIG. 1) such that the area of contact between the second portion 98" and the inside surface 92 of the chamber 90 is increased, which may further ensure the stability of the engagement member 14 along the central axis X and the line of engagement $L_e$. The area of contact may be increased by extending the second portion 98" of the extension 98 toward the face 88 of the engagement member 14 (and, thus, changing the position of the stop feature 50), which may, in turn, affect the outer limit position OL of the second mounting magnet 40 if no other changes are made with respect to the outer limit position OL, or the area of contact may be increased by extending the second portion 98" of the extension 98 away from the face 88, which may, in turn, affect the base limit position BL of the second mounting magnet 40 if no other changes are made with respect to the base limit position BL. Depending on the dimensions chosen for the lengths of the first and second portions 98', 98" with respect to the length of the chamber 90, the total length of the engagement member 14 may be shorter than the length of the chamber (as shown in FIG. 6B). Thus, as shown, the chamber 90 may define a first depth and the engagement member 14 may define a second depth, with the first depth being greater than the second depth (which may, e.g., correspond to the thickness of a plate through which the opening is formed, in other embodiments).

With continued reference to FIG. 6B, because the chamber 90 may keep the engagement member in proper alignment with the line of engagement $L_e$, as described previously, and may have a depth greater than the depth of the engagement member 14, as described above, the base limit position BL of the second mounting magnet 40 may be configured to be at a position within the mounting apparatus 10 (e.g., between the intermediate surface 12 and the base surface 80) such that the engagement member 14 may move along and within the chamber 90. Therefore, the second mounting magnet 40 may be moved beyond the intermediate surface 12 in a direction away from an object to be mounted (e.g., the engagement member 14 may be retracted), and the interior surface 84 of the base surface 80 may act as a stop feature (as described previously with reference to the embodiment of FIG. 1) and may define the base limit position BL of the second mounting magnet 40 (and, accordingly, the retracted state of the engagement member 14).

FIG. 6C shows the presently described embodiment of the apparatus 10 in the retracted state and, accordingly, shows the base limit position BL of the second mounting magnet 40. As is also shown in FIG. 6C, when the engagement member 14 is in the retracted state, a portion of the chamber farthest from the base limit position BL may be configured to align with the opening 94 of the intermediate surface to define a receiving cavity 91. Thus, the intermediate surface 12 may be configured to receive a portion of the object to be mounted (e.g., a portion of a suitably shaped object or an object interface configured to fit within the receiving cavity 91).

Accordingly, the embodiment depicted in FIG. 6A may be configured to have a surface that is substantially "male" (e.g., with the engagement member 14 extended) or substantially "female" (e.g., with the engagement member 14 retracted) with respect to the object to be mounted, and, so, accordingly, the mounting apparatus 10 of FIG. 6A may be able to engage objects that are deemed to be substantially male or substantially female. Furthermore, the mounting apparatus 10 may be configured so that it is adaptable between a substantially male configuration and a substantially female configuration depending on the substantially male or female configuration of the object to be mounted (e.g., the mounting apparatus 10 may adapt to the shape of the object to be mounted). Furthermore, an apparatus 10 configured to be substantially male when not engaged (e.g., idle), such as a mounting apparatus 10 configured such that the engagement member 14 is held in the extended state when idle by a controlling force applied by the controlling component 60 to the second mounting magnet 40, may adapt to engage an object to be mounted of the same orientation (e.g., male) via retraction of the engagement member 14 to a retracted state in response to engagement of the object during the mounting process. Likewise, an apparatus 10 configured to be substantially female when not engaged (e.g., idle), such as a mounting apparatus 10 configured such that the engagement member 14 is held in the retracted state when idle by a controlling force applied by the controlling component 60 to the second mounting magnet 40, may adapt to engage an object to be mounted of the same orientation (e.g., female) via extension of the engagement member 14 to an extended state in response to engagement of the object during the mounting process.

As noted above, the embodiment depicted in FIG. 6A may be very versatile, and various configurations of the embodiment (including like and unlike configurations) may be used in conjunction with one another in mounting and non-mounting (e.g., attachment) contexts per the application.

As described previously, at least one of the mounting magnets may be configured to receive a portion of the object to be mounted. Receiving a portion of the object to be mounted by the intermediate surface and/or the engagement member may further provide structural support to the object, may facilitate alignment of the object with the mounting apparatus, may guide the object, or may accomplish a combination of these. For example, the intermediate surface 12 may thus be configured to bear at least a portion of the weight of the object. In the embodiment of FIG. 6A, the object may be received via the opening 94 of the intermediate surface 12 (i.e. the first mounting magnet 30), and, in receiving a portion of the object, the intermediate surface 12 may structurally support the object, facilitate alignment of the object with the mounting apparatus 10, and/or guide engagement of the object (as noted above).

In some embodiments, structurally supporting the object may further include limiting movement of the object to a direction along a single axis relative to the mounting apparatus 10 in response to a disruptive or disengaging force applied to the object. For example, the engagement member and/or the intermediate surface may be configured to limit movement of the object to a direction along a single axis in response to the applied disengaging force. Said differently, the mounting apparatus 10 may be configured to resist unintentional disengagement of the object and/or object interface from the mounting apparatus, such as from an accidental hit or swipe (e.g., a force having a transverse component with respect to the direction of the line of engagement $L_e$). For example, a force applied at a downward angle to the mounting apparatus 10 may be resisted by the structural support provided by the engagement member 14 and/or intermediate surface 12, and only a disengaging force applied in a single direction along a single axis, such as the central axis X of the engagement member shown in FIG. 6A (e.g., knocking or pulling the object in a direction away from the mounting apparatus), would serve to disengage the object.

With continued reference to the depicted embodiment of FIG. 6A, the first portion 98' of the engagement member 14 may have a different width (e.g., diameter in the case of a cylindrical configuration as shown) than the second portion 98". In some cases, for example, the first portion 98' may have a narrower width than the second portion 98". In this regard, a width (e.g., diameter) of the opening 94 may correspond to the width of the first portion 98' and may thus be smaller than the width of the second portion 98" of the engagement member 14, such that the second portion 98" may be too large to pass through the opening 94 and may serve to limit the movement of the engagement member 14 in a direction away from the base surface 80 via contact of the stop feature 50 with the inner surface 86 of the intermediate surface 12. Thus, the width of the second portion 98" (e.g., the configuration of the stop feature 50) may, with respect to the depth of the first portion 98', define the outer limit position OL of the second mounting magnet 40 (and, accordingly, the extended state of the engagement member 14).

The mounting apparatus may be configured such that the target mounting area is substantially flush. Configuring the mounting apparatus such that the target mounting area (e.g., primary mounting surface) is substantially flush may be beneficial for many reasons. The flush surface may be aesthetically pleasing. A flush surface may allow for certain movements of the object prior to engagement (e.g., sliding, etc.) that may assist with self-alignment, may assist with engagement, or may generally make the mounting process easier or more enjoyable for a user. Additionally, a flush face may keep a component(s) of the mounting apparatus out of the way when not in use so as to avoid snags, impacts, or other unintentional engagement with the component(s). Furthermore, a flush configuration may serve to prevent debris from entering the mounting apparatus such that the components of the apparatus remain able to function properly. Particularly, the at least one of the engagement member or intermediate surface that is movable may be benefitted by a flush face because it (or they) may be exposed to dirt and debris less often, relative to a configuration in which it (they) may remain exposed when, for example, in a disengaged (e.g., idle) state. Accordingly, a flush surface may be achieved in a variety of ways depending on the configuration of the mounting apparatus and generally involves arranging the components of the mounting apparatus so that the multiple planes and/or surfaces of the apparatus coincide in the same plane.

In embodiments in which the first mounting magnet 30 is moveable and the second mounting magnet 40 is in a fixed position, for example, the first mounting magnet may be configured such that the respective base limit position BL substantially coincides with the second plane. Similarly, the first mounting magnet 30 may be configured such that its respective outer limit position OL of the first mounting magnet 30 substantially coincides with the second plane. Furthermore, in some embodiments in which the first mounting magnet and the second mounting magnet are moveable, the respective base limit positions BL of the first mounting magnet 30 and the second mounting magnet 40 may be configured such that the respective base limit positions are in substantially the same plane. Moreover, the outer limit position OL of the first mounting magnet 30 and the base limit position BL of the second mounting magnet 40 may be configured such that the outer limit position OL of the first mounting magnet and the base limit position BL of the second mounting magnet are in substantially the same plane.

As described above, a variety of different configurations are possible for providing the mounting apparatus. In some cases, such as in the embodiment depicted in FIG. 1, the object 99 that may engage the mounting apparatus may be a simple structure, such as a single surface that inherently responds to magnetism. In other cases, the object (such as object 99a depicted in FIG. 5) may have a depth $d_o$ that may correspond to a distance between two surfaces or may correspond to a depth defined by a curved surface of the object. As shown, embodiments of the mounting apparatus may be able to accommodate and engage an object (similar to either object 99 or object 99a) without having been specifically configured with respect to the object. And, in some cases, embodiments of the mounting apparatus may also be able to manipulate an object and/or provide further functionality without having been specifically configured with respect to the object. Additionally, embodiments that may be even more useful may be accomplished by configuring the mounting apparatus for a specific object, or for a particular object shape.

Moreover, a substantially greater degree of functionality may be achieved by concurrently configuring a mounting apparatus and an object interface relative to one another such that they may cooperate in an even more predictable and prescribed manner. The system may be configured to cooperate prior to engagement, during the engagement process, and/or while engaged. For example, turning to FIGS. 7A and 7B, a system 200 is provided that includes a mounting apparatus 210, such as embodiments of the mounting apparatus 10 described above. The system 200 may further include an object interface 220 configured to be attached to an object (not shown) to be mounted to the mounting apparatus 210.

The mounting apparatus 210 may include an intermediate surface 212 configured to respond to magnetism and an engagement member 214 configured to respond to magnetism (e.g., as described above). The intermediate surface 212 may be configured to respond to magnetism by supporting the first mounting magnet 230 (comprised of six magnets 230) in the first plane P1, and the engagement member may be configured to respond to magnetism by supporting the second mounting magnet 240 (comprised of one magnet 240) in the second plane P2. Thus, the intermediate surface 212 may define the first plane P1, and the engagement member 214 may define the second plane P2. The engagement member 214 may be configured to move along a line of engagement $L_e$ that intersects the first plane P1, as described above.

With respect to the object interface 220, a third mounting magnet may be supported in a third plane and may be configured to be attached to an object to be mounted to adapt the object to agree with at least one of the first or second mounting magnets. Additionally, the third mounting magnet may comprise a plurality of magnets. Moreover, the third mounting magnet may comprise a plurality of third mounting magnets in a plurality of third planes. Thus, the object interface 220 may include a central object surface 226 configured to respond to magnetism by supporting a third mounting magnet 241, comprised of one magnet 241, in a third plane P3 (one of a plurality of third planes in this embodiment) and may include a secondary object surface 224 spaced from the central object surface and configured to respond to magnetism by supporting a third mounting magnet 231, comprised of eight magnets 231, in a fourth plane P4 (another of the plurality of third planes, as noted above). The central object surface 226 may be configured to agree with at least one of the engagement member 214 or the intermediate surface 212. In the embodiment depicted in FIG. 7A, the central object surface 226 may define a third plane P3, and the secondary object surface 224 may define a fourth plane P4 (the fourth plane being one of a plurality of third planes, as noted above). A distance between the third and fourth planes P3, P4 may define an object interface depth $d_o$. At least one of the engagement member 214 or the intermediate surface 212 of the mounting apparatus 210 may be configured to move between a respective outer limit position OL and a respective base limit position BL. As such, when the at least one of the engagement member 214 or the intermediate surface 212 that is movable (the engagement member 214 in this embodiment) is in the respective outer limit position OL, a distance between the first and second planes P1, P2 may define an apparatus engagement depth $d_a$. The object interface 220 may thus be configured such that the object interface depth $d_o$ and the apparatus engagement depth $d_a$ are different. Correspondingly or additionally, the mounting apparatus 210 may be configured to engage the object interface 220 via respective engagement forces associated with the engagement member 214 and the intermediate surface 212 such that the overall engagement force increases by degrees until a total engagement force is produced for mounting the object to the mounting surface. Moreover, the object interface depth $d_o$ may be configured such that a disengaging force that is less than the total engagement force and that is applied to a mounted object attached to the object interface 220 is capable of disengaging the object interface 220 from the mounting apparatus 210 in stages by successively overcoming the respective engagement forces associated with the engagement member 214 and the intermediate surface 212.

As previously noted, the mounting apparatus 210, shown in FIG. 7A as part of the system 200, may be engaged in multiple ways. In FIG. 7A, an object interface 220 is provided for mounting an object to the mounting apparatus 210 and may be configured to agree with the opening 294 of the intermediate surface 212 and, correspondingly or additionally, the face 288 of the engagement member 214. As described previously, the mounting apparatus 210 may be configured such that it may act as substantially male, as substantially female, or as both male and female via movement of the engagement member 214 between two limit positions. In this embodiment, because the object interface 220 may be configured to define its depth $d_o$ in a substantially male configuration (e.g., the central object surface 226 may be configured to be received by the mounting apparatus 210), the apparatus 210 may be configured accordingly by configuring the outer limit position OL and the base limit position BL of the engagement member 214 so that the apparatus engagement depth $d_a$ may be less than the object interface depth $d_o$. As noted previously, the apparatus engagement depth $d_a$ may be defined by the distance between the first and second planes P1, P2 when the engagement member 214 (and, correspondingly, the second mounting magnet 240) is in the outer limit position OL, and the object interface depth $d_o$ may be defined by the distance between the plurality of third planes, which, in this case, may be the distance between the third and fourth planes P3, P4. By configuring the apparatus engagement depth $d_a$ to be less than the object interface depth $d_o$ when the apparatus 210 may be configured to receive a portion of the object interface 220 (e.g., when the object interface 220 is substantially male), engagement between the central object surface 226 and the engagement member 214 may be ensured. Furthermore, to ensure engagement between the intermediate surface 212 and the secondary object surface 224 (and, therefore, ensure a total engagement force), the base limit position BL of the engagement member 214 may be configured so that the distance between the first and second planes P1, P2 when the engagement member 214 is in the base limit position is greater than the object interface depth $d_o$. Thus, configuring the system 200, as depicted in FIG. 7A, as described above may facilitate engagement of the object interface 220 with the mounting apparatus 210 such that a total engagement force is produced for mounting the object to the mounting surface.

Thus configured, engagement of the object interface 220 with the mounting apparatus 210 within the system 200 may occur in two ways, both via multiple stages of engagement. Placing the object interface 220 in proximity to the target mounting area (as described above) of the mounting apparatus 210 may produce a first attraction force between the object interface 220 and the mounting apparatus 210. The first attraction force may draw the engagement member 214 toward the central object surface 226 such that the second mounting magnet 240 in the second plane P2 and the third mounting magnet 241 in the third plane P3 are engaged for a first stage of engagement between the object interface 220 and the mounting apparatus 210. As a result of the first stage of engagement, proximity of the third mounting magnet 231 (the second of the plurality of third mounting magnets, as noted above) in the fourth plane P4 and the first mounting magnet 230 in the first plane P1 may create a second attraction force between the secondary object surface 224 and the intermediate surface 212 such that the third mounting magnet 231 and the first mounting magnet 230 are engaged to produce a second stage of engagement and a total engagement force for mounting the object interface 220 to the mounting apparatus 210 and, correspondingly, for mounting the object to the mounting surface. Alternatively, placement of the object interface 220 in proximity to the target mounting area of the mounting apparatus 210 may produce a first attraction force between the third mounting magnet 231 in the fourth plane P4 and the first mounting magnet 230 in the first plane P1. The first attraction force may draw the secondary object surface 224 toward the intermediate surface 212 such that the third mounting magnet 231 and the first mounting magnet 230 are engaged for a first stage of engagement. As a result of the first stage of engagement, proximity of the third mounting magnet 241 in the third plane P3 and the second mounting magnet 240 in the second plane P2 may draw the engagement member 214 toward the central object surface 226 such that the second mounting magnet 240 and the third mounting magnet 241 are engaged for a second stage of engagement and a total engagement force for mounting the object interface 220 to the mounting apparatus 210 and, correspondingly, for mounting the object to the mounting surface.

Also, it is important to note that, referring again to the system 200 depicted in FIG. 7A, the surface face 222 of the central object surface 226 may engage the face 288 of the engagement member 214 for a first stage of engagement when the engagement member 214 is extended from the intermediate surface 212 of the mounting apparatus 210 (e.g., a male-to-male engagement) in which case the engagement member 214 may retract beyond the intermediate surface 212 in a direction toward the base surface 280 such that the second stage of engagement between the intermediate surface 212 and the secondary object surface 224 may occur. Additionally, the engagement member 214 may be configured to be substantially flush with the intermediate surface 212 when in a disengaged (e.g., idle) state (this may occur as a result of a controlling force being applied by the controlling component 260 that may bias the engagement member 214 away from the controlling component 260 and toward the outer limit position OL, with the outer limit position OL of the engagement member 214 being configured such that the first plane P1 and the second plane P2 substantially coincide). In such a configuration, the object interface 220 depicted in FIG. 7A may engage the engagement member 214 via the surface face 222 of the central object surface for a first stage of engagement, and proximity of the secondary object surface 224 to the intermediate surface 212 may cause an attraction force between the secondary object surface 224 and the intermediate surface 212 that is greater than the controlling force applied to the engagement member 214 by the controlling component 260 such that the engagement member 214 may effectively be pushed into a retracted position beyond the intermediate surface 212 and into the chamber 290 of the mounting apparatus 210 that may allow the second stage of engagement to occur for a total engagement force that mounts the object interface 220 to the mounting apparatus 210 and, correspondingly, mounts the object to the mounting surface.

Turning now to another embodiment of the system 200, the embodiment depicted in FIG. 7B shows the mounting apparatus 210 of the system 200 in the extended state with respect to an object interface 220 that may be configured such that it may act as substantially female within the system 200. The mounting apparatus 210 may be configured relative to a substantially female object interface 220 such as the one depicted in FIG. 7B in the following manner. The outer limit position OL of the engagement member 214 may be configured such that the apparatus engagement depth $d_a$ is greater than the object interface depth $d_o$ to ensure engagement between the second mounting magnet 240 of the engagement member 214 and the third mounting magnet 241 of the central object surface during the mounting process. Furthermore, the base limit position of the engagement member 214 may be configured relative to the object interface depth $d_o$ and the strengths of the second mounting magnet 240 and the third mounting magnet 241 depending on the preferred configuration for the mounting apparatus 210. If the preferred configuration does not require a depth between the intermediate surface 212 and the engagement member 214 when the engagement member is retracted (e.g., the mounting apparatus 210 is not desired to have the flexibility of acting as male or female), the base limit position BL may be configured such that the distance between the first plane P1 and the second plane P2 when the engagement member is in the base limit position is less than the object interface depth $d_o$. If a male-female configuration is preferred for the mounting apparatus 210 (e.g., the interior of the mounting apparatus 210 defines a depth when the engagement member is in the base limit position BL, and the engagement member 214 protrudes from the intermediate surface 212 when in the outer limit position OL), the base limit position BL of the engagement member 214 may be configured with respect to the strengths of the first mounting magnet 240 and the third mounting magnet 241 and with further respect to the proximity required between the respective mounting magnets to produce an attraction force capable of moving the second mounting magnet 240 toward the third mounting magnet 241 during the mounting process.

The staged engagement of the object interface 220 shown in FIG. 7B may occur in substantially the same orders between the respective planes of the system 200 as those depicted in FIG. 7A and as described with respect to FIG. 7A (e.g., P2, P3 then P1, P4; or P1, P4 then P2, P3). However, rather than the surface face 222 of the central object surface 226 being drawn into the mounting apparatus 210 by way of the opening 294 of the intermediate surface 212, the engagement member 214 (referring now to FIG. 7B) may be drawn into a cavity 275 of the central object surface 226 for the P1, P3 stage of engagement to occur.

The staged disengagement process may occur in a variety of ways as well, depending on the configuration of the mounting apparatus 210. In FIG. 7A, a disengaging force applied to the mounted object that is less than the total engagement force may disengage the secondary object surface 224 from the intermediate surface 212 for a first stage of disengagement. Prior to, and during, the first stage of disengagement, the engagement member 214 may move away from the base surface 280 and may be still engaged with the central object surface 226 of the object interface. Therefore, having completed the first stage of disengagement, a continued disengaging force may continue to move the engagement member 214 until the engagement member 214 reaches its outer limit position OL. At the outer limit position, the central object surface 226 and the engagement member 214 may disengage for a second stage of disengagement. Thus, a user that may apply a disengaging force to an object mounted to the mounting apparatus 210 may need only to apply a disengaging force of sufficient strength to overcome the first stage of disengagement. Each subsequent stage of disengagement may require more or less force to overcome than did the first stage of disengagement, but each successive stage of release may be less than the total engagement force, such that the object is able to be disengaged more gradually, with the total engagement force split amongst multiple tiers of release, for an experience that may be easier and more enjoyable for the user.

Disengagement of the system 210 shown in FIG. 7B may follow substantially the same order. In both of the systems described in the FIGS. 7A-7B, the point at which the stages of release occur depends on the location of the outer limit position OL of the engagement member 214. The first stage of disengagement may occur within the mounting apparatus 210 between the central object surface 226 and the engagement member 214 if, in FIG. 7A, the outer limit position of the engagement member 214 (and, correspondingly, the second mounting magnet 240) is configured to be between the base surface 280 and the intermediate surface 212.

As depicted in FIGS. 7A-7C and as described above, the relative depths of the object interface 220 and the mounting apparatus 210 may produce substantial surface area contact between the components of the system such that the system may be well suited to bearing the weights of mounted objects. Indeed, a substantial benefit of the mounting apparatus 210 and the mounting system 200 is the weight-bearing capability of the apparatus/system achieved in conjunction with the flexibility and ease of use of magnetic attachment and release. The configuration of the mounting apparatus 210 and the system 200 may be tailored to emphasize the weight-bearing aspects of the embodiments per the application such that a majority of the weight-bearing responsibility of the apparatus/system may be transferred from the magnetic engagements between planes to the structure of the apparatus/system, allowing users the benefits of magnetic attachment and release with lesser risk (e.g. risk of a fall, an unintended movement, or other unintended consequences related to unintentional disengagement). Accordingly, smaller and/or less expensive magnets may be required for the apparatus/system to function suitably as compared with other magnetic mounts that may support the same weight(s), such that the apparatus/system may be less expensive to manufacture and may be more affordable for users while providing the same functionality and benefits.

As mentioned above, configuring the mounting apparatus with respect to an object or with respect to an object interface, as shown in the system 200 of FIG. 7A, may provide a greater degree of functionality and may, in turn, additionally benefit a user of the mounting apparatus. Also as noted above, the number, strength, and arrangement of the mounting magnets may be selected to enhance the functionality of the mounting apparatus in certain ways. For example, in some embodiments, at least one of the engagement member or the intermediate surface may be configured to bias the object to be mounted to a predefined mounting orientation prior to engagement of the object with the apparatus. Correspondingly, in some embodiments, the first mounting magnet may be configured to have a first magnetic force, and the second mounting magnet may be configured to have a second magnetic force that is substantially opposite the first magnetic force. In a system, the third mounting magnets may also be configured such that they agree with the arrangement of first and second mounting magnets prior to engagement. In this way, unintentional and incorrect engagement between mounting magnets may be avoided.

As shown in FIG. 7A, the magnets 231 of the secondary object surface 224 may be substantially aligned with corresponding magnets 230 supported by the intermediate surface 212, and magnet 240 of the engagement member 214 may be substantially aligned with magnet 241 of the central object surface 226. Furthermore, each set of corresponding mounting magnets may be configured so that the magnetic poles facing one another during the mounting process may be substantially opposite. In the configuration shown in FIG. 7A, the mounting apparatus 210 may be substantially female for the purposes of engagement (e.g., the engagement member 214 is capable of retracting within the mounting apparatus 210), as described above, and as will be described in more detail below. Accordingly, the positions of the mounting magnets, as shown, may facilitate engagement of the object interface 226 with the mounting apparatus 210 provided that the perimeter of the surface face 222 of the central object surface 226 (and, accordingly, the extension surface 223) aligns with the opening 294 of the intermediate surface 212. The components of system 200 may further be configured so that the magnetic interaction between the object interface 220 and the mounting apparatus 210 prior to engagement helps facilitate proper engagement. This may be accomplished by configuring the third mounting magnets 231, 241 of the object interface 220 relative to the first and second mounting magnets 230, 240 of the mounting apparatus 210 so that the object interface 220 may substantially self-align with the mounting apparatus 210 prior to engagement with the mounting apparatus 210 to produce a predefined mounting orientation for aligning the object interface 220, and, specifically the central object surface 226 in this embodiment, with the apparatus 210. For example, magnets 231 of the secondary object surface 224 may be permanent magnets, and the magnets 231 may be oriented so that the north pole (N) of each magnet may be facing the mounting apparatus 210 during the mounting process. Correspondingly, magnets 230 of the intermediate surface 212, which may also be permanent magnets, may be oriented so that the south pole (S) of each magnet may be facing the object interface 220 during the mounting process. Additionally, magnet 241 of the central object surface 226 may be oriented so that the south pole (S) of the magnet may be facing the mounting apparatus during the mounting process, and magnet 240 of the intermediate surface 214 may be oriented so that its north pole (N) faces the object interface 220 during the mounting process. Thus, the magnetic forces being configured as such, the central object surface 226 (e.g., magnet 241), upon being brought into proximity with the mounting apparatus 210, may repel the intermediate surface 212 (e.g., magnets 230 being of the same polarity as magnet 241) so as to avoid improper engagement with the mounting apparatus 210; and, further, the repelling force between magnets 230 and magnet 241 may serve to guide the central object surface 226 toward alignment with the opening 294 of the intermediate surface 212 because the opening 294 may be the path of least resistance.

An attraction force between the corresponding mounting magnets in a system may also serve to self-align the object interface 220 with the mounting apparatus 210. FIG. 7B shows a system in which the mounting apparatus 210 may act as male, such that a cavity 275 of the object interface 220 may receive the engagement member 214 during engagement of the object interface 220 with the mounting apparatus 210. Thus, the cavity 275 may need to be aligned with the engagement member 214 and/or the opening 294 of the intermediate surface 212 (e.g., if the engagement member 214 is retracted and/or recessed when the mounting apparatus 210 is idle), and alignment may be easier for a user if the system 200 is configured to self-align during mounting. With continued reference to FIG. 7B, placing the object interface 220 into proximity of the target mounting area (e.g., which may be the facade 285 of the intermediate surface 212, in this embodiment) of the mounting apparatus 210 may cause an attraction force between the magnets 231 of the secondary object surface 224 and the magnets 230 of the intermediate surface 212 such that six of the magnets 231 and six of the magnets 230 (i.e. g all of them, in this embodiment) are attracted to one another and orient the object interface 220 (and, thus, the object) in a predefined way, as well as positioning the cavity 275 relative to the opening 294 such that the engagement member 214 may be received by the object interface 220. It should be noted, as well, that the configuration of magnets 231 in FIGS. 7A-7B may serve to facilitate an easier mounting process for the user, particularly with respect to the circular cross-section that may be chosen for other components of these embodiments, in that the "extra" magnets (e.g., two of the eight magnets 231 that may remain unused in the mounted configuration) may provide that all six magnets 230 of the intermediate surface are engaged by the object interface 220 during the mounting process regardless of the orientation of the object (and, correspondingly, the object interface 220) as positioned by the user. This may provide a better experience for the user, because the user may not need to align the object in a particular fashion in order to achieve an intended result (e.g., mounting the object). For example, a user may wish to mount her phone in the car for use as a GPS device using a system similar to the system 200 in FIG. 7B, and she may wish to mount the phone without having to look at the mounting apparatus so that she may concentrate on her driving. Therefore, she may mount the phone without looking, so that the way she positions the phone during mounting may happen to be askew relative to her preferred orientation for the device. The presence of eight magnets 231 in a circular configuration on the secondary object surface 224, rather than six magnets 231 in a configuration matching that of the intermediate surface 212, may ensure that the device is mounted and secured to the mounting apparatus properly (e.g., safely and via a total engagement force) even if it may not be of the targeted orientation of the user, and this may be preferable to the user versus not being able to mount the device at all due to the mistake in orientation, having to risk looking at the mounting apparatus while driving in order to properly align the device, and/or having the device mounted incorrectly so that the device may be prone to an accidental fall. Furthermore, as described above, the configuration of components of the system 200 shown in FIG. 7B may provide a guiding and self-aligning influence for proper mounting of the device with respect to the engagement member 214 and/or other components of the system 200 in addition to accommodating the mistake in orientation of the device. Moreover, the configuration of the system 200 as shown in FIG. 7B, in the above example, may allow the user to easily correct her mistake. The flush contact of the surfaces of the system 200 shown in FIGS. 7A-7B (e.g., the substantially flat secondary object surface 224 and the substantially flat intermediate surface 212, which may be in contact in a mounted and engaged configuration), along with the flexibility of rotational movement via the cylindrical shape of the engagement member 214 in FIGS. 7A-7B (and the accommodating size/shape of the opening 294 of the intermediate surface 212), the configuration of magnets 230 and 231 discussed above, and other features, may allow the user to easily adjust the orientation of the mounted device. The user may accomplish this by applying a rotational force to the phone (e.g., the object) that may be strong enough to overcome the engagement forces between the magnets 231 and the magnets 230 (which may be a lesser force than that required to disengage the magnets 231, 230 in the direction of the line of engagement $L_e$) while the engagement force between magnet 240 and magnet 241 remains substantially unchanged as the engagement member 214 is rotated about the central axis X. Thus, the system 200 may remain partially disengaged momentarily (e.g. magnets 231 and magnets 230 being temporarily out of alignment) until the continued rotational movement causes an attraction between the magnets 230 of the intermediate surface 212 and a second configuration of the magnets 231 (which may be adjacent to those magnets 231 which were previously engaged, such that the second configuration may include one magnet 231 that may have been previously unengaged) that is stronger than the attraction between the magnets 230 and the first configuration of the magnets 231 (e.g., the magnets 231 having been disengaged). This attraction (between magnets 230 and the second configuration of the magnets 231) may re align the object according to the second configuration of the magnets 231 relative to the magnets 230, producing a new total engagement force. Thus, the user may only need to rotate the object just further than halfway between the adjacent magnets 231 to accomplish the change in orientation rather than being required to disengage the object by providing a disengaging force along the line of engagement $L_e$) and re-engage the object with the apparatus (again, along the line of engagement $L_e$) in order to accomplish the same change in orientation.

Embodiments which may allow a user to manipulate an object (e.g., slideably, as described above, or otherwise) and/or cause the object or object interface to interact with the magnetic forces present within the apparatus or system while the object is engaged or partially engaged with the mounting apparatus (and, particularly, when those interactions change the state of engagement and/or the state of the object or object interface) whether within a system, as in the example above, or without (as described previously) may allow the mounting apparatus to have functionality in addition to, or that may complement, the mounting functionality of the apparatus or system; and this additional functionality may be very valuable to the user. For example, in the system depicted in FIG. 7C, an intermediate surface 212 may be provided that includes a first mounting magnet 230 comprised of six magnets 230b, 230c, 230d, 230f (not shown), 230g (not shown), 230h and a second object surface 224 that may include a third mounting magnet 231 comprised of eight magnets 231a, 231b, 231c, 231d, 231e, 231f (not shown), 231g (not shown), 231h, wherein six magnets 231b, 231c, 231d, 231f, 231g, 231h of the eight magnets of the second object surface 224 may correspond to the six magnets 230b, 230c, 230d, 230f, 230g, 230h of the intermediate surface 12 when a mounted object is in a preferred mounted orientation (e.g., in this embodiment, the rotational orientation of the object relative to the central axis X of the mounting apparatus 210 that a user may wish the object to be in when fully mounted, such as when a user may wish a television to be in a position such that the bottom edge of the television's screen is substantially level instead of being rotationally askew e.g., crooked relative to the central axis X). In the embodiment depicted in FIG. 7C, the preferred mounted orientation may correspond to the pre-engagement (e.g., disengaged) orientation shown and described above. Furthermore, the system 200 shown may be configured such that magnets 231c and 230c and magnets 231g (not shown) and 230g (not shown) are correlated magnets and such that magnets 231a, 231b, 231d, 231e, 231f (not shown), 231h and magnets 230b, 230d, 230f (not shown), 230h are permanent magnets. The correlated magnets 231c, 230c, 231g, 230g may be configured to engage the permanent magnets 230b, 231d, 230h, 231f in substantially the same way as would permanent magnets (e.g., in substantially the same way as the magnets 231c, 230c, 231g, 230g may engage the magnets 230b, 231d, 230h, 231f if the magnets 231c, 230c, 231g, 230g were permanent magnets of respective polarities opposite the respective polarities of the magnets 230b, 231d, 230h, 231f) during the mounting process (e.g., along respective engagement axes that correspond to the central axis X and, accordingly, the line of engagement $L_e$) and, also, when engaged rotationally in a mounted configuration (as described above). Furthermore, the correlated magnets 231c, 230c may be configured with respect to one another such that they may engage one another rotationally when the object interface 220 is engaged with the mounting apparatus via a clockwise movement about the central axis X with respect to the facade 285 of the intermediate surface 212 such that magnet 231c is moved from a position of engagement with magnet 230b (e.g., disengaged from magnet 230b via the clockwise movement) to a position of engagement with 230c (e.g., engaged with magnet 230c via the clockwise movement). Likewise, the correlated magnets 231g, 230g may be configured with respect to one another such that they may engage one another rotationally when the object interface 220 is engaged with the mounting apparatus via the same clockwise movement described above such that magnet 231g is moved from a position of engagement with magnet 230f (e.g., disengaged from magnet 230f via the clockwise movement) to a position of engagement with 230g (e.g., engaged with magnet 230g via the clockwise movement). Thus, the engagements between the respective correlated magnet pairs may occur substantially simultaneously in response to the same clockwise rotational movement described above. Furthermore, the respective configurations of the correlated magnet pairs 231c, 230c and 231g, 230g may provide that, in the engaged state, the correlated magnet pairs 231c, 230c and 231g, 230g may be disengaged, respectively, via a substantially opposite rotational movement (e.g., counterclockwise) only, such that the respective correlated magnet pairs may not be able to be reasonably disengaged (e.g., disengaged by means other than by an extreme or unusual force) in a direction along the line of engagement $L_e$ in response to a disengaging force applied in a direction along the line of engagement $L_e$. Thus, the object interface 220 may be able to be fully disengaged from the mounting apparatus 210 only after the substantially opposite rotational movement has occurred.

Therefore, being configured as described above, a user may mount an object to a mounting surface using system 200 shown in FIG. 7C by rotating the object slightly counterclockwise when facing the mounting apparatus 210 such that magnets 231a and 231c, for example, of the object interface 220 are substantially aligned with magnets 230h and 230b of the mounting apparatus. The object may thus be placed into proximity of the mounting apparatus 210 and engaged with the mounting apparatus 210, as described above. After engagement, the user may rotate the object clockwise, sliding the second object surface 224 against the intermediate surface 212, until the correlated magnet pairs 231c, 230c and 231g, 230g are engaged. The user may know the correlated magnet pairs are engaged because the object may not be able to be further rotated in the clockwise direction as a result of the respective engagements and/or also because the object may be in the preferred mounted orientation. To disengage the object, the user may rotate the object counterclockwise until the correlated magnet pairs are disengaged and, correspondingly, the magnets adjacent the correlated magnets are engaged. The user may thus disengage the object by applying a disengaging force that is less than the total engagement force between the object interface 220 and the mounting apparatus 210, as previously described. The configuration of the system 200 described with respect to FIG. 7C is one of many possible configurations using correlated magnets, and configurations wherein the correlated magnet pairs are in closer proximity when fully engaged (e.g., supported on the facade 285 of the intermediate surface 212 rather than on the inner surface 286, and configured in a like manner on the second object surface 224, for example) may be even more advantageous in producing the desired result.

Furthermore, correlated magnets may be coded (e.g., programmed) such that they may only respond to other coded magnets. For example, in the embodiment described above, the correlated magnets may be configured to interact with permanent magnets in a substantially similar fashion as would a permanent magnet in the place of the correlated magnet (as described). Alternatively, embodiments may be configured such that the correlated magnets may effectively "ignore" some components of the embodiment, such as the permanent magnets described above, and may respond only to other coded magnets that may be configured specifically to interact with them magnetically. Thus, coded magnets may provide a substantial degree of customization with respect to the desired functionality of the system.

Configuring the mounting system 200 as described above may be very beneficial to a user in that the security and stability of the object may be greatly enhanced. For instance, in some embodiments, a user may be able to mount a television or other visual display to a wall in a boat, valuing the additional security that may be afforded the device against the unpredictable and sudden forces (e.g., yaw, etc.) that may act on the device when the boat is at sea. Additionally, a theatre company may value the system for being able to quickly and easily mount temporary lighting systems from the ceiling between performances and may use the mounting system knowing that the force of gravity may act in a direction substantially aligned with the line of engagement $L_e$ of the mounting apparatus 210 such that the lighting system is secure against the force of gravity when mounted to the ceiling.

Similar advantages may result from a system 200, again with reference to FIG. 7C, that may be configured to use electromagnets in place of, or in addition to, the correlated magnets described above. For example, in a system 200 that is configured to use electromagnets for providing additional security to the mounting system, the magnets 230c, 230d, 230f (not shown), 230g (not shown), 230h may be electromagnets that may be managed by an electric current such that they may be strengthened or weakened in response to a signal. The magnets 231 of the second object surface 224 may be permanent magnets, and the system 200 may contain only seven third mounting magnets 231 such that the system does not contain the magnet 231c shown in FIG. 7C. Additionally, component 230b of the intermediate surface 212 in FIG. 7C may be a circuit that responds to magnetism by producing a signal, such as a Hall Effect sensor. The circuit may respond to the presence or absence of a magnet by producing one or more signals, and the circuit may be configured to effectively control the strength of the electromagnets 230 of the mounting apparatus 210 by sending a signal to an electrical device within the mounting apparatus (not shown) that may receive the signal from the circuit and may adjust the forces of the electromagnets 230 accordingly. Furthermore, the circuit may be configured to be adjustable such that it may be enabled or disabled by a user. When enabled, a user may mount an object to the mounting apparatus 210 in a slightly askew orientation, as described above, so that the magnets 231a and 231d, for example, of the secondary object surface 224 may be aligned with magnets 230h and 230c, respectively, of the intermediate surface 212. When mounted in this way, the circuit may be aligned with the area of magnet 231c shown in FIG. 7C (which, again, is not present in the described configuration) such that no signal is generated during mounting. Thus, the total engagement force resulting from the initial (e.g. skewed engagement may be of a level L. The user may rotate the object clockwise, as described above, and the clockwise movement may align the magnet 231b with the circuit such that the circuit sends a first signal to the electrical device. The electrical device may be configured to effectively strengthen the magnetic force of the electromagnets 230 in response to the first signal. The increased magnetic strength of the electromagnets 230 may increase the total engagement force of the system 200 to a level H. The level H total engagement force may prevent the object from being disengaged in a direction that may substantially correspond with a direction of the line of engagement $L_e$. Thus, a user wishing to disengage the object may need to first rotate the object in a counterclockwise manner, as described above, and the force required to rotate the object may be less than the total engagement force H. The counterclockwise movement may move the magnet 231b out of proximity of the circuit such that the circuit sends a second signal to the electrical device. The electrical device may be configured to effectively weaken the magnetic force of the electromagnets 230 in response to the second signal. The reduced magnetic strength of the electromagnets 230 may decrease the total engagement force of the system 200 to the level L. Thus, the user may be able to apply a disengaging force to dismount the object via successive stages of disengagement, as previously described.

It is important to note that the corresponding mounting magnets in systems such as system 200 may act in a similar fashion to that of a controlling component, described previously. Systems are also contemplated and may be configured such that all of the mounting magnets and controlling components are electromagnets, correlated magnets, programmable correlated magnets, etc. These components may be configured to interact with one another and with other controlling components to move, reorient, or otherwise reposition the object mounted to the mounting apparatus. For example, referring again to the system 200 in FIG. 7A, magnets 230, 231, 240, 241 may be configured to be electromagnets that may be adjustable via previously-described methods. Thus, the object itself, via the object interface, may be able to influence its own state of movement or position by being configured to send signals to the apparatus, either interactively (e.g. dynamically) by a user or in a pre-programmed fashion, to manipulate the magnetic forces in play for the benefit of the user. Thus, an apparatus 210 in a system may produce an apparatus controlling force, and an object interface may produce an object interface controlling force via the configured magnets. Therefore, an object interface may be able to eject itself by applying an interface controlling force to the apparatus. Additionally, the object interface may apply an interface controlling force to partially disengage the object so that the object may be adjusted. The depth of adjustment may be a depth from the intermediate surface, and the depth of adjustment may be less than the apparatus engagement depth such that the object is only partially disengaged from the apparatus when it is capable of being adjusted. To facilitate such functionality, any of the central object surface or the plurality of secondary object surfaces may be configured with at least one electromagnet, at least one correlated magnet, or at least one programmable magnet. In addition, the engagement member and/or the intermediate surface may be configured with at least one electromagnet, at least one correlated magnet, or at least one programmable magnet.

Although FIGS. 7A-7C depict an object interface having two planes of engagement, the object interface may be configured (depending upon the number of planes of the mounting apparatus, for example) to have 3, 4, 5, or more planes of engagement to accommodate additional tiers of engagement/disengagement provided by the mounting apparatus.

For purposes of explanation, certain external components of the embodiments of the mounting apparatus 10, 210 described above and illustrated in FIGS. 7A-7C are not shown to allow other described components to be shown. As such, the mounting apparatus 10, 210 may be embodied in various ways. For example, one or more of the engagement member, intermediate surface, magnets, etc. may be disposed and/or movable within a housing. The housing itself may be configured in various ways to accommodate attachment of the mounting apparatus to various types and configurations of mounting surfaces.

Although the embodiments described above involve the use of two tiers of magnets (e.g., two planes P1, P2), the same principles may be applied to create a mounting apparatus 10 having 3, 4, 5, or more stages of engagement and/or disengagement. Indeed, the greater the number of planes that are provided for magnetic engagement, the smaller the required incremental engagement and/or disengagement force that is needed as the total engagement force may be distributed among a greater number of planes. In addition, the engagement/disengagement force required for each plane may be distributed substantially equally (e.g., by dividing the total engagement force required to support the intended object by the total number of planes), or may be distributed unevenly, such as, for example, in an embodiment in which the initial disengaging force required is greater than the subsequent incremental disengaging forces required for release of subsequent stages.

In some embodiments of the invention, the second mounting magnet may be movable, and a plurality of second mounting magnets may be supported in a plurality of respective second planes. In addition, the second mounting magnets may be arranged in a nested configuration and/or a telescoping configuration. Accordingly, in some embodiments, the engagement member may comprise a plurality of engagement member components, and at least one of the engagement member components may be configured to respond to magnetism. Referring now to the embodiment depicted in FIG. 8A, the engagement member 14 may comprise a plurality of engagement member components 14', 14", and each of the plurality of second mounting magnets 40', 40" may be supported in a respective second plane by a respective engagement member component.

Dividing the engagement force of a second mounting magnet 40 amongst a plurality of second mounting magnets 40', 40" in a plurality of respective second planes may allow the engagement force of the second mounting magnet to be overcome over a greater distance and via a greater number of respective engagement forces. Therefore, each engagement force associated with each respective second plane may be of a lesser force than that of the second mounting magnet supported in a single second plane, so the respective engagement forces may each require a lesser respective disengaging force such that the total engagement force may be overcome more gradually. Overcoming the total engagement force of the second mounting magnet more gradually over a greater distance may allow the object to be more easily and smoothly disengaged from the mounting apparatus while preserving substantially the same total engagement force for maintaining engagement of the object with the mounting apparatus when engaged.

Figure 8A:
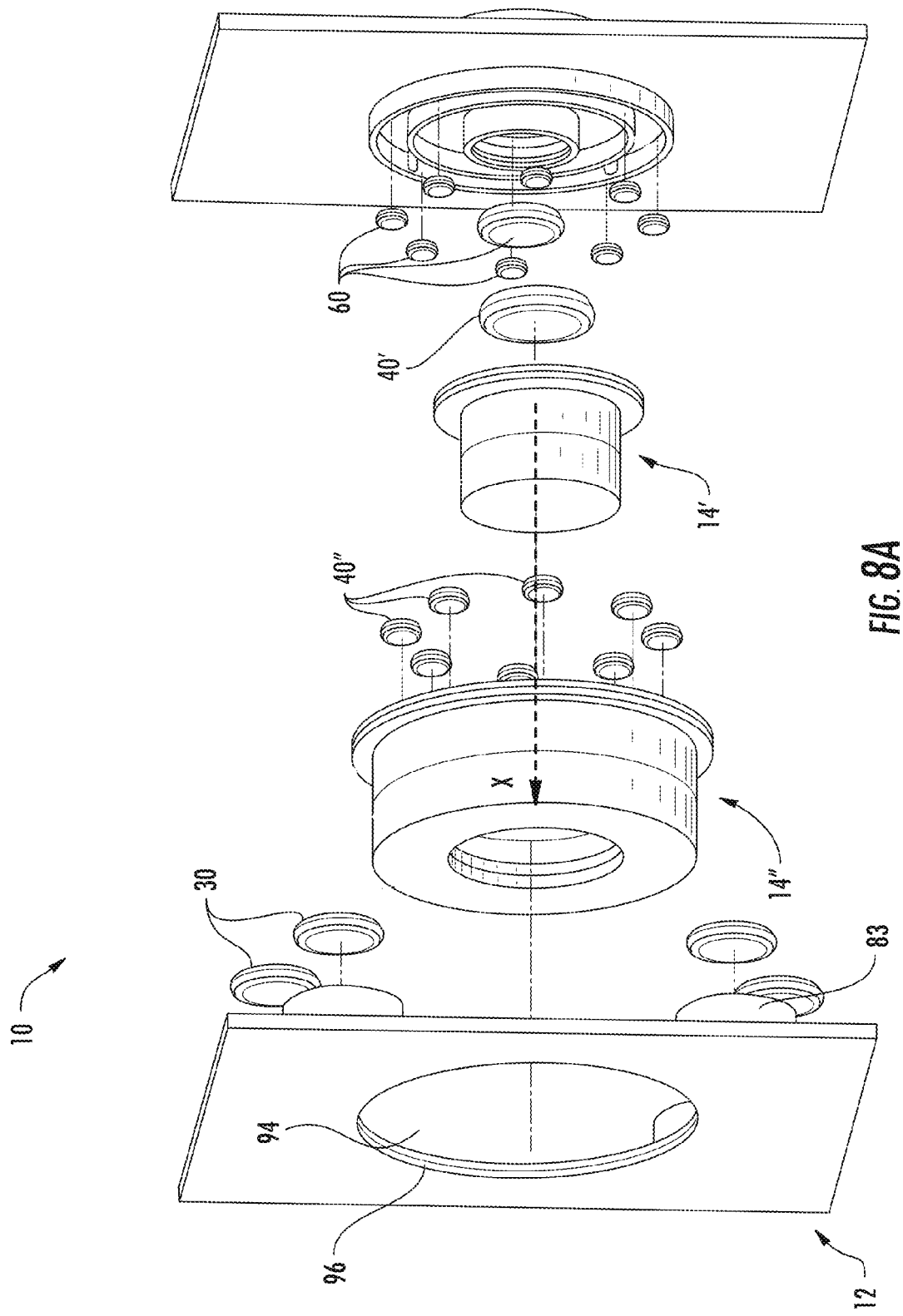
Figure 8B:
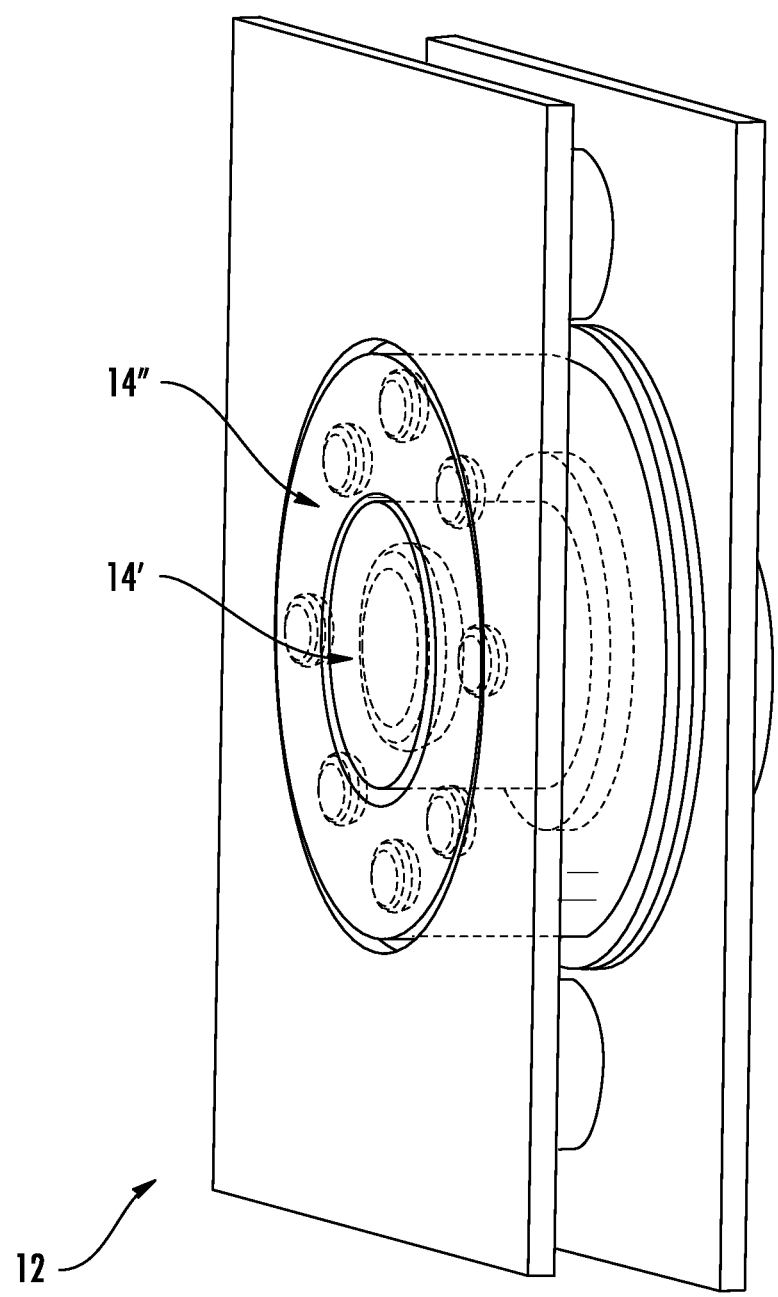
Figure 8C:
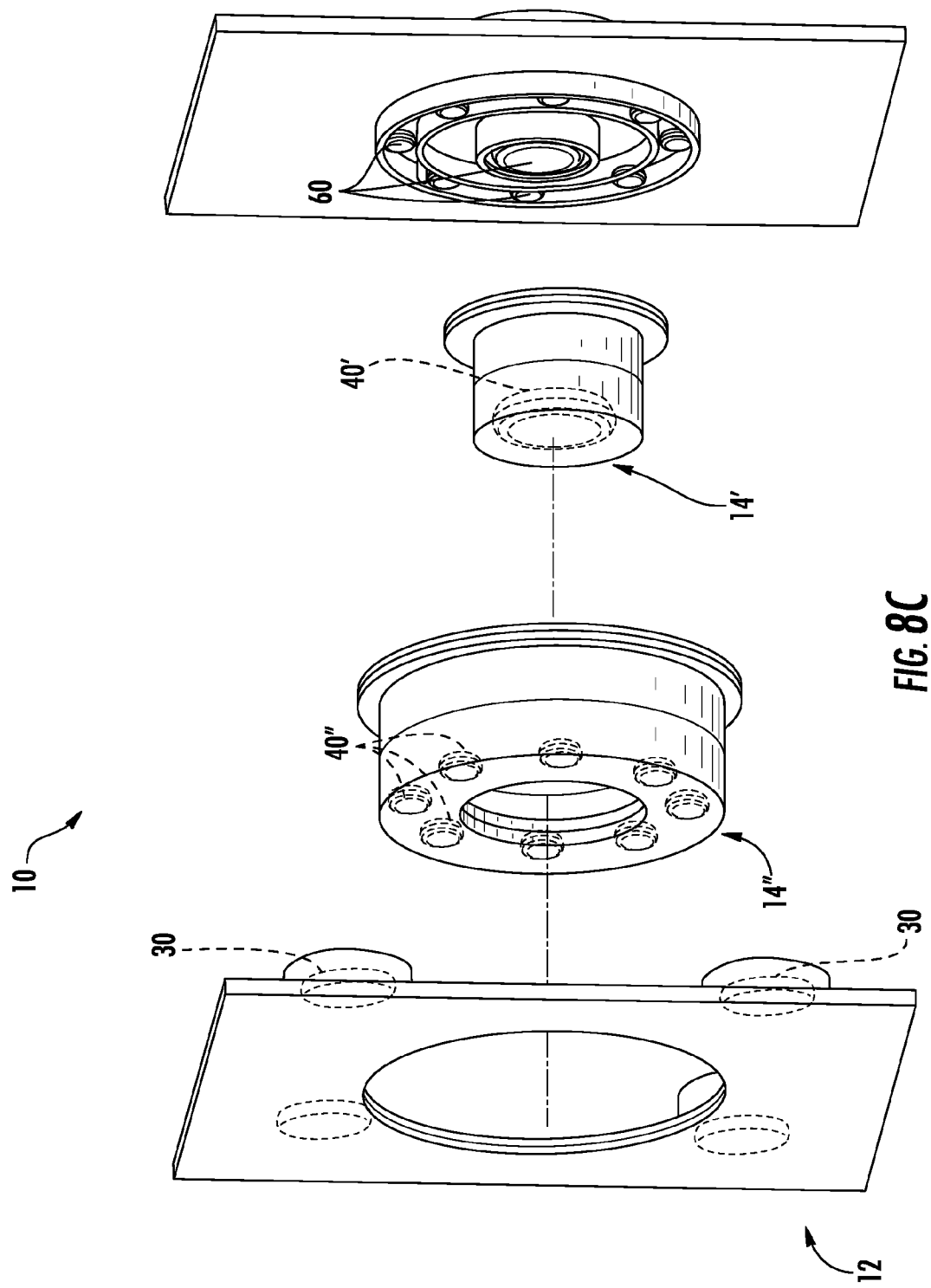

The plurality of engagement member components (14', 14") may be configured relative to one another such that, in the retracted state, the plurality of engagement member components are in a nested configuration that is substantially flush with the intermediate surface 12, as illustrated in FIG. 8B. Thus, the embodiment depicted in FIG. 8A may provide a smoother and more gradual release of an object while retaining the visually appealing aesthetic of the flush surface of the mounting apparatus.

In the extended state, the plurality of engagement member components 14', 14" may form a telescoping engagement member extending toward an object to be mounted along an engagement member axis (e.g., axis X). An additional benefit of arranging the engagement member components 14', 14" in a nested and/or telescoping configuration may be that the engagement member components 14', 14" may adapt to various surfaces that may have substantially differing depths. As such, embodiments such as the apparatus 10 depicted in FIGS. 8A-D may be used as mounting apparatuses and/or may be attached to objects for mounting the objects to other surfaces. Moreover, like apparatuses with nested configurations may attach to one another and may provide a high degree of flexibility and ease of detachment.

Furthermore, a nested configuration of engagement member components may be configured to selectively extend in response to differing attraction forces. For example, the embodiment depicted in FIG. 8A may be configured to accommodate a relatively smaller object with the smaller engagement member 14' and may be configured to accommodate a relatively larger object with engagement member 14". As such, the components may be configured with differing weights with respect to one another and with respect to the apparatus 10 such that the smaller engagement member 14' may extend in response to relatively lesser attraction forces, and the larger engagement member 14" may require a stronger attraction force to be extended from the apparatus 10. Thus, in one example, a user may wish to use one mounting apparatus for mounting two devices, a mobile phone and a tablet computer. The user may accomplish this with the apparatus 10 as shown in FIG. 8A, as the smaller engagement member 14' may be configured to extend in response to a magnetic attraction brought about by proximity of the mobile phone for mounting the mobile phone, but the attraction force between the phone and the mounting apparatus may not be strong enough to move the larger engagement member 14" as configured. However, the larger engagement member 14" may be configured to extend when the larger tablet computer is brought into proximity, as the tablet computer may apply a larger attraction force (either due to the metal content of the device as compared to the mobile phone, or because the device may be fitted with an object interface). Correspondingly, object interfaces may be configured for use with the nested apparatuses so as to produce the selective tier mechanism consistently as an added benefit of the device.

In some cases, the mounting apparatus 10 may be configured such that at least one of the engagement member components is configured to respond to magnetism (e.g., at least one of the engagement member components comprises a respective second mounting magnet 40), as noted above. The plurality of engagement member components may be configured relative to one another, however, such that, in the retracted state, the plurality of engagement member components (three engagement member components 14', 14", 14''' in the embodiment of FIGS. 9A-9C) are in a nested configuration that forms a telescoping receptacle 190 that is configured to receive at least a portion of an object to be mounted, as shown in FIG. 9A. In the extended state, the plurality of engagement member components 14', 14'', 14''' may form a telescoping engagement member 14 extending toward the object to be mounted, as shown in FIG. 9B. An exploded view of the embodiment of FIGS. 9A and 9B is shown in FIG. 9C.

Accordingly, the planes, strengths, sizes, arrangement, distances, depths, allowable movements, etc. associated with the first and second mounting magnets with respect to each other, other components of the mounting apparatus, and the object may be configured in various ways to achieve particular desired functions, capabilities, and/or aesthetics. For example (with reference to FIGS. 2-4), in some embodiments, the respective limit positions of the at least one of the mounting magnets that is moveable may be configured such that the first and second mounting magnets are movable to a position in which the first and second planes substantially coincide.

Moreover, as shown in FIG. 10, although embodiments of the engagement member 14, 214 described above are depicted as having a flat outer face (e.g., face 88 of FIG. 6A), embodiments of mounting apparatus 10 are contemplated in which the outer face 45 is curved or otherwise angled. In this regard, in some embodiments, one or more of the planes of engagement (e.g., one or more of the first or second planes) may be defined by a curved surface. Said differently, one or more of the intermediate surface or the engagement member may be defined by a curved surface, as shown in FIG. 10 with respect to the engagement member 14. In this way, the engagement member 14 may be configured to engage a correspondingly curved component of an object interface. Moreover, curvature of the engagement member 14 (or intermediate surface, in some embodiments) may allow for an additional degree of freedom in the engagement of the object interface with the mounting apparatus, such as to allow the object interface to be attached at an angle (e.g., not necessarily aligned with the central axis of the engagement member).

Referring now to FIG. 11A, a system 300 is provided that may include a mounting apparatus 310 comprising an intermediate surface 312 that may be configured to respond to magnetism and an engagement member 314 that may also be configured to respond to magnetism. The intermediate surface 312 may define a first plane, and the engagement member 314 may define a second plane and may be configured to move along a line of engagement $L_e$ that intersects the first plane. As shown, the second plane may be defined by a curved surface. The system 300 may further include an object interface 320 configured to be attached to an object (not shown) to be mounted and to the mounting apparatus 310, and the object interface may comprise a central object surface 322 that may define a third plane. The central object surface 322 may be configured to respond to magnetism and may be configured to agree with the engagement member 314.

The engagement member 314 may be configured to move between an outer limit position OL and a base limit position BL. Additionally, the engagement member 314 may comprise an extension 398 and a face 388 joined to the extension 398 and may support a second mounting magnet 340 in the second plane. In the embodiment shown in FIG. 11 A, the face 388 of the engagement member 314 may be the curved surface of the second mounting magnet 340. The extension 398 may provide a stop feature 350 by means of an outward protrusion of the extension 398 that has a greater diameter than the opening 394 of the intermediate surface. A portion of the extension 398 may be slideably received by the guide surface 396 of the intermediate surface 312 such that the stop feature 350 may limit the engagement member 314 in a direction away from the intermediate surface 312 along the line of engagement Le by contacting an inner surface 386 of the intermediate surface 312 and, thus, may define the outer limit position OL of the engagement member 314. When the engagement member 314 is in the outer limit position, the distance between the first and second planes may define an apparatus engagement depth da.

The intermediate surface 312 may support the first mounting magnet 330 in the first plane, and the first mounting magnet 330 may limit the engagement member 314 in a direction away from the central object surface 322 by contact with the second mounting magnet 340 of the engagement member 314 and, thus, may define the base limit position of the engagement member 314.

As mentioned above, the central object surface 322 may be configured to agree with the engagement member 314 by way of a surface opening 304 and a contact surface 302 of the surface opening 304 that may be configured (e.g., shaped) to substantially flushly engage the face 388 of the engagement member 314 and, correspondingly, the second mounting magnet 340. The diameter of the surface opening 304 may be less than the diameter of the face 388 of the engagement member 314 (and, correspondingly, may be less than the diameter of the second mounting magnet 340). The diameter of the surface opening 304 and the depth (e.g., thickness) of the central object surface 322 may be configured relative to the object (not shown) and relative to the diameter of the face 388 (and e.g., the diameter of the second mounting magnet 340) such that the contact surface 302 substantially flushly engages the face 388 of the engagement member 314. For example, a substantially flat object, or a substantially flat portion of the object, that may attach to the object interface 320 on the surface of the central object surface 322 that is furthest from the mounting apparatus 310 and may block or otherwise occupy a portion of the opening 304 that may be occupied by the engagement member 314 when engaged with the central object surface 322, may require a greater depth e.g., thickness of the central object surface 322 than would an object that does not block or otherwise occupy the portion of the opening 304.

The intermediate surface 312 may be attached to a mounting surface (e.g., a wall) via fasteners by way of countersunk holes 307. The central object surface 322 may attach to an object (not shown) to be mounted via fasteners by way of countersunk openings 355. The intermediate surface 312 may apply an attraction force (via the first mounting magnet 330) to the engagement member 314 such that the engagement member 314 is in the base limit position (e.g., retracted) when the mounting apparatus 310 is disengaged (e.g., idle).

Therefore, an object to be mounted to the mounting surface may be put in proximity of the mounting apparatus 310, and an attraction force between the engagement member 314 and the central object surface 322 may be greater than the attraction force applied to the engagement member 314 by the intermediate surface 312 such that the engagement member is moved toward the outer limit position OL. If the central object surface 322 is not within the apparatus engagement depth $d_a$, the engagement member 314 may reach the outer limit position OL and be held in the outer limit position by the attraction force between the central object surface 322 and the engagement member 314 until the central object surface 322 may be moved within the apparatus engagement depth $d_a$. When the central object surface 322 is within the apparatus engagement depth $d_a$, the engagement member 314 may engage the central object surface 322 (e.g., a first stage of engagement). Proximity of the central object surface 322 to the intermediate surface 312 may result in an attraction force between the central object surface 322 and the intermediate surface 312. The engagement member 314, the central object surface 322, and the object may move toward the intermediate surface 312, and the overall engagement force between the mounting apparatus 310 and the object interface 320 may increase by degrees until such time that the engagement member 314 may move to the base limit position BL. In the base limit position BL, an engagement force between the central object surface 322 and the intermediate surface 312 may be produced (e.g., a second stage of engagement) such that the overall engagement force becomes a total engagement force for mounting the object to the mounting surface.

As shown in FIG. 11A, the central object surface may not physically engage the facade 385 of the intermediate surface 312, and the engagement force produced between the intermediate surface 312 and the central object surface 322 may be a magnetic engagement force. As such, the object may be free to move about the face 388 of the engagement member 314 (e.g., rotationally, pivotally, etc.) such that the object may be manipulated to a preferred orientation (FIG. 11B) when securely mounted via the total engagement force of the mounting apparatus 10.

The mounting apparatus 310 may be configured such that a disengaging force that may be less than the total engagement force and that may be applied to the object attached to the object interface 320 may be capable of disengaging the object interface from the mounting apparatus in stages by successively overcoming the respective engagement forces associated with the engagement member and the intermediate surface.

With respect to the embodiment depicted in FIG. 11A, a disengaging force applied to the object may be of a sufficient strength to disengage the mounted object if the disengaging force is greater than the engagement force between the intermediate surface 312 and the central object surface 322 because the total engagement force may be overcome by degrees over the distance defined by the apparatus engagement depth $d_a$ as the disengaging force first overcomes the engagement force between the intermediate surface 312 and the central object surface 322 which may begin movement of the engagement member 314 and the object toward the outer limit position OL. In the outer limit position, the disengaging force may need to be of a strength greater than the engagement force between the central object surface 322 and the engagement member 314 to disengage the object from the mounting surface.

Turning now to FIG. 12, an embodiment of a mounting apparatus 10 is shown. The mounting apparatus 10 shown in FIG. 12 may comprise a first mounting magnet 30 supported in a first plane and a second mounting magnet 40 supported in a second plane. The first mounting magnet 30 may be comprised of six magnets 30 supported by an intermediate surface 12, and the second mounting magnet 40 may be comprised of one magnet 40 supported by an engagement member 14.

The engagement member 14 may be configured to be moved along a line of engagement $L_e$ that intersects the first and second planes. The engagement member 14 may comprise an extension 98 and a face 88 joined to the extension.

The intermediate surface 12 may be in a fixed position. The intermediate surface 12 may be configured to receive a portion of the extension 98 of the engagement member 14 via a guide surface 96 of an opening 94 defined by a portion of the intermediate surface 12, and two protrusions of the inner surface 86 of the intermediate surface 12 may encroach on the opening 94 and may be received by a groove 58 of the extension 98 of the engagement member 14 which may further guide movement of the engagement member 14 and may prevent rotation of the engagement member 14 as the engagement member 14 is moved between the extended state and the retracted state.

The engagement member 14 may be configured to move between a base limit position BL and an outer limit position OL. Movement of the engagement member 14 may be limited in the direction of the outer limit position OL by a stop feature 50 that may be provided by an outward protrusion of the extension 98 of the engagement member 14, and the stop feature 50 may contact an inner surface 86 of the intermediate surface 12 by way of the groove 58 when the engagement member 14 is in the extended state. When in the retracted state, an inner face 59 of the engagement member 14 may be in contact with a guide stop 87 that may limit movement of the engagement member 14 toward the base limit position BL. When in the retracted state, the facade 85 of the intermediate surface and the face 88 of the engagement member 14 may be substantially flush, as the depth between the facade 85 and the guide stop 87 may be substantially the same as the depth between the face 88 and the inner face 59 of the engagement member 14.

The stop feature 50 of the engagement member 14 may support a plurality of controlling components 60 (six, in this embodiment) which may substantially align with the first mounting magnet 30 (equally six, in this embodiment) supported by the intermediate surface. Thus, the controlling component 60 may be movable, and the movement of the controlling component 60 may substantially correspond with the movement of the second mounting magnet 40. Said differently, the plurality of controlling components 60 may be supported in a third plane that is movable with respect to the engagement member 14 that may be substantially parallel to the second plane.

The controlling component 60 may apply a force to the mounting magnet 30 (six magnets in FIG. 12) that may bias the engagement member 14 toward the retracted state (e.g., a repelling force). Movement of the engagement member 14 toward the retracted state may be stopped by guide stop 87 of the intermediate surface 12 as the inner face 59 of the engagement member 14 contacts the guide stop 87. Thus, the target mounting area (described previously) may be flush when the mounting apparatus 10 is disengaged (e.g., idle), as described above.

The mounting apparatus 10 may be configured to attach to a mounting surface (not shown) via four attachment supports 107. An object to be mounted to the mounting surface may be put in proximity of the mounting apparatus 10 which may produce at least one attraction force between the object and at least one of the mounting magnets 30, 40. The at least one attraction force may be greater than the controlling force applied to the intermediate surface 12 by the controlling component 60 such that the engagement member 14 moves toward the object to engage the object. The object and the second mounting magnet 40 may produce an engagement force (e.g., a first stage of engagement), and the object may be in such proximity to the intermediate surface 12 that the object moves toward the intermediate surface 12. The object may engage the first mounting magnet 30 (and, correspondingly, the intermediate surface 12) for a second stage of engagement that may produce a total engagement force for mounting the object to the mounting surface.

The object may be disengaged from the mounting apparatus 10 by application of a disengaging force that is less than the total engagement force, as the total engagement force may be overcome in stages by successively overcoming the respective engagement forces associated with the first and second mounting magnets to disengage the object.

The controlling component 60 may also be configured to apply a force to the intermediate surface 12 that may bias the engagement member 14 toward the extended state. In fact, the engagement member 14 may be positioned at any point along the line of engagement $L_e$ that may be between the outer limit position OL and the base limit position BL by configuring the controlling component 60 (e.g., size, strength, shape, type, etc.) and the first mounting magnet 30 relative to one another such that a desired position of the engagement member 14 is achieved. Various magnets may be chosen for the mounting apparatus to facilitate this or other desired functionality of the apparatus and/or its components, and any of the first mounting magnet 30, the second mounting magnet 40, and/or the controlling component 60 may be an electromagnet, a programmable magnet, a correlated magnet, etc.

Referring again to FIG. 12, in some embodiments of the mounting apparatus 10, the second mounting magnet 40 may be a correlated magnet. Additionally, an object interface (not shown) may comprise a corresponding correlated magnet that may substantially align with the second mounting magnet 40 during engagement. The correlated magnets may be configured such that, once engaged (i.e. mounted via a total engagement force, as described previously), rotation of the object interface (e.g. clockwise rotation) causes the pair of correlated magnets to interact to produce a locking engagement force such that the object may not be disengaged from the mounting apparatus 10 in a direction corresponding to the line of engagement $L_e$. The locking engagement force may be an engagement force in addition to the total engagement force achieved during mounting of the object interface to the mounting apparatus. Correspondingly, when the user wishes to disengage the object from the mounting apparatus, the user may rotate the object in a substantially opposite fashion (e.g. counterclockwise) to release the locking engagement force, and the user may then go about applying a disengaging force to the object that may be less than the total engagement force to disengage the object in stages, as previously described.

Embodiments using pairs of correlated magnets in this way may be very beneficial to the user due to the degree of additional security and functionality provided.

Turning now to FIG. 13, a system 400 is shown for mounting an object interface 420 to a mounting apparatus 410. The system 400 may include a mounting apparatus 410 which may comprise an intermediate surface 412 configured to respond to magnetism and an engagement member 414 configured to respond to magnetism. The intermediate surface 412 may define a first plane, and the engagement member 414 may define a second plane. Additionally, the engagement member 414 may be movable along a line of engagement $L_e$ that intersects the first plane and may support a second mounting magnet 440 in the second plane. The intermediate surface may support a first mounting magnet 430 in the first plane, and the first mounting magnet 430 may be comprised of six magnets 30. The system 400 may also include an object interface 420 that may be configured to be attached to an object to be mounted (not shown) and to the mounting apparatus 410. The object interface 420 may comprise a central object surface 426 that may be configured to respond to magnetism and may define a third plane. And the object interface 420 may also comprise a secondary object surface 424 that may be spaced from the central object surface 426 and may define a fourth plane. The secondary object surface 424 may support a respective third mounting magnet 431 (which may be one of a plurality of third mounting magnets in a plurality of third planes in this embodiment), and the third mounting magnet 431 may be comprised of two magnets 431 supported in a respective third plane. The central object surface 426 may support a respective third mounting magnet 441, which may be comprised of one magnet 441, in a respective third plane.

At least one of the engagement member 414 or the intermediate surface 412 may be movable between an outer limit position OL and a base limit position BL. An apparatus engagement depth $d_a$ may be defined by a distance between the first and second planes when the at least one of the engagement member 414 or the intermediate surface 412 that is movable is in the respective outer limit position.

In the depicted embodiment of FIG. 13, the engagement member 414 may be movable between an outer limit position OL and a base limit position BL and may be slideably received by the intermediate surface 412 along a guide surface 496 by way of an opening 494, and extension 498 may slide along the guide surface 496 of the intermediate surface 412. The intermediate surface 412 may have a fixed position. The engagement member 414 may further comprise an extension 498 and a face 488 joined to the extension, and movement of the engagement member 414 may be limited in the direction of an object to be mounted by a stop feature 450 formed by an outward protrusion of the extension 498. The stop feature 450 may contact the inner surface 486 of the intermediate surface and, thus, may serve to define the outer limit position of the second mounting magnet 440. Additionally, the stop feature 450 may support a plurality of apparatus controlling components 460 (six magnets 460 in this embodiment) in a plane that moves relative to the second plane. Movement of the engagement member 414 toward the retracted state may be limited by the inner face 459 of the engagement member 414 by contact with a facade 485 of the intermediate surface.

The central object surface 426 may have a lead face 429 and may be configured to engage the face 488 of the engagement member 414 during the mounting process. The secondary object surface 424 may comprise a frontage 427 and a hanger 477 attached to the frontage 427. Additionally, the second object surface may have fastener holes 479 for attaching to the object to be mounted (e.g., a picture frame, etc.).

In the embodiment shown in FIG. 13, magnets 431, 441, 430, 440, 460 may be rare earth magnets. Mounting magnets 431, supported by the secondary object surface 424, may have north (N) poles facing the mounting apparatus 410. Mounting magnets 430, supported by the intermediate surface 412, may have south (S) poles facing the object interface 420 and may have north (N) poles facing the controlling components 460 supported by the stop feature 450 of the intermediate member 414. Controlling components 460 may have north (N) poles facing the object interface. Mounting magnet 440 may be supported by the face 488 of the intermediate surface and may have a south (S) pole facing the object interface 420. Mounting magnet 441 may be supported by the central object surface 426 and may have a north (N) pole facing the mounting apparatus 410.

Therefore, the controlling components 460 may be configured to be weakly repelled by the magnets 430 such that the engagement member 414 may be in the retracted position when disengaged (e.g., idle), and its movement in a direction away from the object interface 420 may be stopped by contact with the facade 485 of the intermediate surface by the inner face 459 of the engagement member. Magnets 431 may be configured to be moderately attracted to the magnets 430, and the magnet 441 may be configured to be strongly attracted to the magnet 440.

The object interface 420 may be brought into proximity with the mounting apparatus 410 by a user such that an attraction force between the magnet 441 of the central object surface 426 and the magnet 440 of the engagement member 414 moves the engagement member 414 against the repelling force of the magnets 430 of the intermediate surface and toward the object interface. The magnet 440 may engage the magnet 441 for a first stage of engagement. The depth between the first and second planes when the engagement member 414 is extended and engaged may be substantially equivalent to the depth between the lead face 429 of the central object surface 426 and the facade 485 of the intermediate surface such that the secondary object surface 424 of the object interface 420 may be pressed substantially flush against the facade 485 of the intermediate surface 412 as a result of the first engagement force. The hanger 477 may thus be positioned over the extension 498 of the engagement member 414. The magnets 430 of the intermediate surface may be physically lower than magnets 431 (e.g., not aligned) in the engagement position for the magnets 441, 440. The user may let go of the hanger 477 to allow it to engage the extension 498 of the engagement member. The weight of the object may lower the object and object interface such that the magnets 431 are aligned with the magnets 430, and a second stage of engagement may be produced for a total engagement force between the object interface 420 and the mounting apparatus 410. However, the lowering of the object may disengage the magnets 440, 441 and engagement of the magnets 430, 431 may strengthen the repelling force applied to the controlling components 460 which may repel the engagement member 414 such that the engagement member 414 retracts in response to the repelling force issued by the magnets 430, 431. Thus, the inner face 459 of the engagement member may contact the hanger 477 of the secondary object surface 424, effectively holding the hanger 477 against the facade 485 of the intermediate surface.

The user may apply a disengaging force by lifting the object which may slide the frontage 427 of the secondary object surface against the facade 485 of the intermediate surface 412 and disengage the magnets 430, 431. The lifting force may be less than the total engagement force between the magnets 430, 431 if the magnets 430, 431 were to have been pulled in a direction along the line of engagement Le. Disengaging the magnets 430, 431 may cause the repelling force applied to the controlling components 60 to be reduced. Proximity of the magnet 441 upon the lifting of the object may cause the engagement member 414 to extend and release the hanger 477. Thus, the object may be fully disengaged from the mounting surface.

For example, in some embodiments, the second mounting magnet may be moveable, and a plurality of second mounting magnets may be supported in a plurality of respective second planes. In this regard, turning to FIG. 14, in some embodiments, the engagement member 14 may comprise a plurality of engagement members, such as four engagement members 14a, 14b, 14c, 14d in the depicted embodiment. At least one of the engagement members 14a, 14b, 14c, 14d may be configured to respond to magnetism (e.g., one or more may support a respective second mounting magnet 40a, 40b, 40c, 40d), and each engagement member may be configured to move independently along a respective line of engagement with respect to other engagement members. Thus, each engagement member 14a, 14b, 14c, 14d may be configured to move between a respective base limit position BL and a respective outer limit position OL that is substantially independent of the other engagement members.

Moreover, the second mounting magnets may be configured such that the respective base limit position BL of each second mounting magnet is in substantially the same plane. With respect to the embodiment of FIG. 14, for example, a base surface 80 may be provided that includes stop features 55a, 55b, 55c, 55d corresponding to a particular engagement member 14a, 14b, 14c, 14d. Each stop feature 55a, 55b, 55c, 55d may have a height (e.g., length of extension away from the base surface 80) substantially corresponding to the depth of its corresponding engagement member 14a, 14b, 14c, 14d. For example, the deepest engagement member 14d in the embodiment of FIG. 14 may be configured to correspond to the stop feature 55d with the smallest height, whereas the shallowest engagement member 14a may be configured to correspond to the stop feature 55a with the greatest height. By configuring the stop feature heights and the corresponding engagement member depths to add up to the same dimension across all of the engagement members, the respective base limit position BL of each of the second mounting magnets may lie in substantially the same plane (e.g., the assembled outer face of the plurality of engagement members may be substantially flush).

Each engagement member component 14a, 14b, 14c, 14d may comprise an extension 98a, 98b, 98c, 98d and a face 88a, 88b, 88c, 88d joined to the extension, and each extension may be configured to limit movement of the object to a direction along a single axis in response to a disruptive or disengaging force applied to the object, as described above. Thus, the extension 98a, 98b, 98c, 98d of each engagement member component 14a, 14b, 14c, 14d may define a depth, as noted above, and the depth of at least two of the engagement member components may be different, as illustrated in the embodiment of FIG. 14.

In other embodiments, however, such as the embodiment depicted in FIG. 15, each engagement member 14n may define substantially the same depth. For example, a plurality of engagement members 14n comprising a plurality of second mounting magnets 40n in a plurality of second planes may be arranged in relatively close proximity to form a set 140, as shown. Each engagement member 14n may comprise an extension 98n and a face 88n joined to the extension, and each engagement member 14n in the set 140 may be configured to move independently of the other engagement members. Thus, each engagement member 14n may be slideably received by an intermediate surface 12 by way of an opening 94n and may move along a guide surface 96n of the opening 94n. As such, movement of the engagement member 14n may be limited between a base limit position BL and an outer limit position OL, and movement of the engagement member 14n in a direction toward the object to be mounted may be limited by a stop feature 50n formed by an outward protrusion of the extension 98n that contacts an inner surface 86 of the intermediate surface 12. The base limit position BL of the engagement member 14n may be defined by the depth of the extension 98n of the engagement member 14n relative to the base surface 80.

Additionally or alternatively, the base limit position BL of each respective engagement member 14n may be defined by a controlling component 60 that may be configured to apply a controlling force to the set 140 or, in some embodiments, separate controlling forces specific to each engagement member 14n. For example, the controlling component 60 may be comprised of a programmable magnet which may have an array of magnets corresponding in number to the number of engagement members 14n. Thus, the controlling component 60 may be able to produce multiple attraction and repulsion forces simultaneously that may act separately on each engagement member 14n in the set 140 and may cause some engagement members 14n to be retracted while other engagement members 14n are extended. Furthermore, the extended engagement members 14n may be extended by degrees (e.g., at differing lengths depending on the configuration of the programmable magnet) such that the set 140 may be able to take a variety of shapes. As such, the set 140 may be adapted to the shape of an object or may accommodate a mounted object in a particular way.

Additionally, in some embodiments which may or may not include a controlling component 60, the set 140 may allow for engagement of the mounting apparatus 10 with an object having an irregular surface (e.g., non-perpendicular or sloped lines or curves), such that the pin set 140 conforms to the shape of the object (or an object interface) and may mount the object and/or support at least a portion of the weight of the object without having been configured for the object. Thus, an apparatus 10 comprising a set 140 may be able to accommodate the mounting of objects that other embodiments could not.

The apparatus 10 comprising the set 140, as shown in FIG. 15, may engage an object in stages, as described above, such that a portion of the object is engaged with the intermediate surface 12. The portion of the object engaged with the intermediate surface 12 may compress (e.g., fully retract) the engagement members 14n in contact with the portion of the object, and the non-compressed engagement members 14n may be attracted to multiple depths of the object to substantially "fill in" cavities of the object not engaged with the intermediate surface 12 such that the object may be engaged and supported over a larger surface area in proportion to the object's overall surface area as compared to other embodiments.

Furthermore, the mounting apparatus 10 comprising the set 140 of engagement members 14n may be attached to mountable objects so that those objects may engage irregularly-shaped surfaces that may be configured to respond to magnetism.

FIGS. 16A and 16B show an embodiment of a mounting apparatus that may use a minimal number of components to apply the method of invention. In the embodiment shown, a controlling component may be suspended from a structure that may comprise the intermediate surface in other embodiments, and the controlling component may be movable with respect to the apparatus and to the engagement member. The engagement member may be configured in a similar manner to the engagement member 14 in FIG. 12.

In FIGS. 17A-17B, a housing 500 is shown with respect to an embodiment of the mounting apparatus 10 similar to the embodiment of FIG. 1. The housing 500 is defined by a front portion 510 and a rear portion 520. The front portion 510 and the rear portion 520 may fit together in a clamshell configuration, as shown in FIG. 17B. In addition, the front portion 510 may accommodate movement therethrough of the engagement member 514, while the rear portion 520 may be configured to attach to a mounting surface comprising a ball joint-type attachment member 550 via a socket component 540 of the mounting apparatus (shown in FIG. 17A).

The socket component 540 may, for example, be defined by a component of the rear portion 520 of the mounting apparatus 500, as depicted. In such embodiments, the ball and socket attachment 550-540 may allow the mounting apparatus 500 to be movable with respect to the mounting surface, such as rotationally (e.g., pitch, yaw, roll, etc.). For example, the ball joint-type attachment member 550 may allow the mounted object (not shown) to be manually adjusted by a user (up, down, left, right, etc.) as desired. In this regard, the ball joint-type attachment member 550 may be provided as an extension from a wall, a table, or other surface, and adjustment by the user of the ball and socket attachment 550-540 may facilitate a user's viewing angle of a screen (for example) of the mounted object via adjustment of the position of the mounting apparatus with respect to the ball joint-type attachment member 550.

With respect to FIG. 17B, for example, the rear portion 520 may serve as the base surface in the embodiment of FIG. 1, the front portion 510 may serve as the intermediate surface, and the engagement member 514 may be configured to be movable therebetween. The front and rear portions 510, 520 may be configured to be attached to each other via corner flanges 530 and fasteners (not shown).

Referring now to FIG. 18, another embodiment of a mounting apparatus 10 is shown for engaging and attaching to an object. In the depicted embodiment of FIG. 18, the object is an object interface 20 that is configured to be attached to the object to be mounted.

The mounting apparatus 10 may be configured such that a first mounting magnet is supported in a first plane P1 and a second mounting magnet is supported in a second plane P2. The first plane P1 may be a nominal plane that is defined by an intermediate surface 12 of the mounting apparatus 10, whereas the second plane P2 may be a nominal plane that is defined by an engagement member 14 of the mounting apparatus, as described previously. Accordingly, the intermediate surface 12 and the engagement member 14 may each be configured to respond to magnetism.

The first mounting magnet may comprise a plurality of magnets in some embodiments. Likewise, the second mounting magnet may comprise a plurality of magnets. In the depicted embodiment of FIG. 18, a first mounting magnet comprised of one magnet 30 and a second mounting magnet comprised of four magnets 40 arranged as shown are provided. The quantity, type, strength, arrangement, spacing, etc. of the mounting magnets with respect to each other and with respect to other components of the mounting apparatus may be selected to accommodate the object to be mounted and the requirements of the user.

At least one of the mounting magnets (or group(s) of magnets comprising the mounting magnet(s), as is the case in the depicted embodiment) may be configured to move independently of the other mounting magnet along a line of engagement $L_e$ that intersects the first and second planes P1, P2. In this regard, the movement of the mounting magnet(s) that is moveable (which, in some embodiments, may be both the first and second mounting magnets) may be limited, such that each mounting magnet that is moveable is only able to move between a respective outer limit position OL and a respective base limit position BL.

The outer limit position OL may be defined, for example, by stops 56 that extend from a component of the mounting apparatus 10. In the depicted embodiment of FIG. 18, the engagement member 14 is configured to be movable with respect to a fixed intermediate surface 12. The engagement member 14 is slideably received by cylinder 35 of the intermediate surface 12 via contact with block surface 36, and stops 56 are provided as inward extensions from a sidewall 52 of the intermediate surface. The stops 56 are, in turn, configured to contact a corresponding ledge 51 defined by the engagement member 14 to stop movement of the engagement member 14. Thus, the outer limit position OL is defined by the position of the second mounting magnet 40 when the ledge 51 is in contact with the stops 56. In other embodiments, however, the stops 56, base limit position BL, outer limit position OL, and length of the line of engagement $L_e$ may be defined by other components of the mounting apparatus 10 and/or other structures of those components.

The mounting magnets 30, 40 may be configured to cooperate to engage the object to be mounted (e.g., the object interface 20), such that a total engagement force is produced between the mounting magnets and the object interface that serves to hold the object to the mounting apparatus. Accordingly, the respective outer limit positions of the mounting magnets that are moveable (e.g., the second mounting magnet 40 in the depicted embodiment of FIG. 18) may be configured such that a disengaging force that is less than the total engagement force and that is applied to a mounted object overcomes the total engagement force in stages by successively overcoming the respective engagement forces associated with the first and second mounting magnets to disengage the object.

As illustrated in FIG. 18, at least one of the engagement member 14 or the intermediate surface 12 may be configured to be moved between an extended state and a retracted state. In the retracted state, the at least one of the engagement member or the intermediate surface that is moveable may be biased away from the object to be mounted (e.g., may be biased toward the base limit position BL). In the extended state, the at least one of the engagement member or the intermediate surface that is movable may be biased toward the object to be mounted (e.g., may be biased toward the outer limit position OL). In this way, proximity of the object (e.g., the object interface 20) to the engagement member 14 may produce an attraction force between the object and the engagement member that causes engagement of the object with the engagement member. Likewise, proximity of the object (e.g., the object interface 20) to the intermediate surface 12 may produce an attraction force between the object and the intermediate surface that causes engagement of the object with the intermediate surface, such that the mounting apparatus 10 may be configured to engage the object to be mounted in stages via the respective attraction forces.

In the depicted embodiment of FIG. 18, for example, the object interface 20 may include a first object magnet 31 and a second object magnet 41 (or, as in the illustrated example, the second object magnet may be comprised of a plurality of magnets). The first object magnet 31 and the second object magnet 41 may be configured (e.g., positioned and sized) to attract or be attracted to a corresponding one of the first or second mounting magnets 30, 40 of the mounting apparatus 10. In the depicted embodiment, the first object magnet 31 is configured to respond to and interact with the first mounting magnet 30, and the second object magnets 41 are configured to respond to and interact with the magnets comprising the second mounting magnet 40. Although in FIG. 18 the first and second object magnets 31, 41 are positioned in substantially the same plane (e.g., are arranged on a central object surface 22), in some embodiments, the object interface 20 may comprise a central object surface configured to respond to magnetism and a secondary object surface spaced from the central object surface and configured to respond to magnetism. In such embodiments, the central object surface may define a third plane, and the secondary object surface may define a fourth plane, as described previously.

As noted above, the structures and components depicted in the figures have been simplified for clarity and ease of explanation. As such, one or more of the components, such as housings, fasteners, stands, swivels, etc., although described above, may not be shown in the figures. Those of ordinary skill in the art will understand and appreciate that the method, systems, and apparatuses provided herein may also describe means for joining, coupling, attaching, or otherwise magnetically associating one body with another, and that numerous alternate embodiments and adaptations may be executed as guided by the full content of this disclosure.

For example, although particular configurations and relative dimensions and spacings are illustrated in the accompanying drawings, it is to be understood that the particular configurations are depicted for purposes of explanation, and multiple other configurations are possible. As an example, although embodiments of the mounting apparatus are shown as having an engagement member with a circular cross-section, embodiments may include engagement members having a square, rectangular, triangular, etc. cross-section. In addition or alternatively, the configuration of the outer face of the engagement member may include additional features for enhancing the interaction between the engagement member and the object interface. In this regard, the outer face of the engagement member may be keyed (e.g., defining openings configured and arranged to receive corresponding protrusions of the object interface) such that only particular object interfaces may be engaged and/or the object interfaces may be engaged at only certain angles or orientations with respect to the mounting apparatus. The outer face may, in other embodiments, include holes or other openings for allowing wires or other components to be passed through from the mounting apparatus to the object interface or vice versa.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of mounting an intended object to a mounting surface, comprising:
   supporting a first mounting magnet in a first plane;
   supporting a second mounting magnet in a second plane;
   arranging the first mounting magnet and the second mounting magnet in a tiered configuration;
   allowing at least one of the mounting magnets to move independently of the other mounting magnet along a line of engagement that intersects the first and second planes;
   limiting movement of the at least one of the mounting magnets that is movable between a respective outer limit position and a respective base limit position;
   configuring the mounting magnets to cooperate to engage an intended object via respective engagement forces associated with the first and second mounting magnets to produce a total engagement force for mounting the intended object to the mounting surface; and
   configuring the respective outer limit position of the at least one of the mounting magnets that is movable such that a disengaging force that is less than the total engagement force and that is applied to the mounted intended object, overcomes the total engagement force in stages by successively overcoming the respective engagement forces associated with the first and second mounting magnets to disengage the intended object, and configuring a supporting structure associated with at least one of the mounting magnets to provide at least one of a data and an electrical connection with the intended object when the intended object is mounted.

2. The method of claim 1, further comprising configuring the supporting structure associated with at least one of the mounting magnets to receive a portion of the intended object, wherein receiving the portion of the intended object comprises structurally supporting the intended object.

3. The method of claim 1, further comprising supporting a plurality of second mounting magnets in a plurality of respective second planes, wherein each second mounting magnet is configured to be movable.

4. The method of claim 3, further comprising arranging the second mounting magnets in a telescoping configuration.

5. The method of claim 1, further comprising supporting a third mounting magnet in a third plane, wherein the third mounting magnet is configured to be attached to the intended object to be mounted to adapt the intended object to agree with at least one of the first and second mounting magnets.

6. The method of claim 1, further comprising arranging the first mounting magnet and the second mounting magnet in a nested configuration.

7. The method of claim 1, further comprising selecting the mounting magnets so that each of the first mounting magnet and the second mounting magnet is configured to produce a magnetic field.

8. The method of claim 1, further comprising supporting at least one of the first mounting magnet and the second mounting magnet in a telescoping configuration.

9. The method of claim 1, wherein at least one of the first mounting magnet and the second mounting magnet comprises a plurality of magnets.

10. The method of claim 1, further comprising configuring the respective limit positions of the at least one of the mounting magnets that is movable such that the at least one of the mounting magnets that is movable is movable to a position in which the first and second planes substantially coincide.

11. The method of claim 1, further comprising supporting a plurality of third mounting magnets in a plurality of respective third planes, wherein the plurality of third mounting magnets is configured to be attached to the intended object to be mounted to adapt the intended object to agree with at least one of the first and second mounting magnets.

12. The method of claim 11, further comprising selecting the third mounting magnets so that at least one third mounting magnet is configured to produce a magnetic field.

13. The method of claim 5, further comprising selecting the third mounting magnet so that it is configured to produce a magnetic field.

14. The method of claim 1, further comprising configuring the mounting magnets to include at least one electromagnet so that the total engagement force is adjustable.

15. The method of claim 1, further comprising configuring the mounting magnets to allow rotational movement of the intended object when the intended object is mounted to the mounting surface.

16. The method of claim 1, further comprising configuring the mounting magnets to provide an effective locking mechanism for the intended object.

17. The method of claim 1, wherein the mounting surface comprises a substantially male configuration when the at least one of the mounting magnets that is movable is in the outer limit position.

18. The method of claim 1, further comprising applying a controlling force to the at least one of the mounting magnets that is movable to control at least the movement or a function of the at least one of the mounting magnets that is movable.

19. The method of claim 1, further comprising configuring the supporting structure associated with the first and second mounting magnets to be substantially flush with one another when the intended object is not engaged with the first and second mounting magnets.

20. The method of claim 1, wherein the mounting surface comprises a substantially female configuration when the at least one of the mounting magnets that is movable is in the base limit position.

21. A method of mounting an intended object to a mounting surface, comprising:

supporting a first mounting magnet in a first plane;
supporting a second mounting magnet in a second plane;
arranging the first mounting magnet and the second mounting magnet in a tiered configuration;
allowing at least one of the mounting magnets to move independently of the other mounting magnet along a line of engagement that intersects the first and second planes;
limiting movement of the at least one of the mounting magnets that is movable between a respective outer limit position and a respective base limit position;
configuring the mounting magnets to cooperate to engage an intended object via respective engagement forces associated with the first and second mounting magnets to produce a total engagement force for mounting the intended object to the mounting surface; and
configuring the respective outer limit position of the at least one of the mounting magnets that is movable such that a disengaging force that is less than the total engagement force and that is applied to the mounted intended object, overcomes the total engagement force in stages by successively overcoming the respective engagement forces associated with the first and second mounting magnets to disengage the intended object;
configuring a supporting structure associated with the at least one of the mounting magnets that is movable to support at least one connection interface; and
wherein the at least one connection interface comprises at least one of an electrical connector and a wireless charging device.

22. The method of claim 21, further comprising configuring the supporting structure associated with at least one of the mounting magnets to receive a portion of the intended object, wherein receiving the portion of the intended object comprises structurally supporting the intended object.

23. The method of claim 21, further comprising supporting a plurality of second mounting magnets in a plurality of respective second planes, wherein each second mounting magnet is configured to be movable.

24. The method of claim 23, further comprising arranging the second mounting magnets in a telescoping configuration.

25. The method of claim 21, further comprising supporting a third mounting magnet in a third plane, wherein the third mounting magnet is configured to be attached to the intended object to be mounted to adapt the intended object to agree with at least one of the first and second mounting magnets.

26. The method of claim 21 further comprising arranging the first mounting magnet and the second mounting magnet in a nested configuration.

27. The method of claim 21, further comprising selecting the mounting magnets so that each of the first mounting magnet and the second mounting magnet is configured to produce a magnetic field.

28. The method of claim 21, further comprising supporting at least one of the first mounting magnet and the second mounting magnet in a telescoping configuration.

29. The method of claim 21, wherein at least one of the first mounting magnet and the second mounting magnet comprises a plurality of magnets.

30. The method of claim 21, further comprising configuring the respective limit positions of the at least one of the mounting magnets that is movable such that the at least one of the mounting magnets that is movable is movable to a position in which the first and second planes substantially coincide.

31. The method of claim 21, further comprising supporting a plurality of third mounting magnets in a plurality of respective third planes, wherein the plurality of third mounting magnets is configured to be attached to the intended object to be mounted to adapt the intended object to agree with at least one of the first and second mounting magnets.

32. The method of claim 31, further comprising selecting the third mounting magnets so that at least one third mounting magnet is configured to produce a magnetic field.

33. The method of claim 25, further comprising selecting the third mounting magnet so that it is configured to produce a magnetic field.

34. The method of claim 21, further comprising configuring the supporting structure associated with at least one of the mounting magnets to provide at least one of a data and an electrical connection with the intended object when the intended object is mounted.

35. The method of claim 21, further comprising configuring the mounting magnets to include at least one electromagnet so that the total engagement force is adjustable.

36. The method of claim 21, further comprising configuring the mounting magnets to allow rotational movement of the intended object when the intended object is mounted to the mounting surface.

37. The method of claim 21, further comprising configuring the mounting magnets to provide an effective locking mechanism for the intended object.

38. The method of claim 21, wherein the mounting surface comprises a substantially male configuration when the at least one of the mounting magnets that is movable is in the outer limit position.

39. The method of claim 21, further comprising applying a controlling force to the at least one of the mounting magnets that is movable to control at least the movement or a function of the at least one of the mounting magnets that is movable.

40. The method of claim 21, further comprising configuring supporting structures associated with the first and second mounting magnets to be substantially flush with one another when the intended object is not engaged with the first and second mounting magnets.

41. The method of claim 21, wherein the mounting surface comprises a substantially female configuration when the at least one of the mounting magnets that is movable is in the base limit position.

* * * * *